United States Patent
Aichi et al.

(10) Patent No.: US 7,502,049 B2
(45) Date of Patent: Mar. 10, 2009

(54) IMAGE SUPPLY DEVICE, RECORDING SYSTEM, AND RECORDING CONTROL METHOD

(75) Inventors: Takao Aichi, Tokyo (JP); Kazuya Sakamoto, Yokohama (JP); Kentaro Yano, Yokohama (JP); Fumihiro Goto, Kawasaki (JP); Akitoshi Yamada, Yokohama (JP); Ruriko Mikami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 10/529,217

(22) PCT Filed: Nov. 26, 2003

(86) PCT No.: PCT/JP03/15094

§ 371 (c)(1),
(2), (4) Date: Mar. 25, 2005

(87) PCT Pub. No.: WO2004/050374

PCT Pub. Date: Jun. 17, 2004

(65) Prior Publication Data

US 2006/0044395 A1 Mar. 2, 2006

(30) Foreign Application Priority Data

Nov. 29, 2002 (JP) ............................. 2002-348783

(51) Int. Cl.
*H04N 5/225* (2006.01)
*G06F 3/12* (2006.01)

(52) U.S. Cl. .................... 348/207.2; 358/1.13; 358/1.15

(58) Field of Classification Search ............... 348/207.1, 348/207.2, 231.3, 231.6; 358/1.13, 1.15, 358/1.18, 1.6; 710/65; 707/104.1
See application file for complete search history.

(56) References Cited

U.S. PATENT DOCUMENTS

| 5,142,594 | A |   | 8/1992 | Sugishima |
|-----------|---|---|--------|-----------|
| 5,937,144 | A | * | 8/1999 | Wilkins et al. ............. 358/1.13 |
| 6,031,623 | A | * | 2/2000 | Smith et al. ................ 358/1.14 |
| 6,055,361 | A |   | 4/2000 | Fujita et al. |

(Continued)

FOREIGN PATENT DOCUMENTS

EP 1 022 894 A2 7/2000

(Continued)

OTHER PUBLICATIONS

Canon, Inc., "DPOF Summary", Jul. 17, 2000.*

(Continued)

*Primary Examiner*—Lin Ye
*Assistant Examiner*—Jason Whipkey
(74) *Attorney, Agent, or Firm*—Fitzpatrick, Cella, Harper & Scinto

(57) ABSTRACT

A digital camera has a storage medium which stores image-data and a DPOF associated with a print process of the image data, acquires information associated with the function of a printer upon connection of that printer, sets a CDPS job command associated with the print process of the image data on the basis of the acquired information associated with the functions, sets a print condition for the printer on the basis of the DPOF and CDPS command, and sends a print instruction. The printer acquires image data stored in the storage medium in accordance with the designated print condition and prints the image data.

6 Claims, 50 Drawing Sheets

U.S. PATENT DOCUMENTS

| | | | |
|---|---|---|---|
| 6,115,137 A * | 9/2000 | Ozawa et al. | 348/211.4 |
| 6,476,930 B1 * | 11/2002 | Roberts et al. | 358/1.13 |
| 6,603,506 B2 | 8/2003 | Ogawa et al. | 348/207.2 |
| 6,823,092 B1 * | 11/2004 | Sato | 348/231.99 |
| 6,982,800 B1 * | 1/2006 | Cavill et al. | 358/1.15 |
| 7,024,500 B2 * | 4/2006 | Ashizaki et al. | 345/156 |
| 7,248,383 B2 | 7/2007 | Yoshida et al. | 358/1.15 |
| 2001/0013894 A1 * | 8/2001 | Parulski et al. | 348/207 |
| 2001/0013949 A1 | 8/2001 | Tateyama | |
| 2001/0040684 A1 * | 11/2001 | Takahashi | 358/1.2 |
| 2002/0080250 A1 * | 6/2002 | Ogawa et al. | 348/222 |
| 2002/0097334 A1 * | 7/2002 | Nishi et al. | 348/222 |
| 2002/0154336 A1 | 10/2002 | Takei | |
| 2003/0081251 A1 * | 5/2003 | Tanaka et al. | 358/1.15 |
| 2003/0095160 A1 * | 5/2003 | Ogiwara | 347/16 |
| 2003/0160998 A1 * | 8/2003 | Kuwahara | 358/1.15 |
| 2003/0222985 A1 * | 12/2003 | Goto et al. | 348/207.2 |
| 2003/0231341 A1 * | 12/2003 | Aichi et al. | 358/1.15 |
| 2004/0046990 A1 * | 3/2004 | Yano et al. | 358/1.15 |
| 2004/0061894 A1 | 4/2004 | Yoshida et al. | 358/1.15 |
| 2004/0095469 A1 * | 5/2004 | Lin | 348/207.2 |
| 2004/0165070 A1 * | 8/2004 | Yoshida et al. | 348/207.2 |
| 2004/0207875 A1 * | 10/2004 | Endo | 348/207.2 |
| 2005/0190265 A1 * | 9/2005 | Small | 348/207.2 |
| 2006/0044395 A1 | 3/2006 | Aichi et al. | 348/207.2 |

FOREIGN PATENT DOCUMENTS

| | | |
|---|---|---|
| EP | 1 158 763 | 11/2001 |
| EP | 1 363 186 A1 | 11/2003 |
| JP | 6-19649 | 1/1994 |
| JP | 10-65867 | 3/1998 |
| JP | 10-108005 | 4/1998 |
| JP | 11-143652 | 5/1999 |
| JP | 2000-118086 | 4/2000 |
| JP | 2000-151756 | 5/2000 |
| JP | 2001-238105 | 8/2001 |
| JP | 2001-268305 | 9/2001 |
| JP | 2001-290612 | 10/2001 |
| JP | 2001-333363 A | 11/2001 |
| JP | 2002-44311 | 2/2002 |
| JP | 2002-57936 | 2/2002 |
| JP | 2002-67106 | 3/2002 |
| JP | 2002-144681 | 5/2002 |
| JP | 2002-211049 | 7/2002 |
| JP | 2002-268842 | 9/2002 |
| JP | 2002-320173 | 10/2002 |
| JP | 2002-326433 | 11/2002 |
| JP | 2001-147790 | 5/2004 |
| JP | 2004-185137 | 7/2004 |
| WO | WO 97/50243 | 12/1997 |
| WO | WO 02/067106 A1 | 8/2002 |

OTHER PUBLICATIONS

English translation of Japanese Patent Laid Open No. 6-19649, Jan. 28, 1994.

English translation of Japanese Patent Laid Open No. 2002-211049 A, Jul. 31, 2002.

English translation of Japanese Patent Laid Open No. 2001-147790, May 29, 2001.

Jan. 21, 2005, Office Action issued in Japanese Patent Application No. 2002-348783.

European Search Report issued by the European Patent Office on Mar. 1, 2007, in European Patent Application No. 03775907.3.

Japanese Action issued Jan. 8, 2008, in Japanese Application No. 2005-082710.

Japanese Office Action issued Sep. 26, 2008, in Japanese Application No. 2002-348783.

Photographic and Imaging Manufacturers Association, Inc., "Photography—Electronic still picture imaging—Picture Transfer Protocol (PTP) for Digital Still Photography Devices," 1st Edition, Jul. 5, 2000 (159 pages).

Camera User Guide (104 pages).

International Search Report in PCT/JP03/15094.

Japanese Office Action dated Jun. 27, 2008, in Japanese Patent Application No. 2005-082711.

Questioning dated May 26, 2008 in Japanese Patent Application No. 2002-348783.

Japanese Office Action dated Mar. 24, 2008, in Japanese Patent Application No. 2005-082711.

* cited by examiner

FIG. 15A

| INDISPENSABLE FUNCTION | | | | |
|---|---|---|---|---|
| ISSUANCE | | FUNCTION NAME | FUNCTION | |
| SOURCE | DESTINATION | | | |
| INITIALIZE | INITIALIZE | CDPS_ServiceDiscovery | TRANSITION TO CDPS | |
| PRINT CONTROLLER | OPERATION CONTROLLER | CDPS_Service | NOTIFY PRINTER FUNCTION | |
| PRINT CONTROLLER | OPERATION CONTROLLER | CDPS_PageStart | NOTIFY PRINT START (UPON FEEDING PAPER FOR EACH PAGE) | |
| PRINT CONTROLLER | OPERATION CONTROLLER | CDPS_PageEnd | NOTIFY PRINT END (UPON DISCHARGING PAPER FOR EACH PAGE) | |
| PRINT CONTROLLER | OPERATION CONTROLLER | CDPS_JobEnd | NOTIFY END OF PRINT JOB | |
| PRINT CONTROLLER | OPERATION CONTROLLER | CDPS_Error | NOTIFY ERROR (Warning/Fatal) | |
| PRINT CONTROLLER | STORAGE | CDPS_JobData | ACQUIRE IMAGE (jpeg, ETC.) FROM Storage | |
| OPERATION CONTROLLER | STORAGE | CDPS_DataList | ACQUIRE INFORMATION LIST (jpeg, ETC.) FROM Storage | |
| OPERATION CONTROLLER | PRINT CONTROLLER | CDPS_Job | PRINT COMMAND | |
| OPERATION CONTROLLER | PRINT CONTROLLER | CDPS_JobAbort | PRINT ABORT COMMAND | |
| OPERATION CONTROLLER | PRINT CONTROLLER | CDPS_JobContinue | PRINT RESTART COMMAND | |

FIG. 15B

| OPTION FUNCTION | | | |
|---|---|---|---|
| ISSUANCE | | FUNCTION NAME | FUNCTION |
| SOURCE | DESTINATION | | |
| PRINT CONTROLLER | STORAGE | CDPS_PartialJobData | ACQUIRE PARTIAL IMAGE (jpeg, ETC.) FROM Storage |

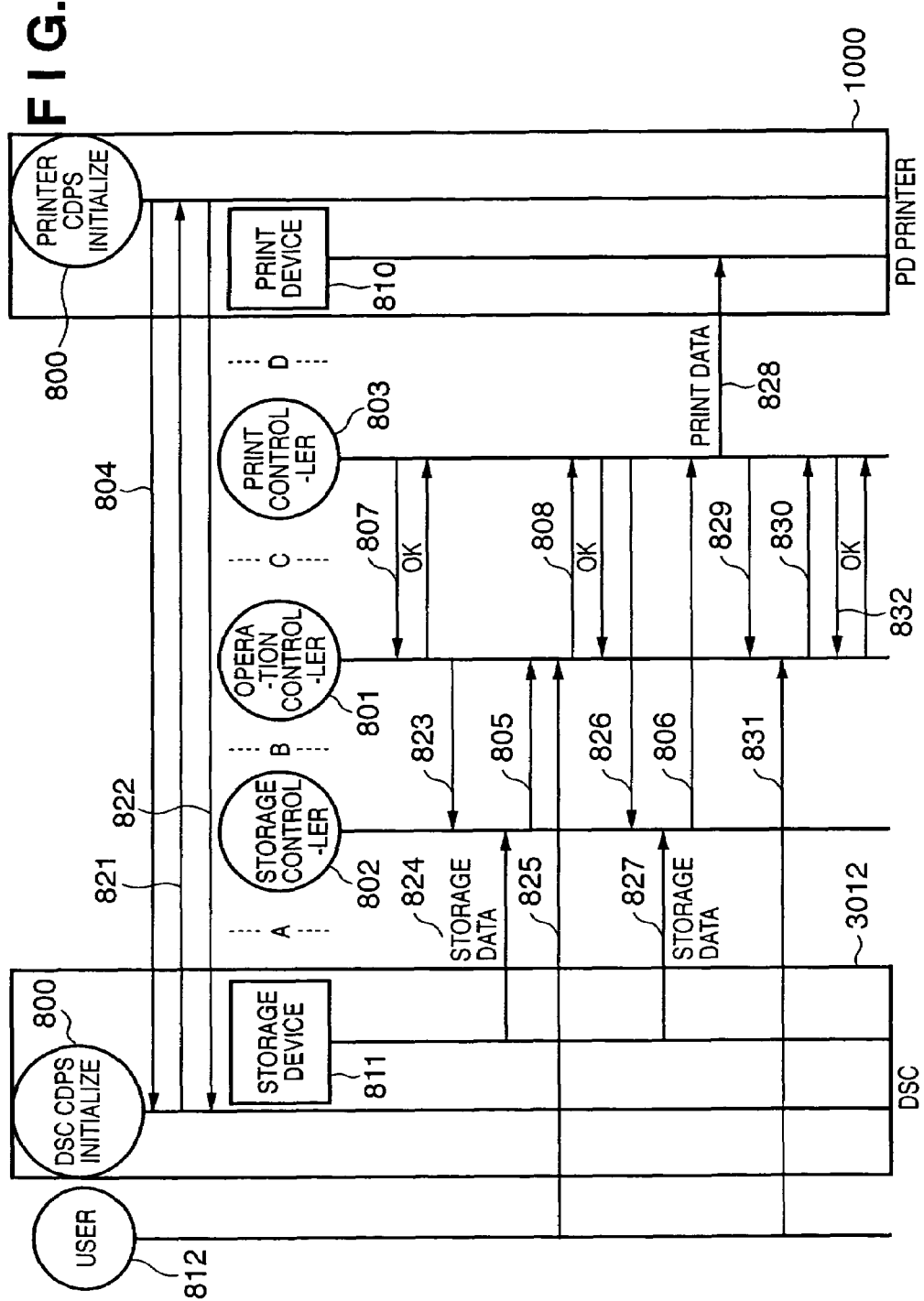

FIG. 44A

| | |
|---|---|
| 4 | Use DSC's |
| 3 | Viewer & Button |
| 2 | Button |
| 1 | Minimum |
| 0 | No Support |

FIG. 44B

| | |
|---|---|
| 4 | Use DSC's |
| 3 | Handle |
| 2 | File System |
| 1 | Physical Access |
| 0 | No Support |

FIG. 44C

| | |
|---|---|
| 4 | Use DSC's |
| 3 | Rendering |
| 2 | Halftoning |
| 1 | Encoding |
| 0 | No Support |

FIG. 45

```
[ HDR ]
GEN REV = 01. 10
GEN CRT = "DIGITALCAMERA S30" −01. 00
GEN DTM = 2002 : 07 : 31 : 14 : 48 : 49

[ JOB ]
PRT PID = 001
PRT TYP = STD
PRT QTY = 002
IMG FMT = EXIF2 ↵
< IMG SRC = ". . / DCIM / 105GANON / IMG_0572. JPG" >

[ JOB ]
PRT PID = 002
PRT TYP = STD
PRT QTY = 001
IMG FMT = EXIF2 ↵
< IMG SRC = ". . / DCIM / 105GANON / IMG_0573. JPG" >
```

IMAGE SUPPLY DEVICE, RECORDING SYSTEM, AND RECORDING CONTROL METHOD

TECHNICAL FIELD

The present invention relates to a technique for recording an image in accordance with a recording instruction from an image supply device such as a digital camera or the like.

BACKGROUND ART

In recent years, digital cameras (image sensing devices) which can sense images and convert them into digital image data by simple operations have been prevalent. When an image sensed by such camera is printed and is used as a photo, it is a common practice to temporarily download the sensed digital image data from a digital camera to a PC (computer), to execute an image process by that PC, and to output the processed image data from the PC to a color printer, thus printing an image.

By contrast, a color print system which allows a digital camera to directly transfer digital image data to a color printer without the intervention of any PC and can print it out, a color printer, i.e., a so-called photo-direct (PD) printer which can receive a memory card, which is mounted on a digital camera and stores sensed images, and can print sensed images stored in the memory card, and the like have recently been developed.

A print system that prints an image sensed by a digital camera designates an image to be printed, the number of copies to be printed, and the like using DPOF. That is, the digital camera saves select information of an image (images) to be printed, its procedure, and the like on a storage medium such as a memory card or the like that stores sensed image data, and the digital camera which mounts the storage medium is connected to a printer or the storage medium itself is mounted on the printer, thus allowing a print process under desired print conditions without the intervention of any PC. The contents held on the storage medium include image information to be printed, print conditions such as the paper size, the number of copies, and the like, and so forth. However, since the digital camera normally generates a DPOF file in offline (without being connected to the printer), there is no guarantee that a print process according to the print conditions set by that DPOF is realized by the connected printer. For this reason, the print process cannot often be made under the print conditions set by the DPOF.

DISCLOSURE OF THE INVENTION

The present invention has been made in consideration of the aforementioned prior arts, and has features to execute a recording process using a recording condition of image data stored in a storage medium, and another recording condition that uses the functions of a recording apparatus, which is connected to an image supply device and is used in the recording process.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIGS. 15A and 15B depicts views for explaining function commands in the CDPS according to the embodiment of the present invention;

FIG. 16 is a flow chart for explaining service functions and the flow of processes between the DSC and PD printer in the CDPS according to the embodiment of the present invention;

FIGS. 44A to 44C depict tables for explaining the support levels of the DSC and PD printer, which serve as criteria upon determining how to assign various control functions (operation controller, storage controller, and print controller);

FIG. 45 depicts a view for explaining an example of a DPOF file;

BEST MODE FOR CARRYING OUT THE INVENTION

Preferred embodiments of the present invention will now be described in detail in accordance with the accompanying drawings.

Figure 1:
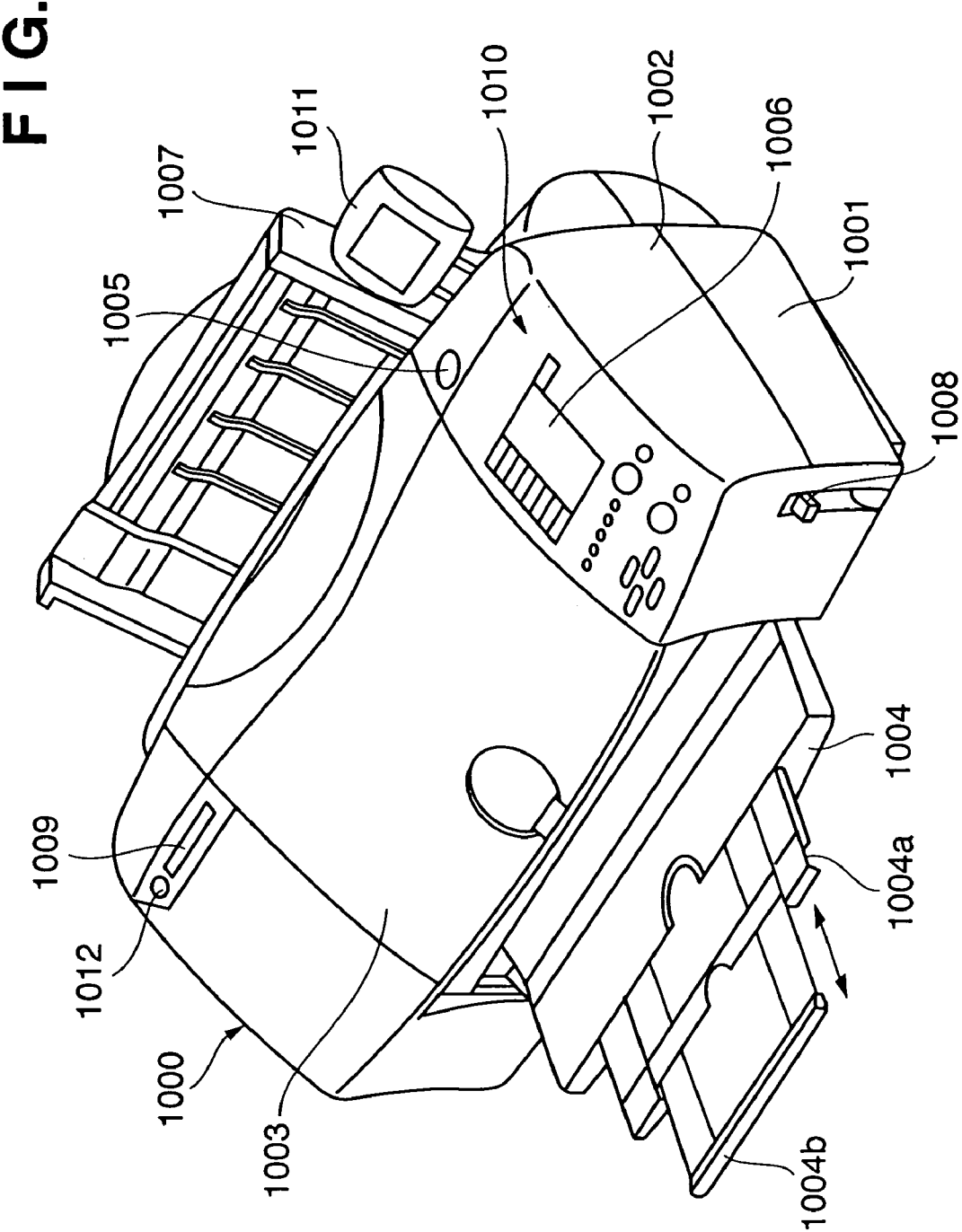
FIG. 1 depicts a schematic perspective view of a PD printer according to an embodiment of the present invention.

FIG. 1 depicts a schematic perspective view of a photo direct printer apparatus (to be referred to as a PD printer hereinafter) 1000 according to an embodiment of the present invention. This PD printer 1000 has a function of printing data received from a host computer (PC) as a normal PC printer, and a function of printing image data directly read from a storage medium such as a memory card or the like, and printing image data received from a digital camera.

Referring to FIG. 1, a main body which forms a housing of the PD printer 1000 according to this embodiment has a lower case 1001, upper case 1002, access cover 1003, and exhaust tray 1004 as exterior members. The lower case 1001 nearly forms the lower half portion of the PD printer 1000, and the upper case 1002 nearly forms the upper half portion of the main body. By combining these cases, a hollow structure which has a storage space that stores mechanisms to be described later is formed. Openings are respectively formed on the upper and front surfaces of the main body. One end portion of the exhaust tray 1004 is rotatably held by the lower case 1001, and rotation of the tray 1004 opens/closes the opening formed on the front surface of the lower case 1001. For this reason, upon making the printer execute a print operation, the exhaust tray 1004 is rotated toward the front surface side to open the opening. As a result, print sheets can be exhausted from the opening, and be stacked on the exhaust trays 1004 in turn. The exhaust tray 1004 stores two auxiliary trays 1004a and 1004b. When these auxiliary trays are pulled out as needed, the loading area of print sheets can be enlarged/reduced in three steps.

One end portion of the access cover 1003 is rotatably held by the upper case 1002 to be able to open/close the opening formed on the upper surface of the main body. When the access cover 1003 is opened, a printhead cartridge (not shown), ink tanks (not shown), or the like housed in the main body can be exchanged. Although not shown, when the access cover 1003 is opened/closed, a projection formed on the rear surface of the cover 1003 rotates a cover open/close lever. By detecting the rotation position of that lever using a microswitch or the like, the open/close state of the access cover is detected.

A power key 1005 is arranged on the upper surface of the upper case 1002. A control panel 1010 which comprises a liquid crystal display 1006, various key switches, and the like is provided on the right side of the upper case 1002. The structure of the control panel 1010 will be described in detail later with reference to FIG. 2. Reference numeral 1007 denotes an automatic feeder which automatically feeds a print sheet into the apparatus main body. Reference numeral 1008 denotes a paper gap select lever which is used to adjust the gap between the printhead and print sheet. Reference numeral 1009 denotes a card slot which receives an adapter that can receive a memory card. Via this adapter, image data stored in the memory card can be directly fetched and printed. As this memory card (PC), for example, a compact flash™ memory card, smart media card, memory stick, and the like are available. Reference numeral 1011 denotes a viewer (liquid crystal display unit) which is detachable from the main body of this PD printer 1000, and is used to display an image for one frame, index image, and the like, when the user wants to search images stored in the PC card for an image to print. Reference numeral 1012 denotes a USB terminal used to connect a digital camera (to be described later). Also, another USB connector used to connect a personal computer (PC) is provided on the rear surface of this PD printer 1000.

Figure 2:
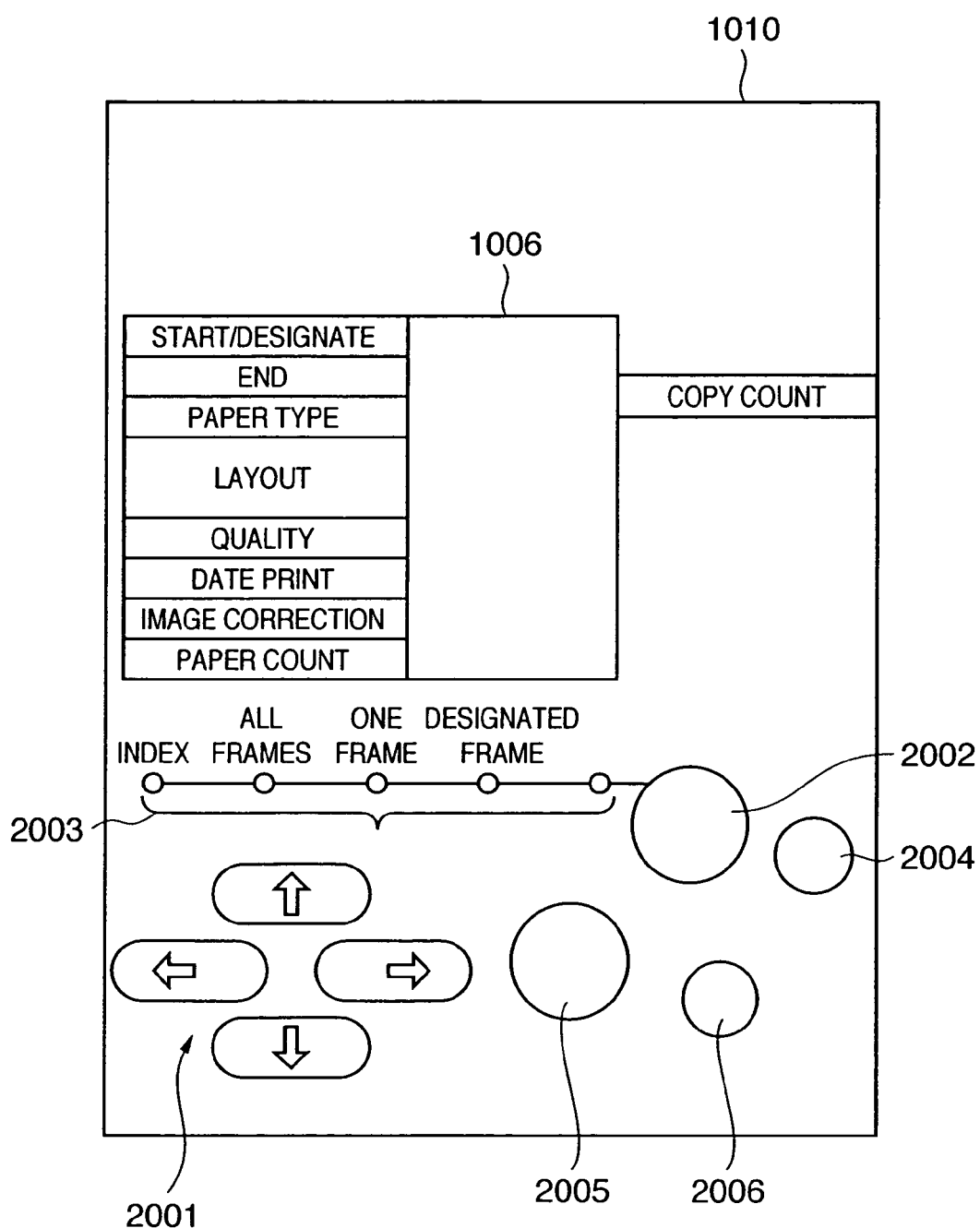
FIG. 2 depicts a schematic view of a control panel of the PD printer according to the embodiment of the present invention.

FIG. 2 depicts a schematic view of the control panel 1010 of the PD printer 1000 according to this embodiment.

Referring to FIG. 2, the liquid crystal display unit 1006 displays menu items used to set data associated with item names printed on the right and left sides of the unit 1006. The items printed here include, e.g., the first photo number or designated frame number of the images to be printed (start frame designation/print frame designation), the last photo number of the images to be printed (end), the number of copies to be printed (copy count), the type of paper sheet (print sheet) used in a print process (paper type), the setup of the number of photos to be printed per print sheet (layout), designation of print quality (quality), designation as to whether or not to print a photographing date (date print), designation as to whether or not to print a photo after correction (image correction), display of the number of print sheets required for the print process (print sheet count), and the like. These items are selected or designated using cursor keys 2001. Reference numeral 2002 denotes a mode key. Every time this key is pressed, the type of print (index print, all-frame print, one-frame print, and the like) can be switched, and a corresponding one of LEDs 2003 is turned on in accordance with the selected type of print. Reference numeral 2004 denotes a maintenance key which is used to do maintenance of the printer (e.g., cleaning of the printhead, and the like). Reference numeral 2005 denotes a print start key which is pressed when the start of a print process is instructed or when the maintenance setup is settled. Reference numeral 2006 denotes a print cancel key which is pressed when a print process or maintenance process is canceled.

The arrangement of principal part associated with the control of the PD printer 1000 according to this embodiment will be described below with reference to FIG. 3. Note that the same reference numerals in FIG. 3 denote parts common to those in the above drawings, and a description thereof will be omitted.

Figure 3:
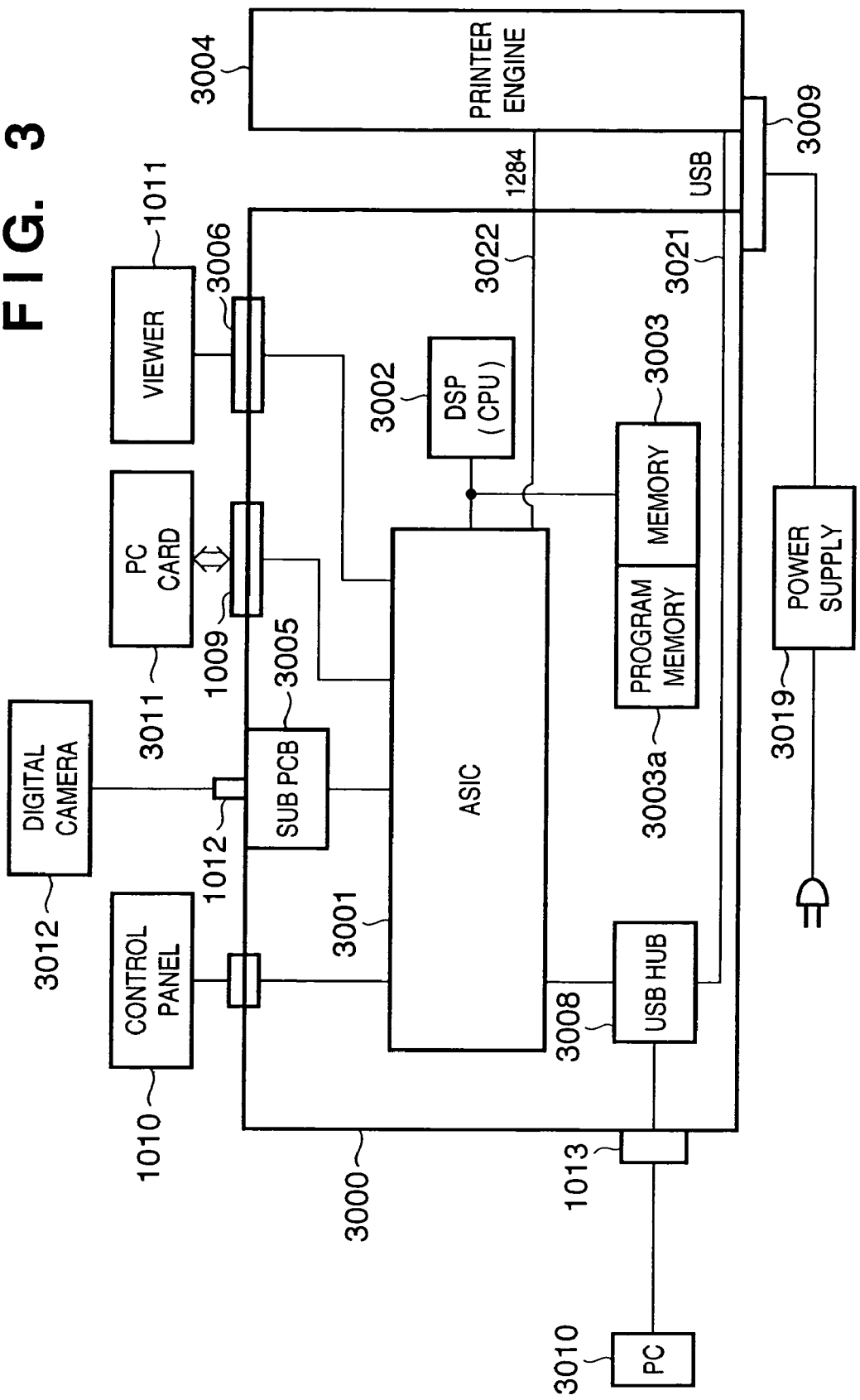
FIG. 3 is a block diagram showing the arrangement of principal part associated with control of the PD printer according to the embodiment of the present invention.

FIG. 3 is a block diagram showing the arrangement of principal part associated with control of the PD printer according to the embodiment.

Referring to FIG. 3, reference numeral 3000 denotes a controller (control board). Reference numeral 3001 denotes an ASIC (dedicated custom LSI). The arrangement of the ASIC 3001 will be described later with reference to the block diagram of FIG. 4. Reference numeral 3002 denotes a DSP (digital signal processor), which includes a CPU and executes various control processes to be described later, and image processes such as conversion from a luminance signal (RGB) into a density signal (CMYK), scaling, gamma conversion, error diffusion, and the like. Reference numeral 3003 denotes a memory, which has a memory area that serves as a program memory 3003a for storing a control program to be executed by the CPU of the DSP 3002, a RAM area for storing a running program, and a work area for storing image data and the like. Reference numeral 3004 denotes a printer engine. In this embodiment, the printer is equipped with a printer engine of an ink-jet printer which prints a color image using a plurality of color inks. Reference numeral 3005 denotes a USB connector as a port for connecting a digital camera (DSC) 3012. Reference numeral 3006 denotes a connector for connecting the viewer 1011. Reference numeral 3008 denotes a USB hub (USB HUB). When the PD printer 1000 executes a print process based on image data from a PC 3010, the USB hub 3008 allows data received from the PC 3010 to pass through it, and outputs the data to the printer engine 3004 via a USB 3021. In this way, the PC 3010 connected to the printer can execute a print process by directly exchanging data, signals, and the like with the printer engine 3004 (the printer serves as a normal PC printer). Reference numeral 3009 denotes a power supply connector, which inputs a DC voltage converted from commercial AC power by a power supply 3019. The PC 3010 is a general personal computer. Reference numeral 3011 denotes a memory card (PC card) mentioned above; and 3012, a digital camera (to be also referred to as a DSC: Digital Still Camera).

Note that signals are exchanged between this controller 3000 and printer engine 3004 via the USB 3021 or an IEEE1284 bus 3022.

Figure 4:
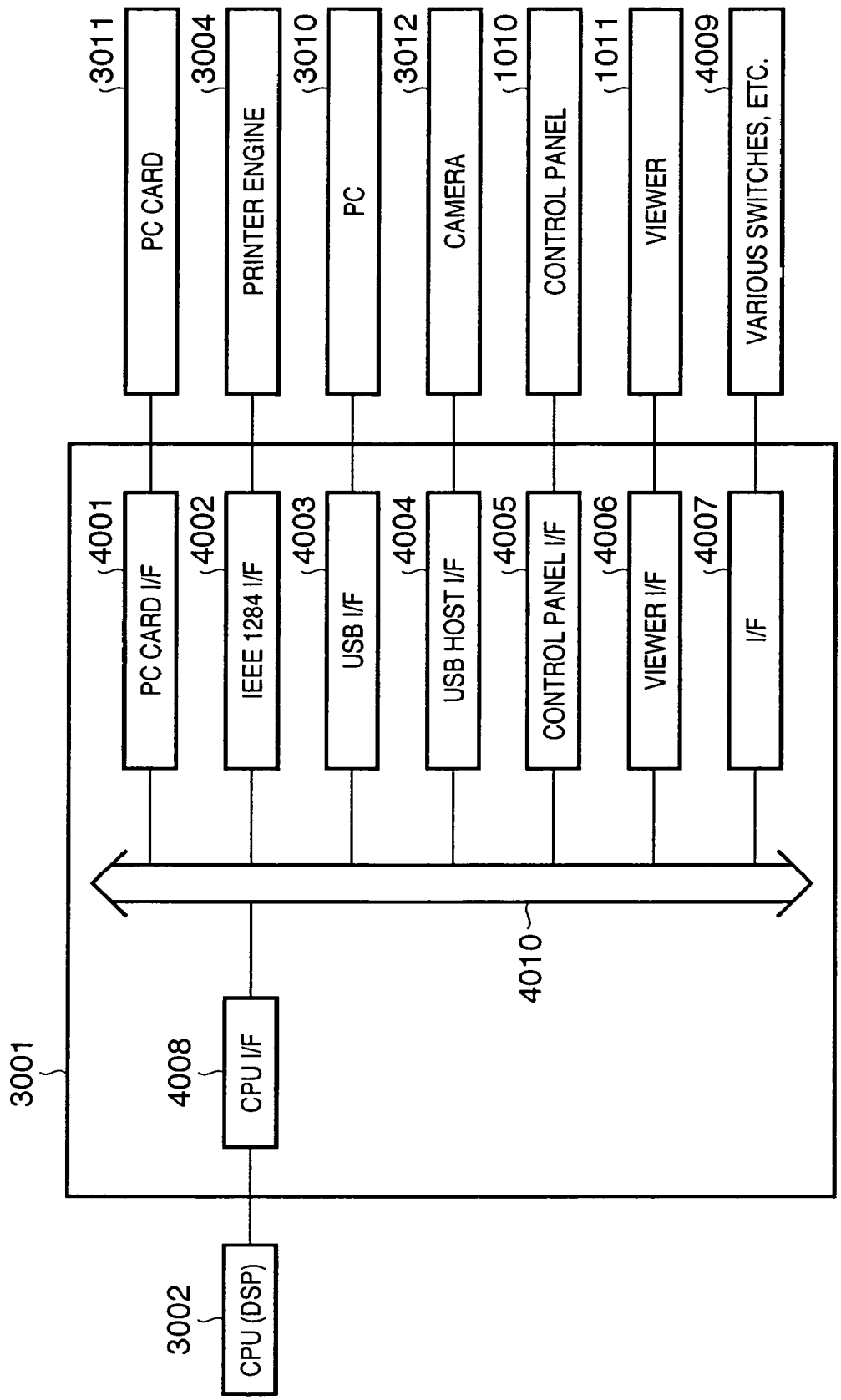
FIG. 4 is a block diagram showing the arrangement of an ASIC of the PD printer according to the embodiment of the present invention.

FIG. 4 is a block diagram showing the arrangement of the ASIC 3001. In FIG. 4 as well, the same reference numerals denote parts common to those in the above drawings, and a description thereof will be omitted.

Reference numeral 4001 denotes a PC card interface, which is used to read image data stored in the inserted PC card 3011, and to write data in the PC card 3011. Reference numeral 4002 denotes an IEEE1284 interface, which is used to exchange data with the printer engine 3004. This IEEE1284 interface 4002 is a bus used when image data stored in the digital camera 3012 or PC card 3011 is to be printed. Reference numeral 4003 denotes a USB interface, which exchanges data with the PC 3010. Reference numeral 4004 denotes a USB host interface, which exchanges data with the digital camera 3012. Reference numeral 4005 denotes a control panel interface, which receives various operation signals from the control panel 1010, and outputs display data to the display unit 1006. Reference numeral 4006 denotes a viewer interface, which controls display of image data on the viewer 1011. Reference numeral 4007 denotes an interface, which controls interfaces with various switches, LEDs 4009, and the like. Reference numeral 4008 denotes a CPU interface, which exchanges data with the DSP 3002. Reference numeral 4010 denotes an internal bus (ASIC bus), which interconnects these interfaces.

Figure 5:
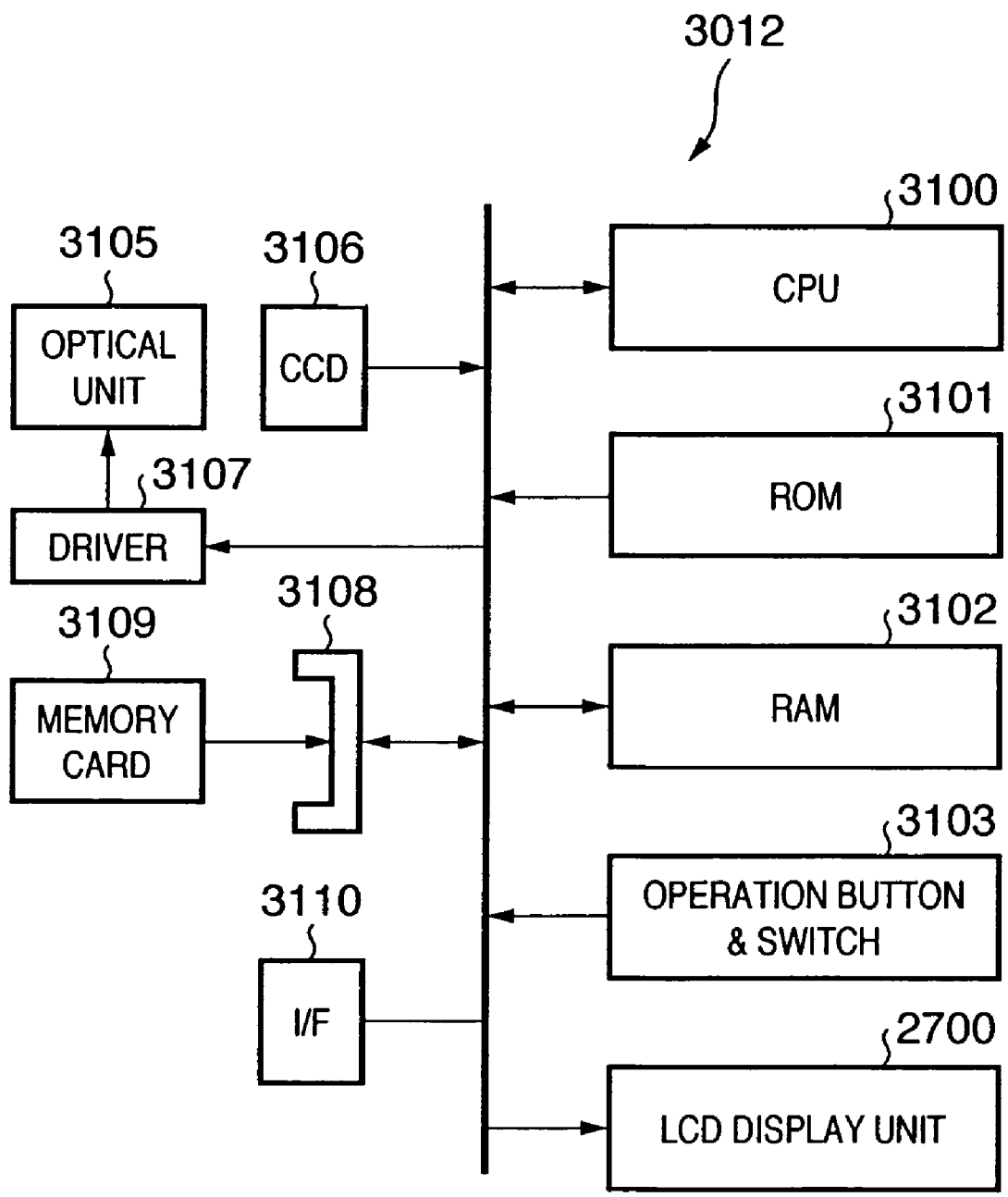
FIG. 5 is a block diagram showing the arrangement of a digital camera according to the embodiment of the present invention.

FIG. 5 is a block diagram showing an example of the typical arrangement of the digital camera (DSC) 3012. Note that some models of digital cameras which can be connected to the PD printer 1000 of this embodiment may not have a display unit 2700 (to be described later.

Referring to FIG. 5, reference numeral 3100 denotes a CPU which controls the overall DSC 3012; and numeral 3101 denotes a ROM that stores the processing sequence of the CPU 3100. Reference numeral 3102 denotes a RAM which is used as a work area of the CPU 3100; and numeral 3103 denotes a switch group used to make various operations. The switch group 3103 includes various switches, cursor keys, and the like. Reference numeral 2700 denotes a liquid crystal display, which is used to confirm a sensed image, and to display a menu upon making various setups. Reference numeral 3105 denotes an optical unit which mainly comprises a lens and its drive system. Reference numeral 3106 denotes a CCD element; and numeral 3107 denotes a driver which controls the optical unit 36 under the control of the CPU 3100. Reference numeral 3108 denotes a connector that connects a storage medium 3109 (compact flash™ memory card, smart media card, or the like); and numeral 3110 denotes a USB interface (USB slave side) used to connect the PC or PD printer 1000 of this embodiment.

This embodiment will mainly exemplify a case wherein a print process is executed by connecting the aforementioned PD printer 1000 and DSC 3012. This embodiment has as its object to provide a PD printer apparatus which allows an image output apparatus such as this PD printer 1000 to connect devices (DSPD: Digital Still Photography Devices) such as digital cameras, cellular phones (portable phones), memory devices, and the like of respective manufacturers, and can print based on image data acquired from such devices, and will describe communication specifications when a print process is executed by connecting the PD printer 1000 according to this embodiment and the DSC 3012 as an example of such DSPD. Note that this embodiment proposes a novel CDPS (Canon Direct Print Service) which makes communication control between the PD printer and DSC using a versatile file and versatile format, and does not depend on any interfaces.

This embodiment uses the concept of a print service function so as to make arrangements with various communication architectures (e.g., PTP (Picture Transfer Protocol) of Still Image Class on USB, OBEX on Mass Storage Class or Bluetooth, UPnP, and the like) between the DSC and image output apparatus. The print service function is an aggregate of execution functions in the application layer, and does not depend on various interfaces.

Also, communication control between actual image data and devices does not depend on any interfaces since it is made using a versatile file and versatile format (e.g., described using an XML format).

In such system that connects the DSC and image output apparatus, its operation is made using an operation unit (e.g., switches and liquid crystal display of the digital camera or the control panel of the printer) of either one of the DSC and image output apparatus. In the whole system, if two devices have similar functions, one of the devices, which is used to instruct the other device to execute that operation, must be determined. Hence, in the system according to this embodiment, a scheme for determining how to assign the operation unit and other functions between the two devices is adopted after a Discovery process (transition process; to be described later), thus widening the versatility.

[Description of Outline of Communication]

Figure 6:
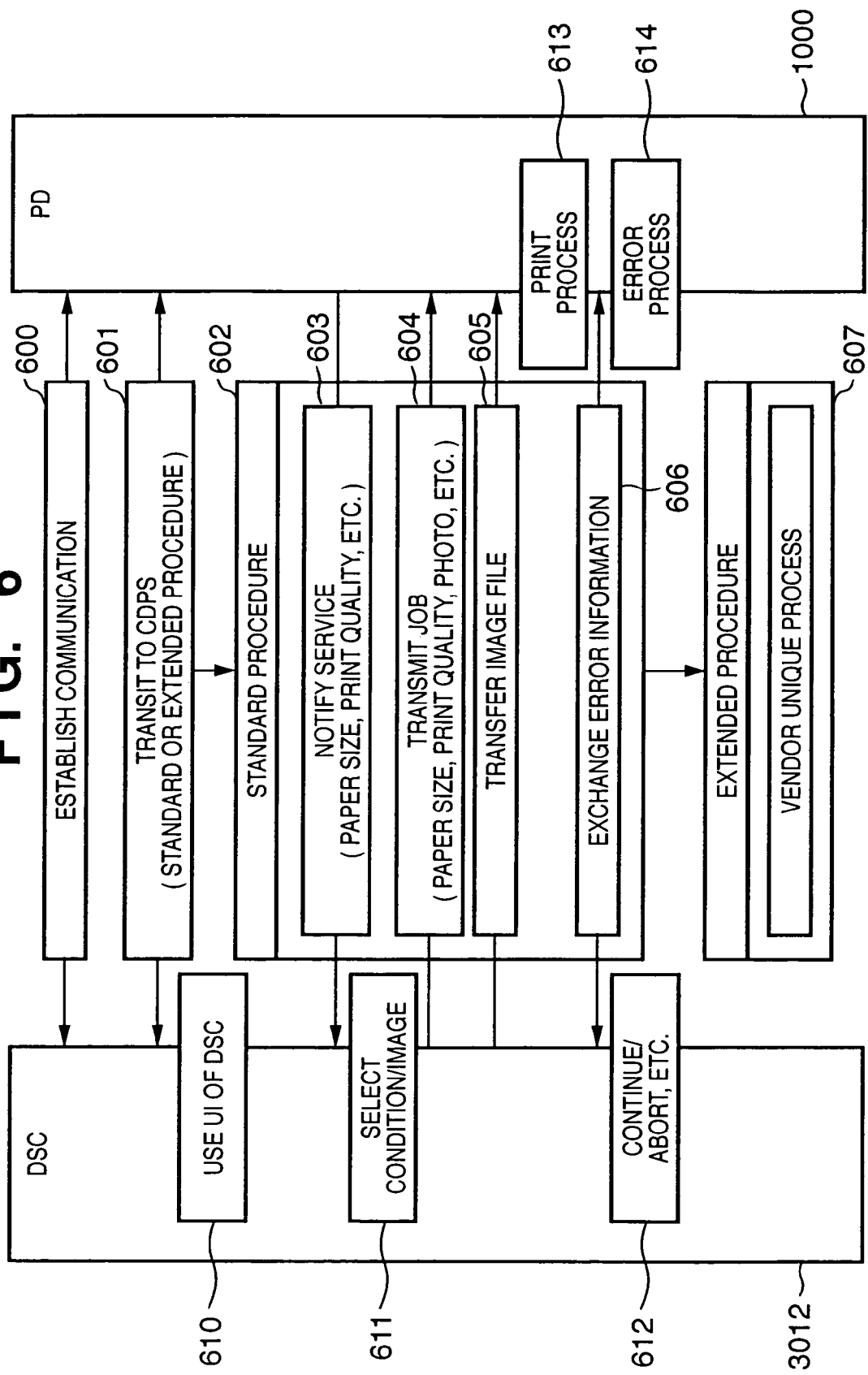
FIG. 6 depicts a chart for explaining an outline of a CDPS communication procedure according to the embodiment of the present invention.

FIG. 6 is a chart for explaining an outline of a communication between the digital camera (DSC) 3012 according to this embodiment, and the PD printer 1000 according to this embodiment as a typical example of the image output apparatus. Note that the DSC 3012 and PD printer 1000 are connected via USB, and a communication between them uses PTP. In this USB connection, the PD printer 1000 serves as the host side, and the DSC 3012 serves as the slave side.

This procedure will be described in turn below. Note that a case will be exemplified below wherein the DSC 3012 has the arrangement shown in FIG. 5 above, and is used to set auxiliary print conditions in a print process and issue a print start instruction.

(1) Initially, the DSC 3012 and PD printer 1000 are physically connected using a USB cable.

(2) A USB host controller (USB task) of the PD printer 1000 recognizes the DSC 3012, and establishes connection in Image Class/PTP. This state corresponds to "establish communication" 600 in FIG. 6.

(3) Next, a process (601) for shifting the control to the communication specifications (CDPS) defined by this embodiment starts. At this time, it is confirmed and determined whether or not the CDPS service can be implemented between the DSC 3012 and PD printer 1000, based on information exchanged between them. If the service can be implemented, it is determined (610) whether the service is implemented in a "standard" or "extended" procedure. Also, in this process 601, it is determined which of the DSC 3012 and PD printer 1000 is used to determine a print image, to set print conditions, to issue a print start instruction, and so forth.

(4) When the service is implemented in a "standard" procedure 602 as a result of the process 601, the PD printer 1000 notifies the DSC 3012 of "services that the printer side can provide" (603). More specifically, paper sizes, paper types, print qualities, combinations that allow layouts, and the like are notified.

(5) The DSC 3012 generates a UI menu to be operated by the user in accordance with the service contents received in 603, and displays it on the display unit 2700. As a result, the user makes setups of a print image and selection of a photo (which will be generally referred to as a "job" hereinafter) via the UI menu (611).

(6) Upon completion of "job" setups in this way, when the user issues a print start instruction at the DSC 3012, the DSC 3012 sends a "job" to the PD printer 1000 (604).

(7) The PD printer 1000 sets up itself in accordance with the contents of the "job" received in 604, and acquires a required image file from the DSC 3012 (605) to print a photo (613).

(8) If an error has occurred in the PD printer 1000 during execution of the "job", the PD printer 1000 notifies the DSC 3012 of the contents of the error that has occurred so as to demand the user to take an action (606) (to select "continue/abort print" in this embodiment). When the user determines an action to be taken using the UI of the DSC 3012 (612), the determined contents are sent to the PD printer 1000 to execute a corresponding error process 614.

(9) When the "job" is completed by repeating transfer of an image file and a print process (→transmit/receive errors) in this way, the DSC 3012 is set in a "job" setting state again.

(10) When it is determined in 610 above that the service is to be implemented in the CDPS "extended procedure", a procedure and "extended" process (607) unique to each vendor are executed. Since the process in the "extended procedure" is specified by each vendor, a description thereof will be omitted.

[Hierarchical Structure]

Figure 7:
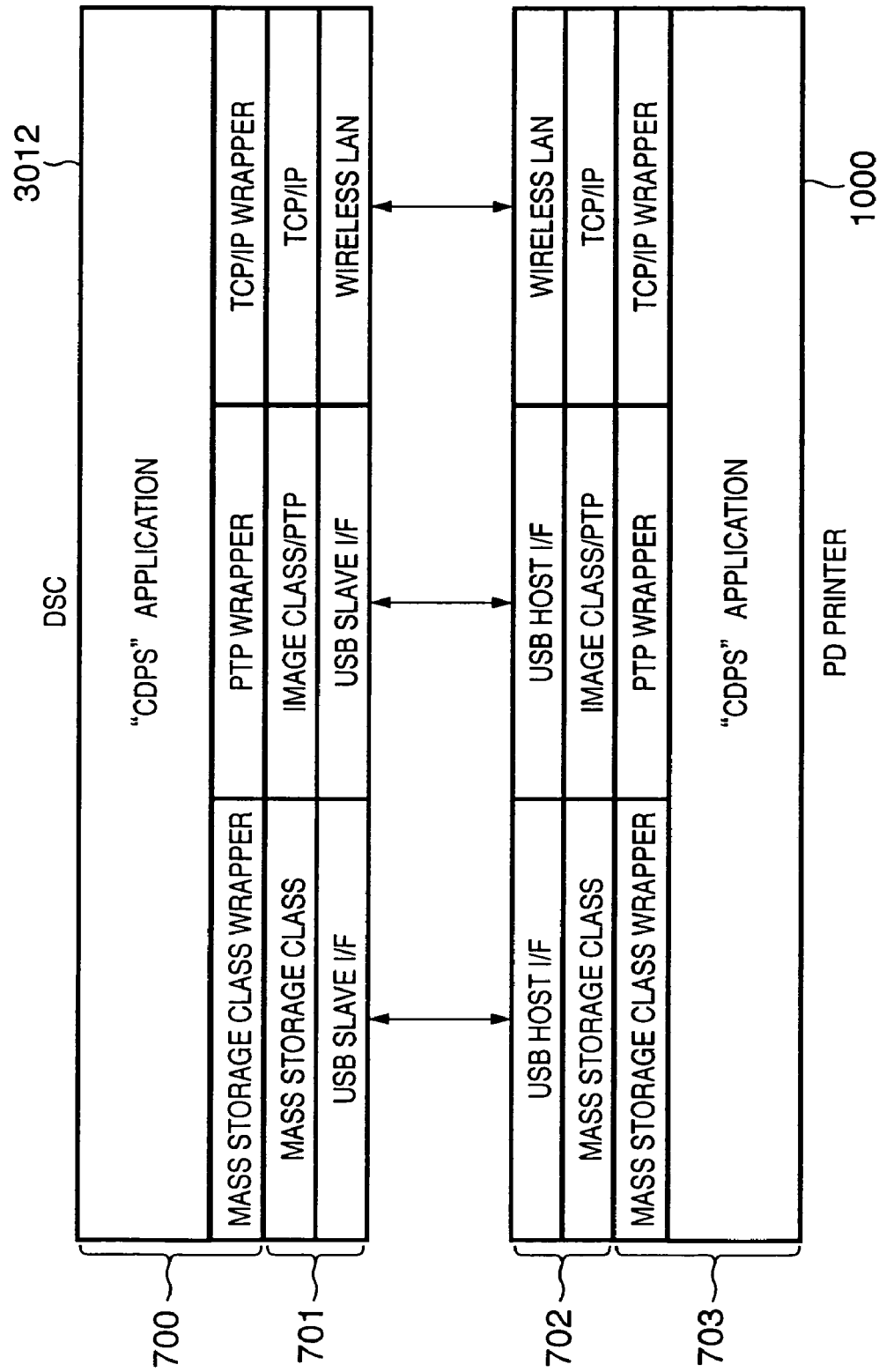
FIG. 7 depicts a schematic diagram for explaining the interfaces and software configurations of the PD printer and digital camera, which incorporate the CDPS according to the embodiment of the present invention.

FIG. 7 depicts the hierarchical structure of functions when the DSC 3012 and the PD printer 1000 as a typical image output apparatus are connected.

Referring to FIG. 7, reference numerals 700 and 703 denote applications; and numerals 701 and 702 denote physical layers as an example of USB and Bluetooth. The DSC 3012 and PD printer 1000 can build the CDPS system of this embodiment by respectively installing the applications 700 and 703. Note that this system is premised on installation of architectures such as PTP of the protocol layer, file systems on BIP and MSC (Mass Storage Class), and the like, as shown in the layers 701 and 702. Also, the substance of this print service function is present in the applications 700 and 703, and the print service function is executed in modules for converting from the CDPS into respective protocols.

In this way, the direct print service can be implemented independently of any physical interfaces.

[Function of Overall System]

Figure 8:
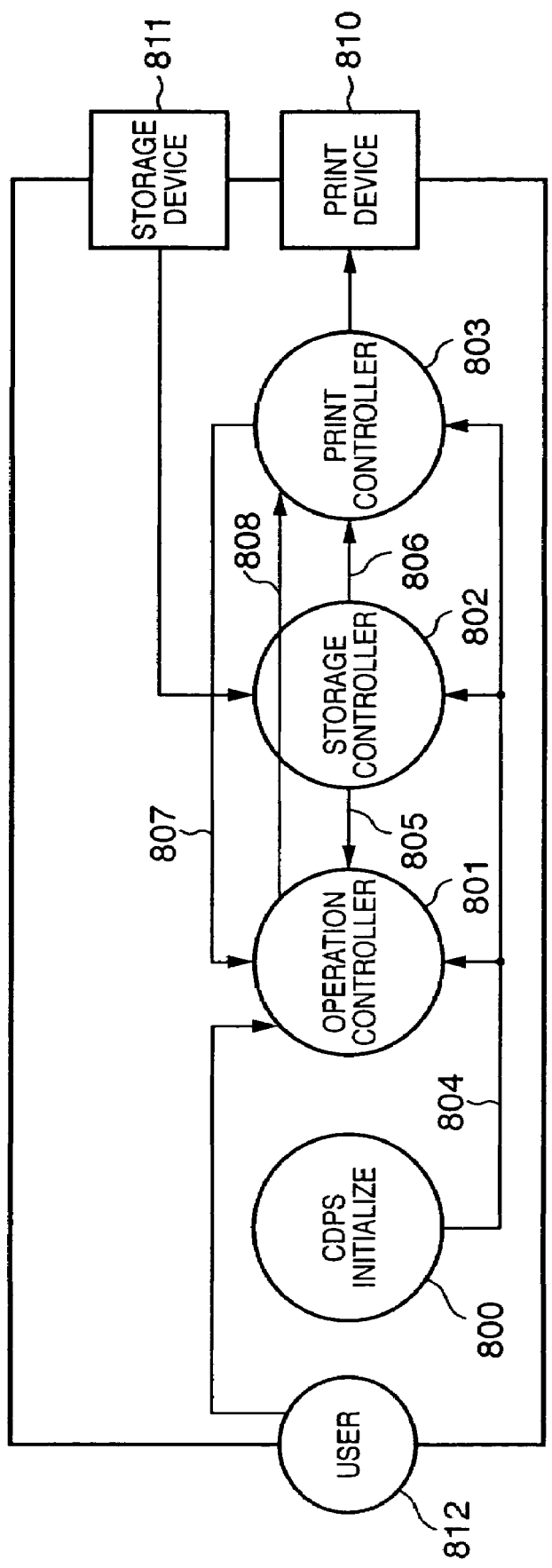
FIG. 8 depicts a schematic diagram of service functions in the CDPS according to the embodiment of the present invention.

FIG. 8 depicts a diagram showing the functional arrangement when the connected DSC 3012 and PD printer 1000 are considered as an integrated system.

After the aforementioned hierarchical structure specifies that the system does not depend on any interfaces, elements (objects) of higher levels are defined so as to realize independence from "functions" of DSPDs and the image output apparatus. In this embodiment, various functions are not separated or exclusively assigned between the DSC 3012 and PD printer 1000, and the functional arrangement and objects required for the whole direct print system are defined. Functions and roles will be explained below.

In this embodiment, the functions of the whole system are roughly classified into four functions (800 to 803).

<CDPS Initialize Process (CDPS Initialize) 800>

A CDPS initialize process 800 is launched first prior to other CDPS functions. This process checks transition (standard/extended) to a CDPS mode and the like, and sends the checking result to respective functions as "Service Discovery" 804. This process corresponds to 601 in FIG. 6 above.

<Operation Control (Operation Controller) 801>

Management (Operation Controller) 801 of the UI that interacts with a user 812 is launched upon reception of "ServiceDiscovery" 804 from the CDPS initialize process 800. This operation controller 801 acquires services "Service" 807 that can be printed by a print device 810 (printer engine 3004) from print control (Print Controller) 803, and acquires an image information list "Datalist" 805 held by a storage device 811 (e.g., the PC card 3011) from storage control (Storage Controller) 802. The operation controller 801 generates a UI menu based on the descriptions of these "Service" 807 and "DataList" 805. The operation controller 801 generates an output setting instruction "Job" 808 on the basis of user's instructions input via the UI menu generated in this way, and sends it to the print controller 803.

<Storage Control (Storage Controller) 802>

The storage controller 802 manages a storage medium (e.g., the PC card 3011) that holds photo images. This storage controller 802 is launched upon reception of "ServiceDiscovery" 804 from the CDPS initialize process 800. The storage controller 802 generates the image information list "DataList" 805 held in the storage device 811 in accordance with a request from the operation controller 801, and sends it to the operation controller 801. Also, the storage controller 802 outputs an image file "JobData" 806 saved in the storage device 811 to the print controller 803 in accordance with a request from the print controller 803.

<Print Control (Print Controller) 803>

The print controller 803 manages the print device 810 that prints a photo image. This print controller 803 is launched upon reception of "ServiceDiscovery" 804 from the CDPS initialize process 800, and sends services "Service" 807 that can be printed by the print device 810 to the operation controller 801. Upon acquisition of an output setting instruction "Job" 808 from the operation controller 801, the print controller 803 requests the storage controller 802 of an image file "JobData" 806 saved in the storage device 811 on the basis of the description of that "Job" 808 using a description method described in the "DataList" 805, and acquires that image file. The print device 801 generates print data that can be processed, and outputs it to the print device 810, thus printing an image.

Figure 9:
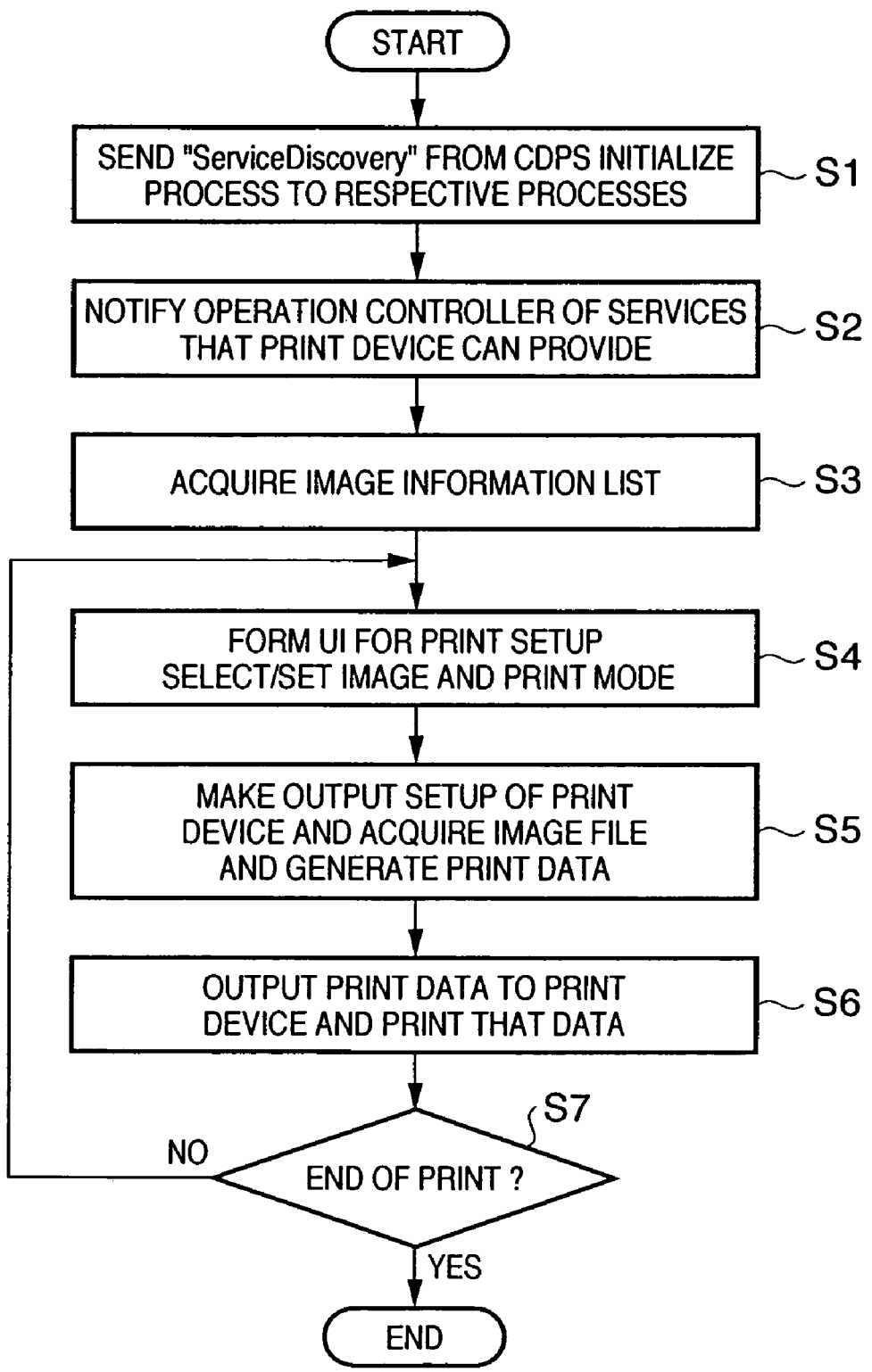
FIG. 9 is a flow chart for explaining an outline of the processes up to a print process in the CDPS according to the embodiment of the present invention.

FIG. 9 is a flow chart for explaining the flow of processes by the respective functions in FIG. 8.

In step S1, the CDPS initialize process 800 checks if the system can transit to the CDPS mode, and sends "ServiceDiscovery" 804 to the respective functions based on the checking result, thus launching the respective functions. The flow then advances to step S2, and the print controller 803 print services "Service" 807 that the print device 810 can provide to the operation controller 801. The flow advances to step S3, and the operation controller 801 acquires an image information list "DataList" 805 held in the storage device 811 from the storage controller 802. The flow advances to step S4, and the operation controller 801 forms and displays a print setting UI on the basis of "Service" 807 and "DataList" 805. The operation controller 801 generates print setting instructions "Job" 808 that specify images to be printed, selection of their print modes, and the like on the basis of instructions of the user 812 input according to this UI, and sends the generated "Job" 808 to the print controller 803. The flow advances to step S5, and the print controller 803 makes print setups of the print device 810 according to the description of "Job" 808. The print controller 803 requests the storage controller 802 of an image file "JobData" 806, which is held in the storage device 811 and is required for a print process, using a description method described in "DataList" 805, and acquires that image file. Then, the print controller 803 generates print data that can be processed by the print device 810. The flow advances to step S6, and the print controller 803 outputs the print data to the print device 810 to print an image. It is checked in step S7 if an end instruction of the print process is designated. If no end instruction is designated, the flow returns to step S4 to repeat the aforementioned processes. If the end instruction of the print process is designated, this process ends.

As described above, the aforementioned hierarchical structure, four functions 800 to 803, and five information groups 804 to 808 exchanged among the four functions form the CDPS basic configuration despite of the locations of the aforementioned functions (DSC 3012 or PD printer 1000).

[CDPS Configuration by DSC and PD Printer]

Figure 10:
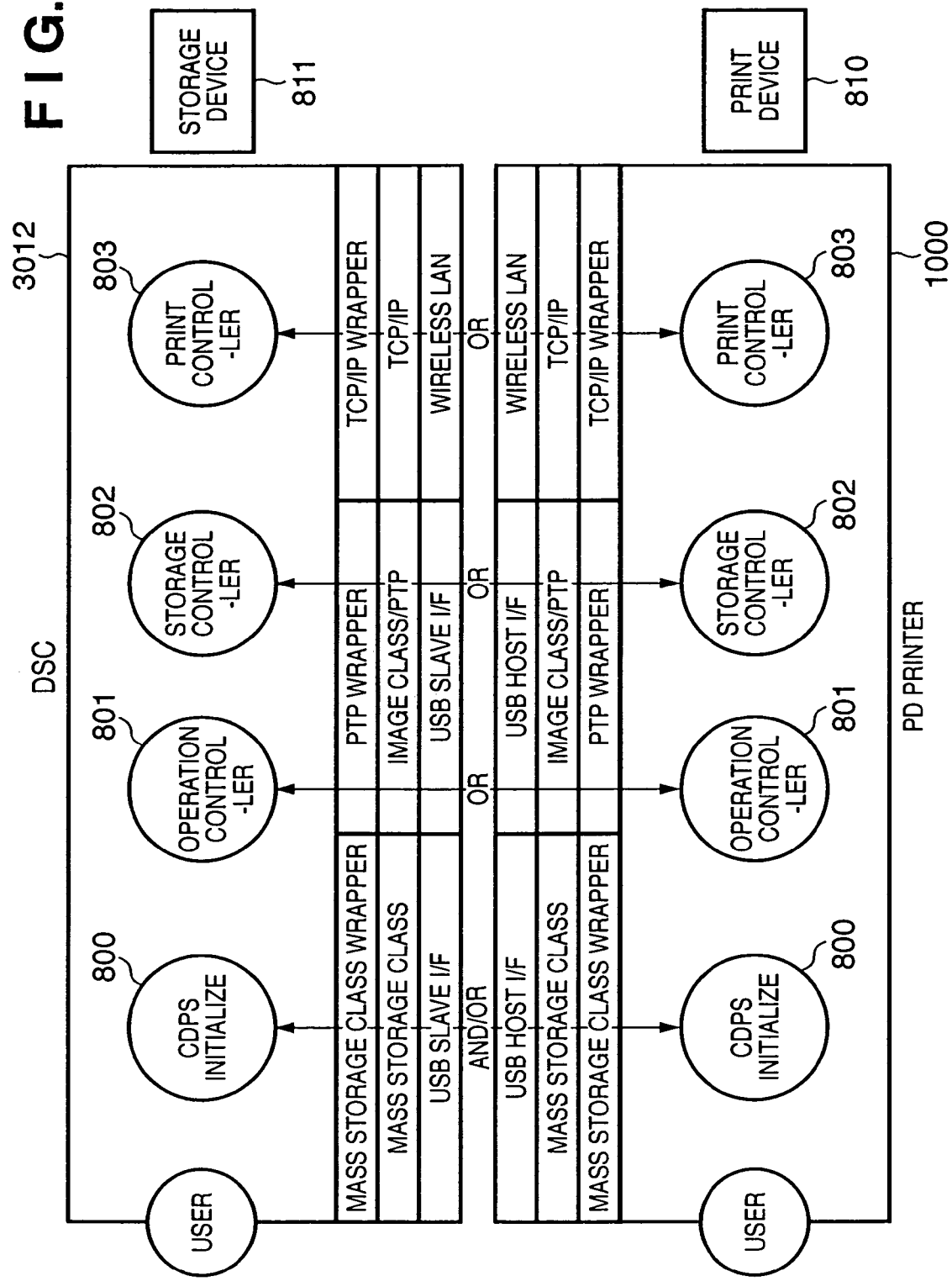
FIG. 10 depicts a schematic diagram of service functions of the DSC and PD printer in the CDPS according to the embodiment of the present invention.

FIG. 10 shows an example of the CDPS configuration while the DSC 3012 and PD printer 1000 are connected. FIG. 10 shows a case wherein both the DSC 3012 and PD printer 1000 hold the aforementioned four functions 800 to 804. In this case, the storage device 811 and print device 810 are logically located outside this CDPS system, and the side to which these devices are connected is not fixed.

The CDPS of this embodiment is characterized in that after the DSC 3012 and PD printer 1000 are physically and logically connected, the CDPS initialize (CDPS Initialize) processes 800 of the DSC 3012 and PD printer 1000 interactively determine which of the DSC 3012 and PD printer 1000 handles and manages each of the three remaining functions 801 to 803, and the processing functions of the storage device 811 and 810.

Figure 11:
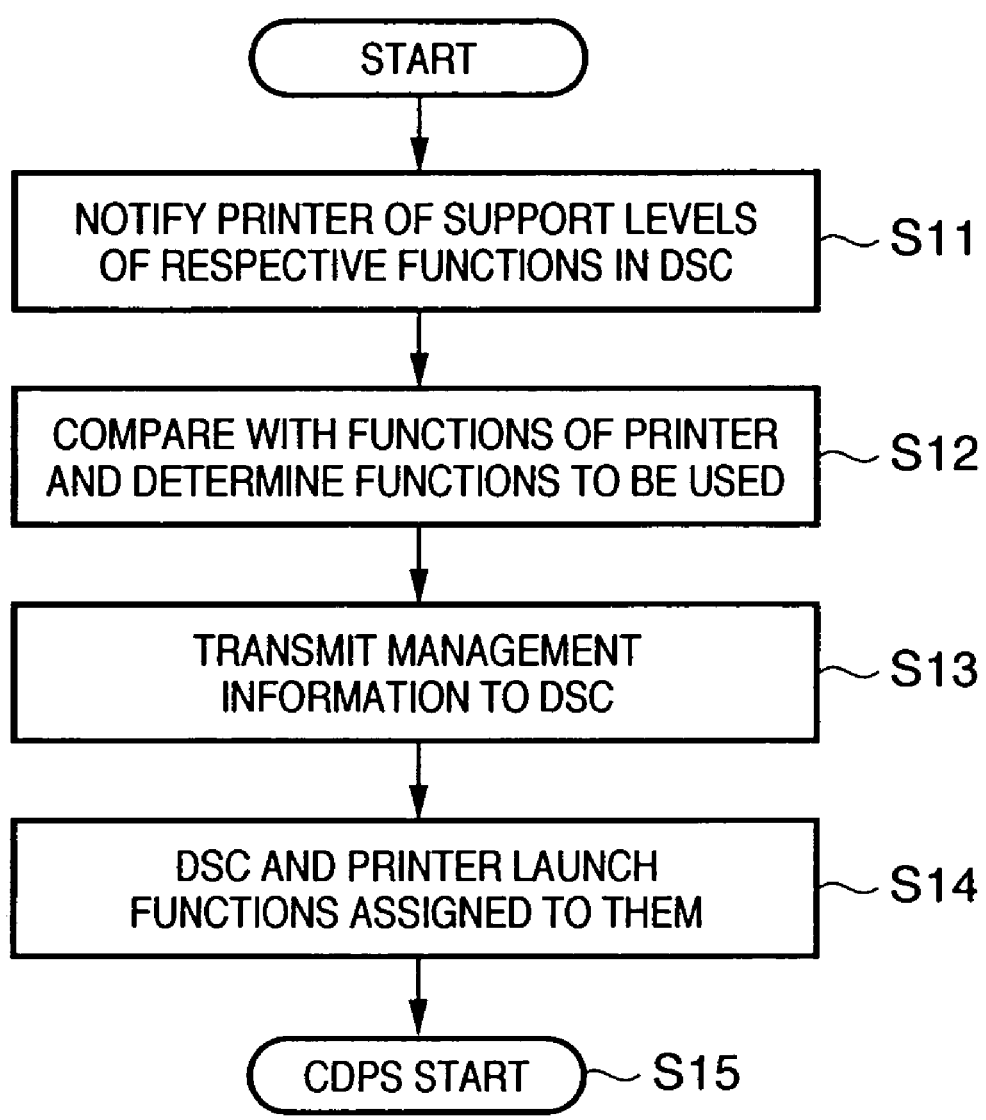
FIG. 11 is a flow chart for explaining an outline of the processes after the PD printer and DSC according to the embodiment of the present invention have been connected until the CDPS starts.

FIG. 11 is a flow chart for explaining the function assignment process in the CDPS of this embodiment.

In step S11, the DSC 3012 notifies the PD printer 1000 of the support levels of its functions 800 to 803. The flow advances to step S12, and the PD printer 1000 compares the support levels of the respective functions received from the DSC 3012 with those of the PD printer 1000 itself to detect in which of the DSC 3012 and PD printer 1000 functions with higher usability are installed and to determine the DSC 3012 or PD printer 1000 to which each of the functions is to be assigned. The flow advances to step S13, and the PD printer 1000 sends the determined handle information and management information of the respective functions to the DSC 3012. The flow advances to step S14, and the DSC 3012 and PD printer 1000 respectively launch functions determined to be handled by them. In step S15, the CDPS is started.

If the "extended procedure" is to be executed, it is executed after it is determined in step S12 that both the DSC 3012 and PD printer 1000 support the extended procedure. However, since the subsequent interactions are unique to each vendor, a description thereof will be omitted.

The respective functions need not always be supported by both the DSC 3012 and PD printer 1000, but they must be supported by either the DSC 3012 or PD printer 1000. Especially, as for the CDPS initialize process 800, even if the DSC 3012 does not support the CDPS initialize process 800, the CDPS initialize process 800 of the PD printer 1000 allows this system to transit to the CDPS mode depending on the connection state of the interface.

CDPS CONFIGURATION EXAMPLE-1

Figure 12:
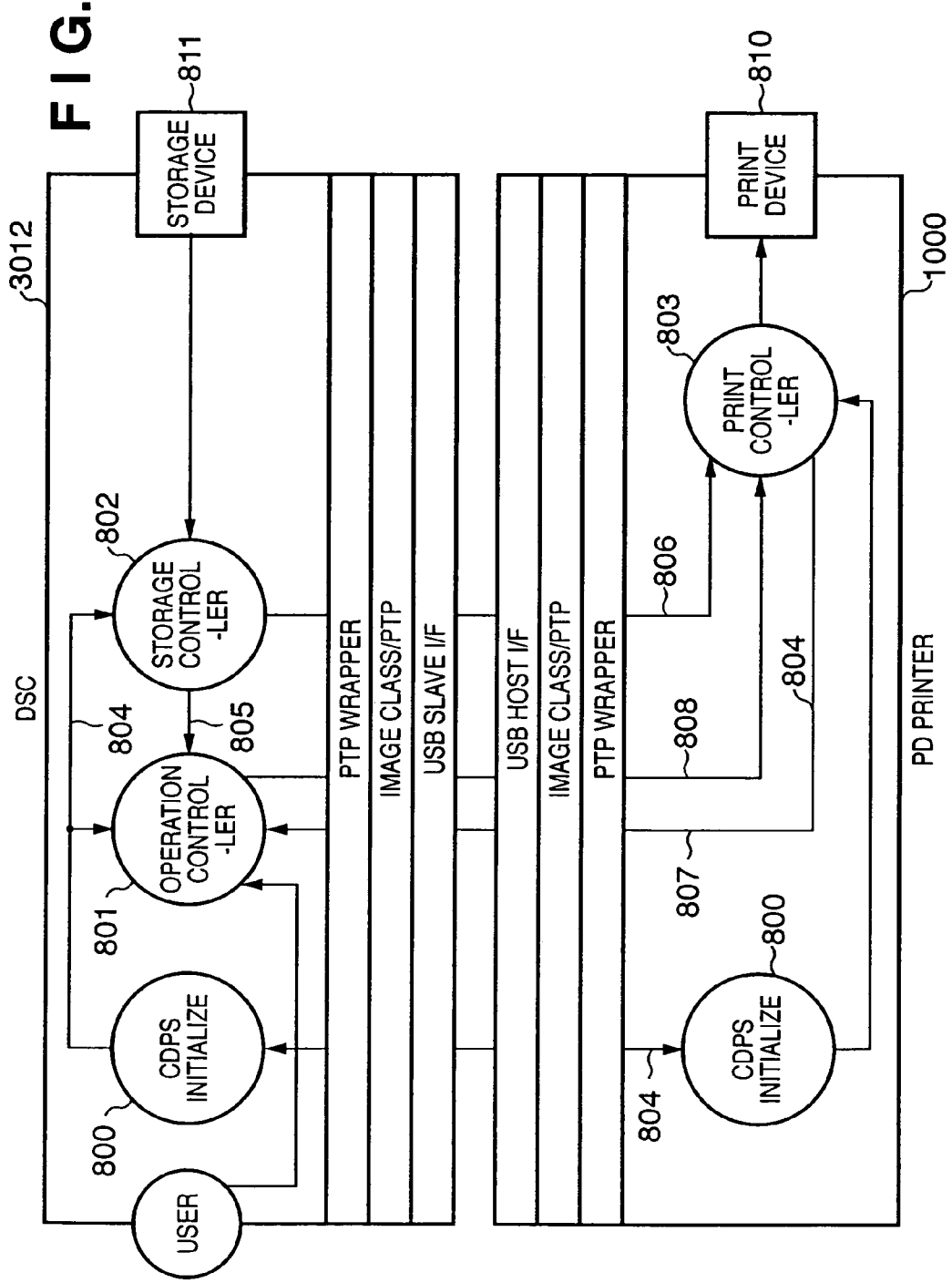
FIG. 12 depicts a diagram showing an example of function assignment of the DSC and PD printer in the CDPS according to the embodiment of the present invention.

FIG. 12 depicts a configuration example 1 of the CDPS when the DSC 3012 and PD printer 1000 are connected via PTP (Picture Transfer Protocol) of Image Class on USB. The same reference numerals in FIG. 12 denote parts common to those in FIGS. 8 and 10, and a description thereof will be omitted. Note that a case will be explained below wherein the DSC 3012 which comprises the liquid crystal display 2700 and the PD printer 1000 to which no liquid crystal viewer 1011 is attached are connected. That is, in this example, the DSC 3012 comprises the CDPS initialize process 800, operation controller 801, and storage controller 802, and the PD printer 1000 comprises the functional arrangement shown in FIG. 10.

In this case, the CDPS initialize process 800 of the PD printer 1000 makes an attempt to exchange information about assignment and management of the respective functions with that of the DSC 3012. In response to this, the DSC 3012 informs the PD printer 1000 that it supports the functions of the operation controller 801 and storage controller 802 (with the liquid crystal display 2700 and the like). The CDPS initialize process 800 of the PD printer 1000 compares these support levels with those of the operation controller 801 and storage controller 802 (without the liquid crystal viewer and the like) of the PD printer 1000, and determines the system configuration as follows. Then, "CDPS transition OK" is sent back to the CDPS initialize process 800 of the PD printer 1000, and the following determination contents are sent to the DSC 3012.

(1) The DSC 3012 handles and manages the operation controller 801 and storage controller 802.

(2) The PD printer 1000 handles and manages the print controller 803.

(3) The storage device 811 is mounted on the DSC 3012, and the storage controller 802 of the DSC 3012 manages this storage device 811.

(4) The print device 810 (printer engine 3004) is provided in the PD printer 1000, and the print controller 803 of the PD printer 1000 manages a print process. Note that the above process is similarly executed when the DSC and PD printer are connected via other interfaces such as TCP/IP of Wireless LAN and the like.

CDPS CONFIGURATION EXAMPLE-2

Figure 13:
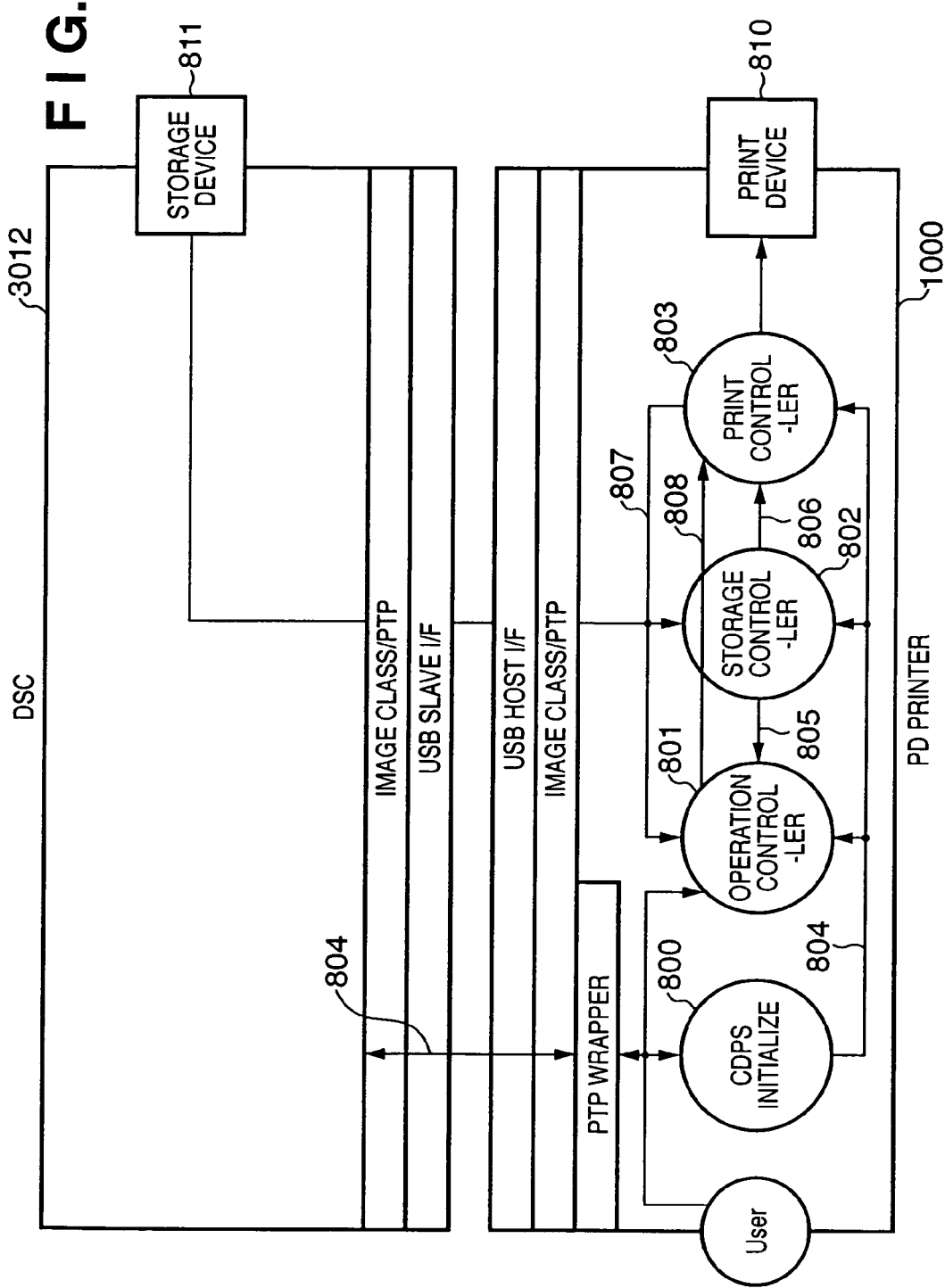
FIG. 13 depicts a diagram showing another example of function assignment of the DSC and PD printer in the CDPS according to the embodiment of the present invention.

FIG. 13 shows configuration example 2 of the CDPS when the DSC 3012 and PD printer 1000 are connected via PTP (Picture Transfer Protocol) of Image Class on USB. The same reference numerals in FIG. 13 denote parts common to those in FIGS. 8 and 10, and a description thereof will be omitted. Note that a case will be explained below wherein the DSC 3012 which does not comprise any liquid crystal display 2700 and the PD printer 1000 to which the liquid crystal viewer 1011 is attached are connected, or the DSC 3012 does not comprise any CDPS initialize process 800. Note that the PD printer 1000 comprises the functional arrangement shown in FIG. 10.

Upon examining a case wherein the CDPS initialize process 800 of the PD printer 1000 makes an attempt to exchange information about assignment and management of the respective functions with that of the DSC 3012, the DSC 3012 cannot respond to this since it has no CDPS initialize process 800. Hence, a PTP Wrapper layer of the PD printer 1000 determines the system configuration as follows, and sends "CDPS transition OK" back to the CDPS initialize process 800 of the PD printer 1000.

(1) The PD printer 1000 handles and manages all of the operation controller 801, storage controller 802, and print controller 803.

(2) The storage device 811 is provided in the DSC 3012, and the storage controller 802 of the PD printer 1000 manages image accesses to this storage device 811 via standard PTP.

(3) The print device 810 is provided in the PD printer 1000, and the print controller 803 of the PD printer 1000 manages it.

Note that the configuration shown in FIG. 13 is determined not only when the DSC 3012 does not have any CDPS initialize process 800, but also when the CDPS initialize process 800 of the PD printer 1000 determines that the resolution and operability of the display 2700 of the DSC 3012 are inferior to those of the viewer 1011 of the PD printer 1000 or the UI that uses that viewer 1011 even when the DSC 3012 comprises the display 2700.

CDPS CONFIGURATION EXAMPLE-3

Figure 14:
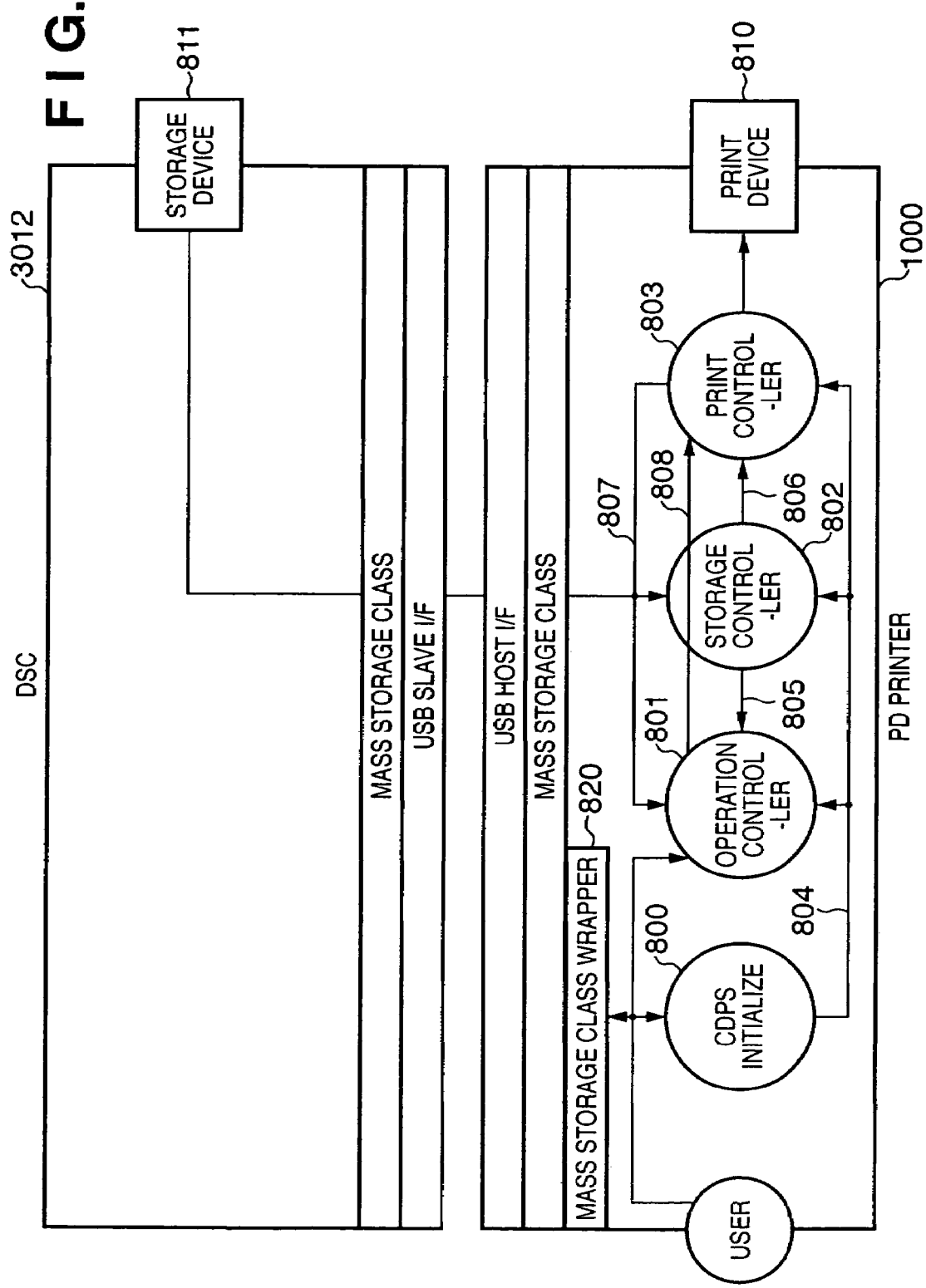
FIG. 14 depicts a diagram showing still another example of function assignment of the DSC and PD printer in the CDPS according to the embodiment of the present invention, in which the DSC is handled as a mass storage.

FIG. 14 depicts a configuration example 3 of the CDPS upon connection via MSC (Mass Storage Class). The same reference numerals in FIG. 14 denote parts common to those in FIGS. 8 and 10, and a description thereof will be omitted. Note that a case will be explained below wherein the DSC 3012 which does not comprises any liquid crystal display 2700 is connected as MSC, to the PD printer 1000 to which the liquid crystal viewer 1011 is attached.

In this case, the CDPS initialize process 800 of the PD printer 1000 makes an attempt to exchange information about assignment and management of the respective functions with that of the DSC 3012. However, it is difficult for standard bulk-only MSC to exchange information with the DSC 3012 in two ways. For this reason, a Mass Storage Class Wrapper layer 820 of the PD printer 1000 determines the system configuration as follows, and sends "CDPS transition OK" back to the CDPS initialize process 800 of the PD printer 1000.

(1) The PD printer 1000 handles and manages all of the operation controller 801, storage controller 802, and print controller 803.

(2) The storage device 811 is provided in the DSC 3012, and the storage controller 802 of the PD printer 1000 manages image accesses to this storage device 811 as standard MSC.

(3) The print device 810 is provided in the PD printer 1000, and the print controller 803 of the PD printer 1000 manages it.

[CDPS Output Procedure]

The output procedure in the CDPS according to this embodiment has the following two procedures.

<Standard Procedure>

In the CDPS according to this embodiment, a procedure according to the following functions and information is defined.

CDPS Initialize function
Operation Controller function
Storage Controller function
Print Controller function
Service Discover information
Service information
Job information
Job Data information <Extended Procedure>

Procedures that can cope with outputs in various formats based on specifications unique to respective vendors are defined for the following formats.

XHTML
SVG
Unique format

[Description of CDPS Function]

In the CDPS of this embodiment, print service functions shown in FIGS. 15A and 15B are provided so as to allow the PTP upper layers of both the DSC 3012 and PD printer 1000 to arbitrarily handle applications, i.e., to model functions between the DSC 3012 and PD printer 1000 (for example, a print process requires exchange of various PTP protocols such as exchange of objects and the like). The aforementioned application layers 700 and 703 in FIG. 7 can basically implement direct print using the print service functions shown in FIGS. 15A and 15B. Note that the print service functions include indispensable functions (FIG. 15A) and an optional function (FIG. 15B), and an apparatus which supports the CDPS must prepare for all the indispensable functions of them.

FIGS. 15A and 15B show a list of service functions in the CDPS according to this embodiment. These functions will be explained in turn below.

(a) CDPS_ServiceDiscovery (Initialization)

This function makes transition to the CDPS. The return value of this function designates the "standard" or "extended" procedure of the CDPS using a script, and information indicating which procedure is selected is received. Note that only the CDPS_ServiceDiscovery function is used in the "extended" procedure.

(b) CDPS_Service (Printer→Operation Controller)

This function notifies a script that describes the functions of the PD printer as a parameter. The script that describes the functions of the PD printer is used as an argument, and its return value indicates a communication result, i.e., success/failure of a communication ("TRUE" or "FALSE").

(c) CDPS_PageStart (Printer→Operation Controller)

This function notifies print start (for each page). Its parameter is a script that describes the print function, and its return value indicates a communication result, i.e., success/failure of a communication ("TRUE" or "FALSE").

(d) CDPS_PageEnd (Printer→Operation Controller)

This function notifies print end (upon discharging a sheet for each page). Its parameter is a script that describes the print function, and its return value indicates a communication result, i.e., success/failure of a communication ("TRUE" or "FALSE").

(e) CDPS_JobEnd (Printer→Operation Controller)

This function notifies end of a print job. Its parameter is a script that describes the print function, and its return value indicates a communication result, i.e., success/failure of a communication ("TRUE" or "FALSE").

(f) CDPS_Error (Printer→Operation Controller)

This function notifies an error (Warning/Fatal). Its parameter is a script that describes the print function, and its return value indicates a communication result, i.e., success/failure of a communication ("TRUE" or "FALSE").

(g) CDPS_JobData (Printer→Storage)

This function acquires an image (e.g., JPEG data) from the storage. A script that describes a handle name of image data to be acquired is used as an argument, and its return values are the number of bytes of the acquired image data and the image data itself.

(h) CDPS_DataList (Printer→Storage)

This function acquires a list of image information (e.g., JPEG data) from the storage. A script that describes the function of the PD printer as an argument, and its return value is a script that describes an image data list.

(i) CDPS_Job (Operation Controller→Printer)

This function notifies the printer of a print command. A script that describes a print command is used as an argument, and its return value indicates a communication result, i.e., success/failure of a communication ("TRUE" or "FALSE").

(j) CDPS_JobAbort (Operation Controller→Printer)

This function notifies the printer of a print abort command. A script that describes the printer function is used as an argument, and its return value indicates a communication result, i.e., success/failure of a communication ("TRUE" or "FALSE").

(k) CDPS_JobContinue (Operation Controller→Printer)

This function notifies the printer of a print restart command. A script that describes the printer function is used as an argument, and its return value indicates a communication result, i.e., success/failure of a communication ("TRUE" or "FALSE").

These functions are the indispensable functions in the CDPS.

The CDPS of this embodiment further comprises a CDPS_PartialJobData function as an optional function, as shown in FIG. 15B.

This CDPS_PartialJobData is a function of allowing the printer to acquire partial image data (e.g., JPEG data) from the storage. A script that describes a handle name of partial image data to be acquired is used as an argument, and its return values are the number of bytes of the acquired image data and the image data itself. Note that a DPOF designation command that designates to receive a DPOF file, to interpret that DPOF file, and to execute a print process designated by that DPOF is prepared in addition to the above function.

[Description of Script Format]

The contents of the script used in the aforementioned service discovery (CDPS_ServiceDiscovery) function and the formats of scripts used in other functions will be described below.

<Formats of Various Function Commands>

(1) Script Format of Service Discovery (CDPS_ServiceDiscovery)

This format describes the contents (described in UniCode) of the script used in the service discovery (CDPS_ServiceDiscovery) function, and is used upon transition to the CDPS mode. With this script, each others' keywords are recognized.

CanonDirectPrintService(UILevel=X) (device information, UI level information (X)=0 to 4) CanonDirectPrintService(HostUI) (when the UI of the host (PD printer) is used) or CanonDirectPrintService(DeviceUI) (when the UI of the device (DSC) side is used)

(2) Script Format in CDPS_PageStart, CDPS_PageEnd, CDPS_JobEnd, CDPS_DataList, CDPS_JobAbort, and CDPS_JobContinue <?XML version="1.0" encoding=UTF-16"?>
<!ELEMENT command("CDPS_PageStart"| "CDPS_PageEnd"|"CDPS_JobEnd"|"CDPS_JobAbort"|"CDPS_JobContinue")>

(3) Script Format of CDPS_Service
<?XML version="1.0" encoding=UTF-16"?>
<command(CDPS_Service)>
<capability>
<--describe Printer Capability-->
</capability>

(4) Script Format of CDPS_Job
<?XML version="1.0" encoding=UTF-16"?>
<command(CDPS_Service)>
<job>
<capability>
<--describe Printer Capability(PrintMode)-->
</capability>
<printlist>
<--describe additional information such as Image File Handle, date, and the like-->
</printlist>
</job>

(5) Script Format of CDPS_Error
<?XML version="1.0" encoding=UTF-16"?>
<command(CDPS_Error)>
<!ELEMENT status ("fatal"|"warning")>
<!ELEMENT reason ("printer_occupied"|"printer busy"|"ink_low"|"lever_error"|"load_error"| . . . )>

Note that "status" describes whether or not this error is an error that allows recovery to the job. For example, "fatal" indicates a non-recoverable error, "warning indicates a recoverable error. Also, "reason" describes the cause of that error.

(6) Script Format of CDPS_JobData and CDPS_PartialJobData
<?XML version="1.0" encoding=UTF-16"?>
<!ELEMENT command ("CDPS_JobData"|"CDPS_PartialJobData")><image (#PCDATA)>
<offset (#PCDATA)>
<size (#PCDATA)>

Note that "image" describes the handle name of a file, "offset" describes the number of bytes of an offset from the head, and "size" describes the number of bytes of image data to be acquired. However, in case of CDPS_JobData, these "offset" and "size" are disabled if partial acquisition as the optional function is not used.

<Format of Capability>

The format of <capability> used in the CDPS_Service and CDPS_Job functions will be described below.
<capability>
<--[item that does not require negotiation]-->
<!ELEMENT quality ("draft"|"normal"|"fine")><!ELEMENT paper_size ("L"|"2L"|"card"|"4×6"|"A4"|"letter"| . . . )>
<!ELEMENT paper_type ("plain"|"photo")>

Note that "quality" represents the print quality, and designates one of "quick (draft)", "normal", and "fine". "paper_size" represents the paper size (L, 2L, card, 4×6, A4, letter size, and the like), and "paper_type" represents the type of paper sheet and designates one of "plain paper (plain)" and "photo dedicated paper (photo)".
<--[item that requires negotiation]-->
<!ELEMENT image_type ("bmp"|"jpeg"|"tiff"| . . . )><!ELEMENT date ("on"|"off")>
<!ELEMENT file_name ("on"|"off")>
<!ELEMENT image_optimize ("on"|"off")>
<size_per_page (#PCDATA)>
<!ATTLIST layout L ("borderless"|"1×1"| . . . |"index(3×5)") "borderless" 2L ("borderless"|"1×1"| . . . |"index(5×7)") "borderless" . . . >

Note that "image_type" represents the image formats which are supported. "date" indicates ON/OFF of a date print function. "file_name" indicates ON/OFF of a file name print function, and "image_optimize" indicates ON/OFF of image correction. "size_per_page" represents the size of image data that can be read, and "layout" indicates layouts which are available for various paper types.
<option>
<!ATTLIST vendor image_optimize ("DiPS"|"auto"| . . . ) "auto" trimming_x (#PCDATA) "0"
trimming_y (#PCDATA) "0"
trimming_w (#PCDATA) "0"
trimming_h (#PCDATA) "0"
. . . >
</option>
</capability>

Note that a field bounded by this "option" represents Printer Capability unique to each vendor, and describes the contents together with the vendor name.

<Job Format>

The format of <job> used in the CDPS_Job function will be described below.
<job>
<capability>
<--aforementioned Capability Format-->
</capability>
<printlist>
<image (#PCDATA)>

```
<date (#PCDATA)>
<file_name (#PCDATA)>
<--repeat image, data, and file_name above-->
</printlist)
</job>
```
Note that a field bounded by "capability" represents the print setups of images that follow this field. Also, a field bounded by "printlist" represents images, additional information (date, file name), and the like to be printed in this job.

<Practical Example of Job Format>

Practical examples of this Job format will be explained below.

(A) Print image of Handle1 on L-size Photo Paper Together with Date in Borderless Style
```
<?XML version="1.0" encoding=UTF-16"?>
<command(CDPS_job)>
<job>
<capability>
<papersize("L")>: paper size (L size)
<papertype("Photo")>: photo paper
<date("on")>: date print=ON
<layout("borderless")>: borderless print
</capability>
<printlist>
<image("handle1")>: image of Handle1
<date("2002/05/30")>: date (May 30, 2002)
</printlist>
</job>
```

(B) Print Six Images of Handle1 to Handle6 on L-Size Photo Paper in 2×2 Layout
```
<?XML version=""1.0" encoding=UTF-16"?>
<command(CDPS_job)>
<job>
<capability>
<papersize("L")>: paper size (L size)
<papertype("Photo")>: photo paper
<date("off")>: date print=OFF
<layout("2×2")>: layout 2×2
</capability>
<printlist>
<image("handle1")>
<image("handle2")>
<image("handle3")>
<image("handle4")>
<image("handle5")>
<image("handle6")>: designate images of Handle1 to Handle6
</printlist>
</job>
```

(C) Print Based on Image Selection and Paper Size/Layout Setup Based on DPOF File Designated by Handle1
```
<?XML version="1.0" encoding=UTF-16"?>
<command(CDPS_job)>
<job>
<printlist>
<image("handle1")>: Handle1=DPOF file
</printlist>
</job>
```

(D) Print Based on Photo Selection and Setup Based on DPOF File Designated by Handle1 on L-size Photo Paper in 2×2 Layout
```
<?XML version="1.0" encoding=UTF-16"?>
<command(CDPS_job)>
<job>
<capability>
<papersize("L")>: paper size (L size)
<papertype("Photo")>: photo paper
<date("off")>: date print=OFF
<layout("2×2")>: layout 2×2
</capability>
<printlist>
<image("handle1")>: Handle1=DPOF file
</printlist>
</job>
```

[Description of Flow of CDPS "Standard" Procedure]

FIG. 16 is a diagram for explaining the flow of basic processes in the CDPS according to this embodiment. In FIG. 16, CDPS functions exchanged among the aforementioned functions 800 to 803 are time-serially listed from top down. In FIG. 16, positions "A", "B", "C", and "D" on the broken lines indicate separation positions of function assignment, which seem typical. Also, the same reference numerals in FIG. 16 denote parts common to those in FIG. 8 above, and a description thereof will be omitted.

When the aforementioned CDPS initialize process 800 of the PD printer 1000 notifies the DSC 3012 of transition to the CDPS mode (804), the DSC 3012 informs the PD printer 1000 of levels ("standard", "extended", and supported functions) (821) supported by the DSC 3012 in response to that notification. Based on these levels, the PD printer 1000 determines which of the DSC 3012 and PD printer 1000 implements each of the aforementioned functions 800 to 803, and sends the determination result to the DSC 3012 (822).

Reference numeral 823 denotes a request of a data list of image data stored in the storage device 811, which is sent from the operation controller 801 to the storage controller 802; and numeral 824 denotes data read out from the storage device 811 by the storage controller 802 in response to that request. Then, the storage controller 802 sends the list data to the operation controller 801 (805). A print mode and an image to be printed are selected by the operation of the user 812 to generate a print job, which is sent to the operation controller 801 (825). The operation controller 801 generates an output setting instruction "CDPS_Job" based on instructions of the user 812 input via the generated UI menu, and sends it to the print controller 803 (808). The print controller 803 requests the storage controller 802 of that image data (826). As a result, image data is read out from the storage device 811 (827), and an image file "JobData" required for a print process is sent from the storage controller 802 to the print controller 803 (806). The print controller 803 executes an image process and the like to generate print data, and sends that print data to the print device 810 to execute the print process (828).

If an error has occurred during the print process, error information is sent from the print controller 803 to the operation controller 801 (829). If the user designates "print abort" or "print continue" with respect to this error (831), for example, a "print abort" command is sent from the operation controller 801 to the print controller 803 in correspondence with that designation (830) (this command is shown in FIG. 15A). The print controller 803 notifies the operation controller 801 of the end of the print job (832).

Figure 17:
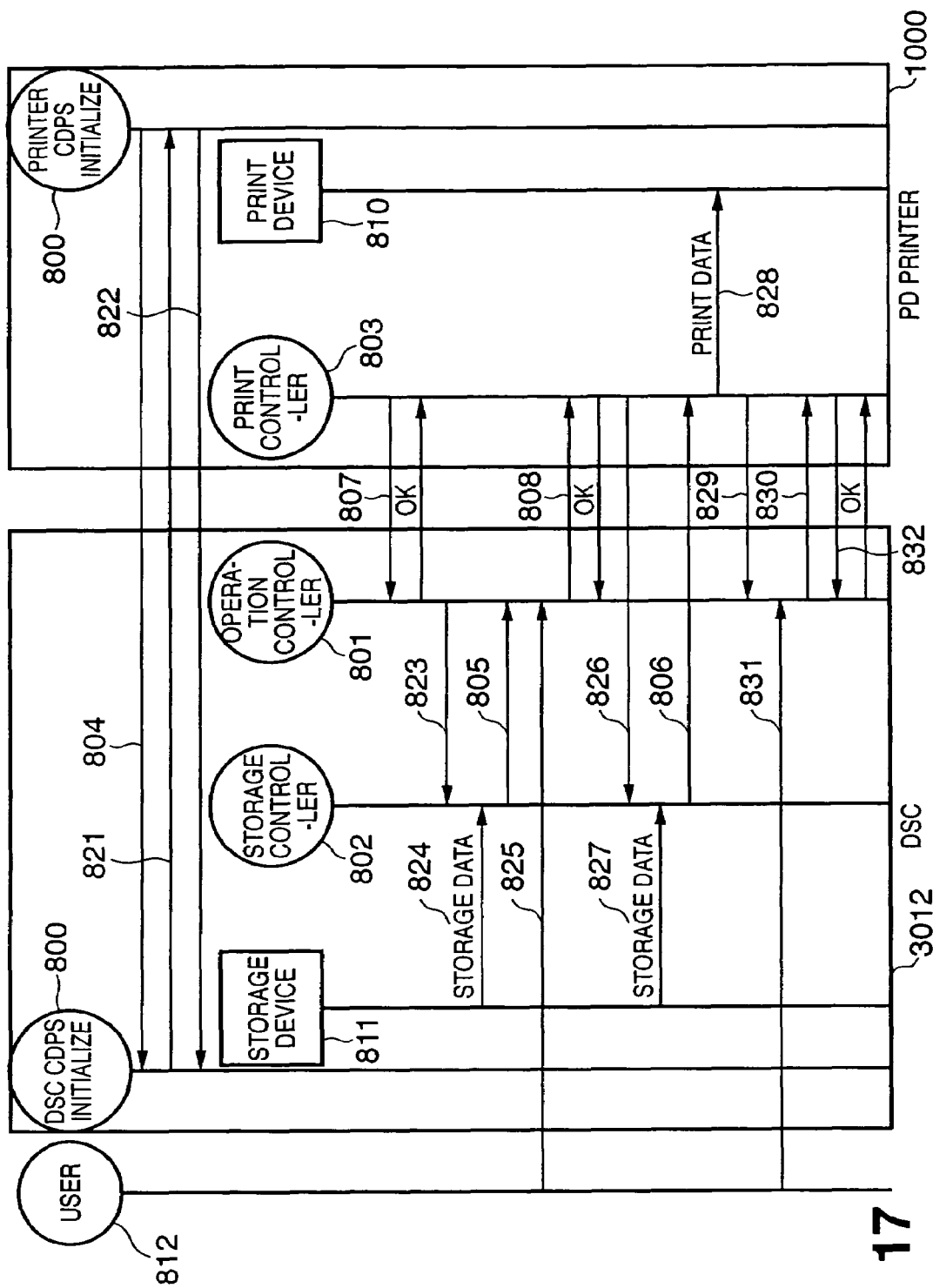
FIG. 17 is a flow chart for explaining an example of assignment of service functions and the flow of processes between the DSC and PD printer in the CDPS according to the embodiment of the present invention.

FIG. 17 is a diagram for explaining a case wherein the DSC 3012 handles the operation controller 801 and storage controller 802, and the PD printer 1000 handles the print controller 803. In this case, the separation position of function assignment is "C" in FIG. 16 above. Note that PTP connection is exemplified in this case. However, the same applies to TCP/IP connection or the like if the operation controller 801 and storage controller 802 of the DSC 3012 are used.

In this case, the PD printer 1000 informs that the DSC 3012 implements the operation controller 801 and storage controller 802 of the functions 800 to 803, and the PD printer 1000 implements the print controller 803 (822). As a result, the function assignment between the DSC 3012 and PD printer 1000 is determined, as shown in FIG. 17. In FIG. 17, the same reference numerals denote processes common to those in FIG. 16, and a description thereof will be omitted.

Figure 18:
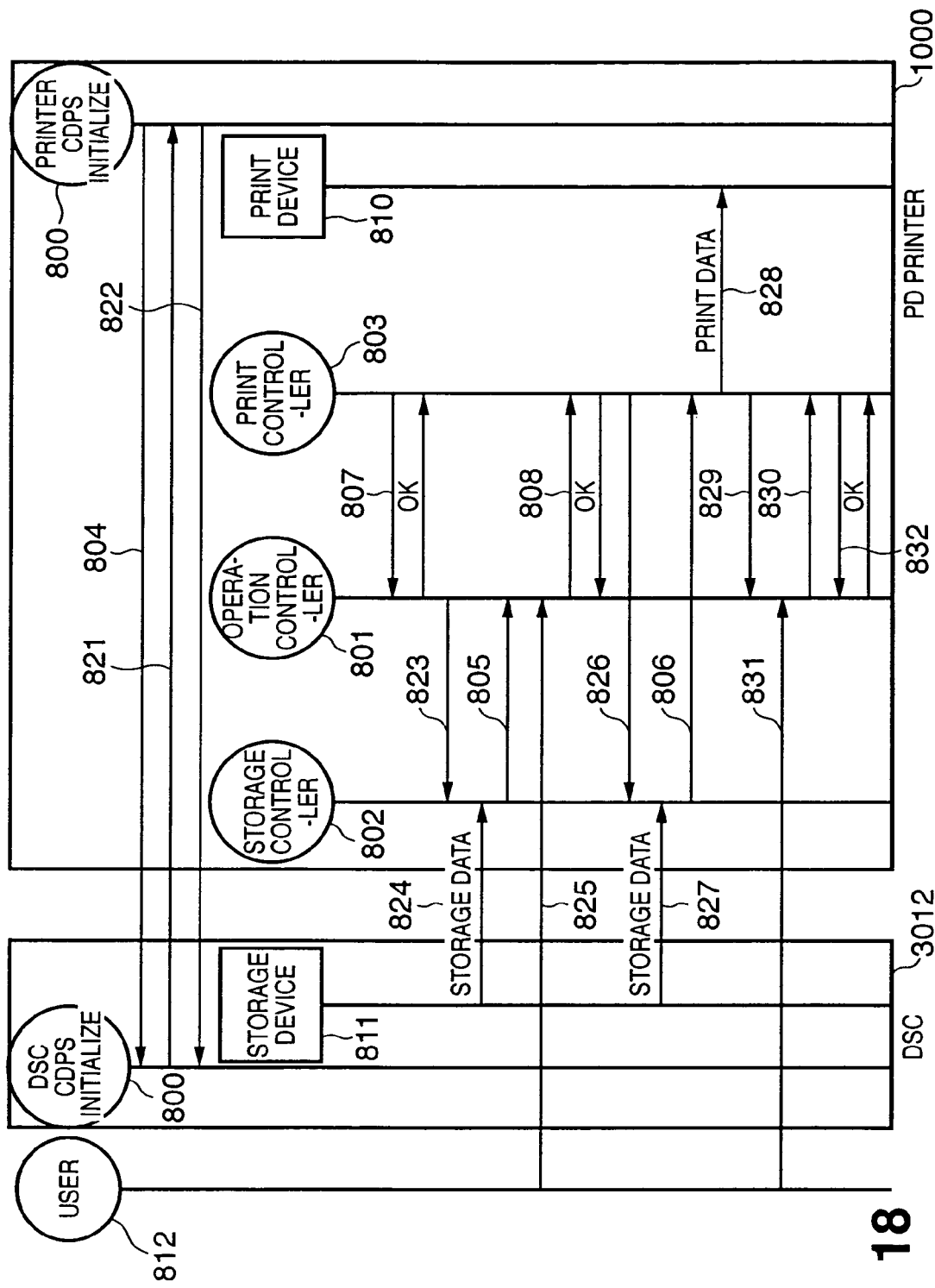
FIG. 18 is a flow chart for explaining another example of assignment of service functions and the flow of processes between the DSC and PD printer in the CDPS according to the embodiment of the present invention.

FIG. 18 is a diagram for explaining a case wherein the storage device 811 of the DSC 3012 is used as Mass Storage", and the PD printer 1000 handles the operation controller 801, storage controller 802, and print controller 803. In this case, the separation position of function assignment is "A" in FIG. 16 above. Note that PTP connection is exemplified in this case. However, the same applies to TCP/IP connection or the like if the operation controller 801 and storage controller 802 of the DSC 3012 are used.

In this case, the PD printer 1000 informs that the printer 1000 implements all of the functions 800 to 803 (822). As a result, the function assignment between the DSC 3012 and PD printer 1000 is determined, as shown in FIG. 18. In FIG. 18, the same reference numerals denote processes common to those in FIG. 16, and a description thereof will be omitted.

Note that the same applies to other connections such as PTP and the like if the resources of the DSC 3012 are not used at all. Also, the same applies to the case wherein the DSC 3012 has no CDPS initialize function 800 (CDPS Initialize) (a model which is incompatible to the CDPS).

Implementation examples of the aforementioned service function commands in the CDPS will be explained below.

[Implementation Example of Print Service Function by PTP]

<CDPS Service Discovery (CDPS_ServiceDiscovery) Function>

Figure 19:
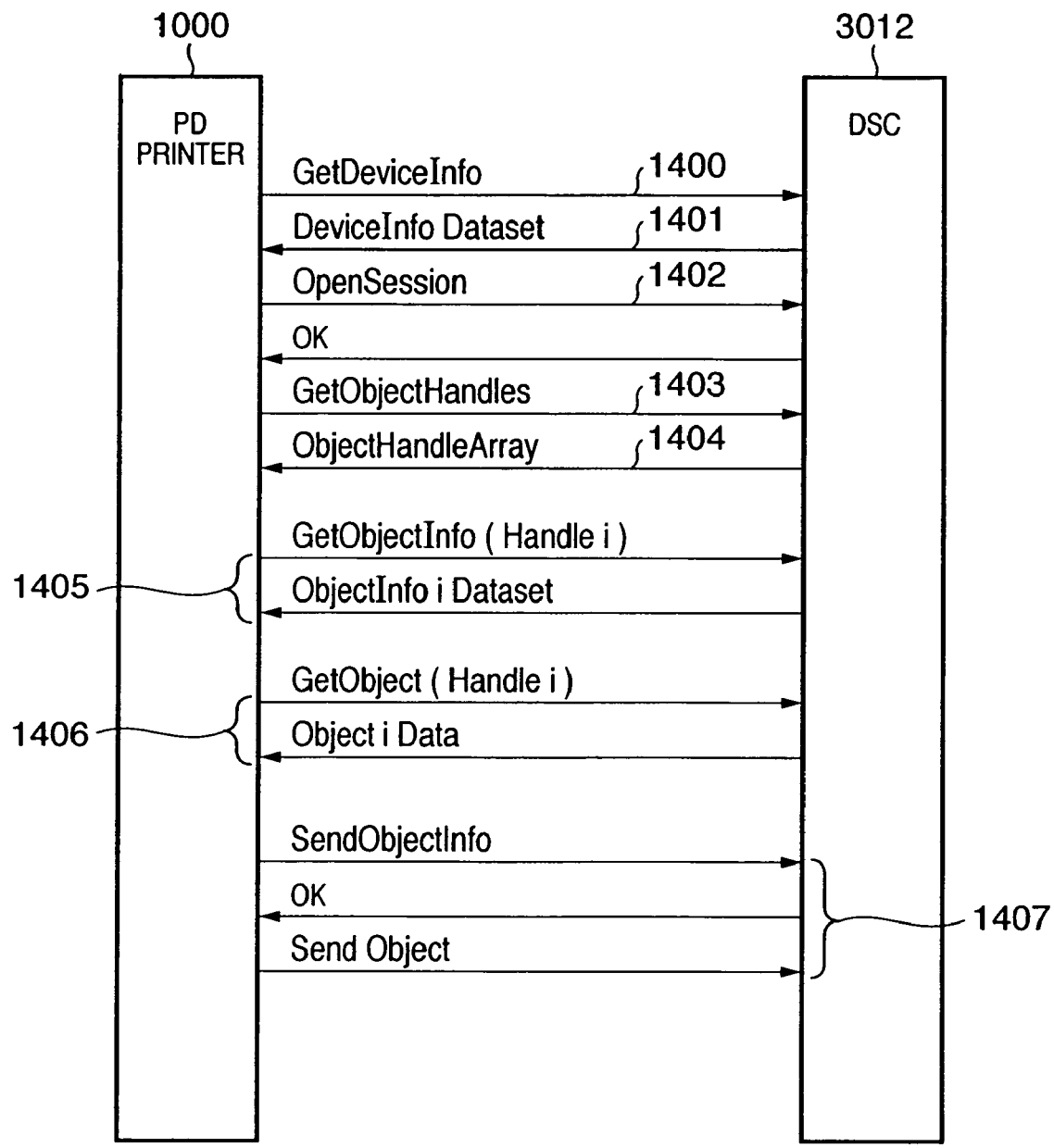
FIG. 19 is a chart for explaining an implementation example of CDPS service discovery (CDPS_ServiceDiscovery) using the PTP architecture.

FIG. 19 depicts a chart for explaining the procedure of the CDPS discovery procedure.

When the PD printer 1000 and DSC 3012 are physically connected, and the system enters in the PTP, the PD printer 1000 transmits GetDeviceInfo to the DSC 3012 (1400) to request it to send information associated with objects held by the DSC. In response to this command, the DSC 3012 transmits information associated with objects held by itself to the PD printer 1000 using DeviceInfoDataSet. The PD printer 1000 issues a start request of a procedure for assigning the DSC 3012 as a resource and to assign handles to data objects as needed, and for executing a special initialization process using OpenSession (1402). If the DSC 3012 returns an affirmative response (OK), a PTP communication starts. When the PD printer 1000 requests the DSC 3012 to send all handles in a script format (Storage ID: FFFFFF, Object Type: Script) (1403), the DSC 3012 returns all handle lists held by it (1404). The PD printer 1000 acquires information of the i-th object handle (1405, 1406). If this object contains a keyword (e.g., "(Marco)") indicating identification of the DSC 3012, transmission of object information from the PD printer 1000 is designated (SendObjectInfo) (1407). Upon reception of an affirmative response (OK) in response to this designation, the PD printer 1000 transmits object information to the DSC 3012 using SendObject. Note that this object contains, e.g., "(Polo)" as a response keyword to the aforementioned keyword.

In this manner, the PD printer 1000 and DSC 3012 can recognize each other's connection partners and, after that, the CDPS procedure can start. The transport layer that can exchange files in this way can reliably exchange keywords. That is, keywords can be exchanged without adding unique commands or the like to the CDPS of this embodiment. Note that the keywords are not limited to the aforementioned examples, and an identical keyword may be used. In order to shorten the negotiation time using keywords, the time required to confirm each others' devices can be shortened by setting the keyword in the first handle (i=1) in the script format.

Figure 20:
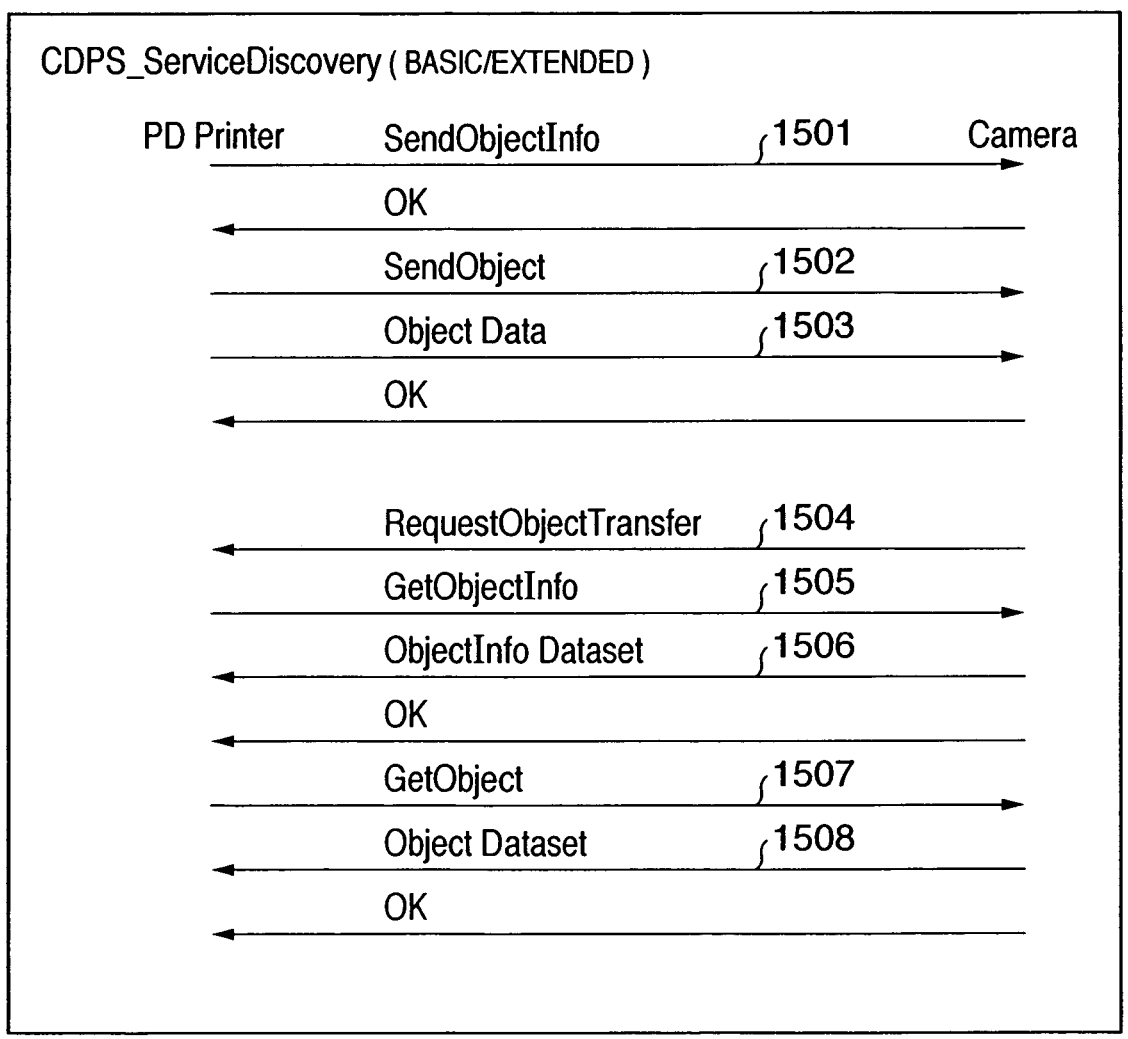
FIG. 20 is a chart for explaining an implementation example of a procedure that notifies procedures used by the camera in the CDPS (CDPS_ServiceDiscovery) using the PTP architecture.

FIG. 20 is a chart for explaining the subsequent part of the CDPS_ServiceDiscovery procedure.

The PD printer 1000 informs the DSC 3012 of the presence of object information to be sent to it using SendObjectInfo (1501) so as to notify the procedures "standard procedure" and "extended procedure" that the PD printer 1000 supports. Upon reception of an affirmative response (OK) from the DSC 3012 in response to this command, the PD printer sends a message indicating that it is ready to transmit an object to the DSC 3012 using SendObject (1502), and then transmits information ("standard"/"extended") associated with the procedures supported by the PD printer 1000 using ObjectData (1503). The DSC 3012 sends to the PD printer 1000 a message indicating that it wants to launch a GetObject operation (transit to the push mode) (1504). In response to this message, when the PD printer 1000 sends a message indicating that it is ready to receive information associated with object information (GetObjectInfo) (1505), the DSC 3012 sends the object information to the PD printer 1000 using ObjectInfoDataset (1506). When object information itself is requested by designating that object information (1507), the DSC 3012 informs the PD printer 1000 of procedures ("standard", "extended", and the like) that the DSC 3012 uses by Object Dataset (1508). The return value in this case is "standard" or "extended".

In this manner, the DSC 3012 can designate an image print mode of the PD printer 1000.

<CDPS_Service (Standard)>

Figure 21:
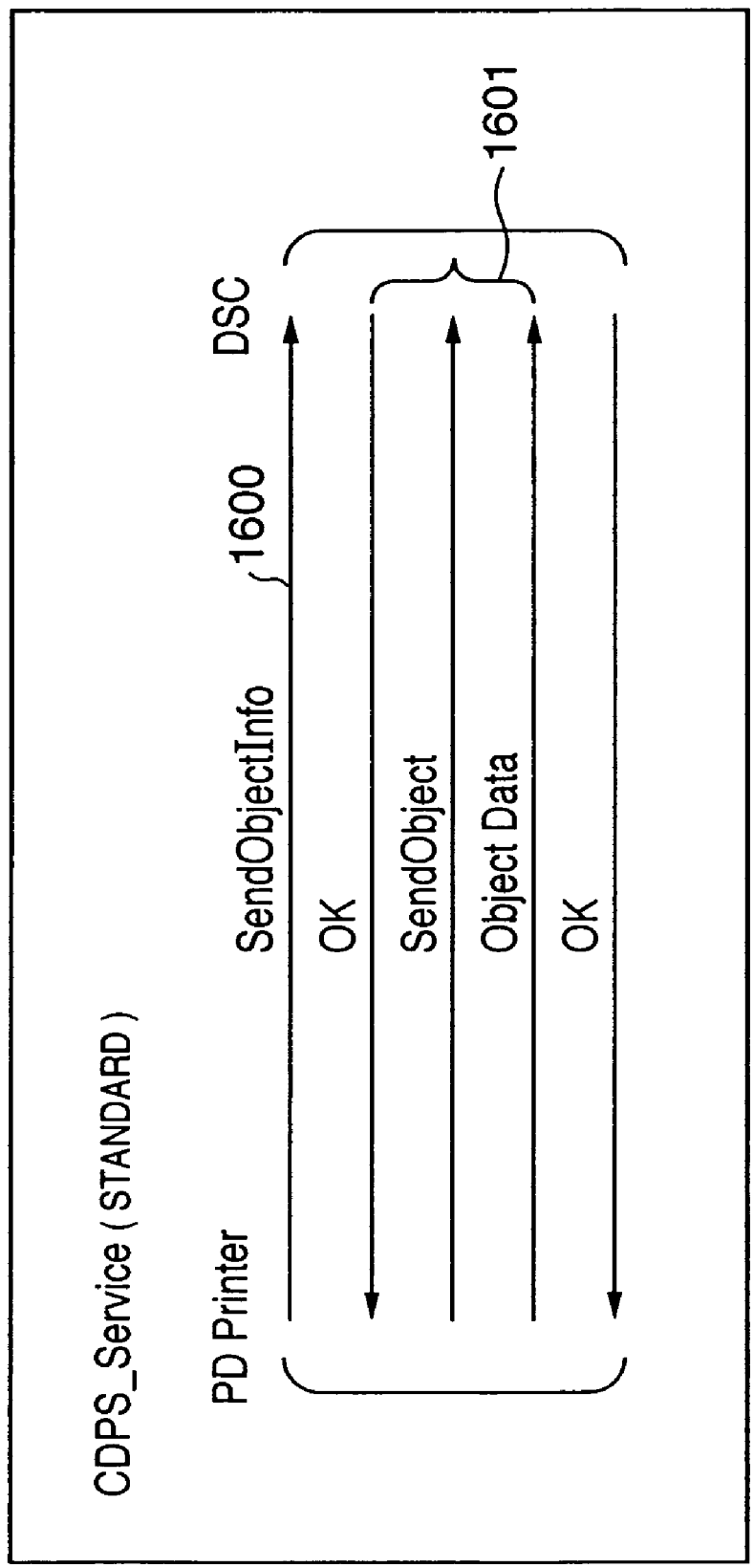
FIG. 21 is a chart for explaining an implementation example of notification (CDPS_Service) of printer functions in the CDPS using the PTP architecture.

FIG. 21 is a chart for explaining the printer function notification procedure in the CDPS according to this embodiment.

In this procedure, the PD printer 1000 informs the DSC 3012 of the presence of object information to be sent to it (1600), and notifies the DSC 3012 of the printer functions using SendObject and ObjectData. As a result, the DSC acquires the printer functions (1601).

<CDPS_JobData (Standard)>

Figure 22:
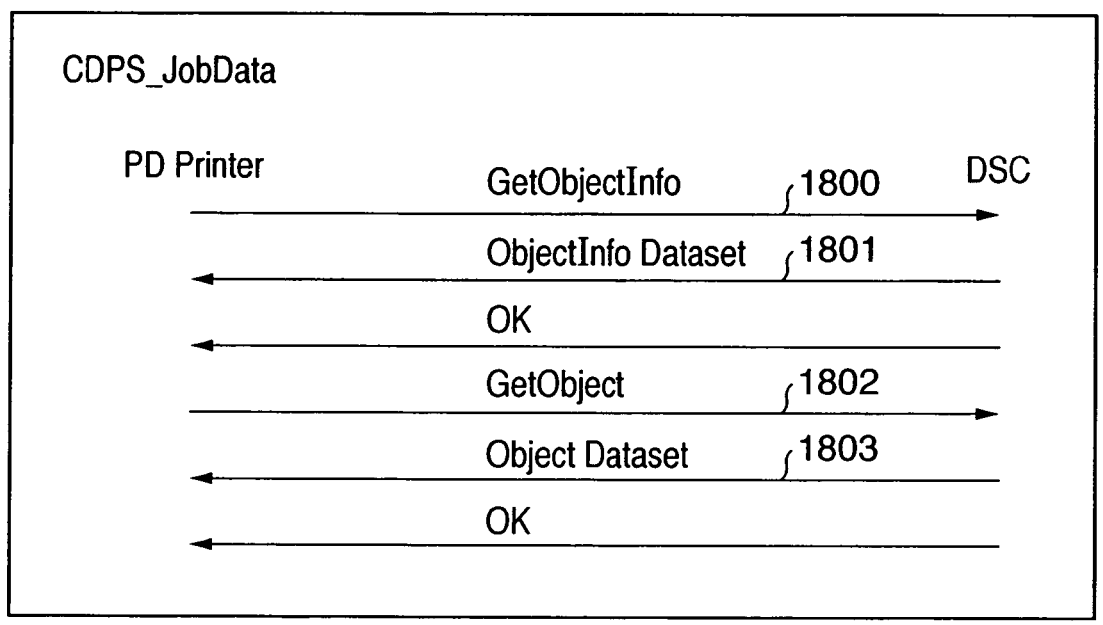
FIG. 22 is a chart for explaining an implementation example of a procedure of a function (CDPS_JobData) that allows the PD printer to acquire an image file in the CDPS using the PTP architecture.

FIG. 22 is a chart for explaining an implementation example, using the PTP architecture, of the communication procedure when the PD printer 1000 acquires image data (JPEG image) held in the DSC 3012 (CDPS_JobData) in the CDPS according to this embodiment.

When the PD printer 1000 requests the DSC 3012 of information associated with an object held by the DSC 3012 (or storage) (1800), the DSC 3012 sends information (Object Dataset) associated with that object to the PD printer 1000 (1801). When the PD printer 1000 issues an acquisition request (GetObject) by designating that object (1802), the DSC 3012 transmits the requested image file (Object Dataset) to the PD printer 1000 (1803). In this way, the PD printer 1000 can acquire a desired image file from the DSC 3012. In this case, the return values in this case are "Data_Size" and "Image_Data".

<CDPS_PageStart (Standard)>

Figure 23:
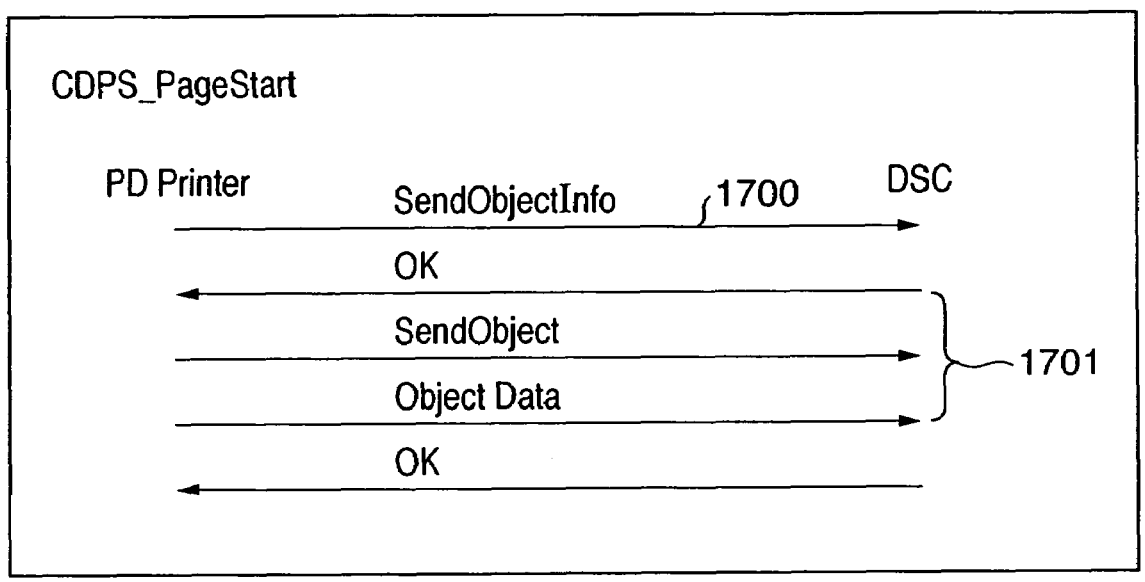
FIG. 23 is a chart for explaining an implementation example of a function (CDPS_PageStart) that allows the PD printer to instruct the camera to start a print process in the CDPS using the PTP architecture.

FIG. 23 is a chart for explaining the procedure of the print start notification process in the CDPS according to this embodiment.

In this procedure, the PD printer 1000 informs the DSC 3012 of the presence of object information (print start message) to be sent to it (1700), and notifies the DSC 3012 of print start using SendObject and ObjectData (1701).

<CDPS_PageEnd (Standard)>

Figure 24:
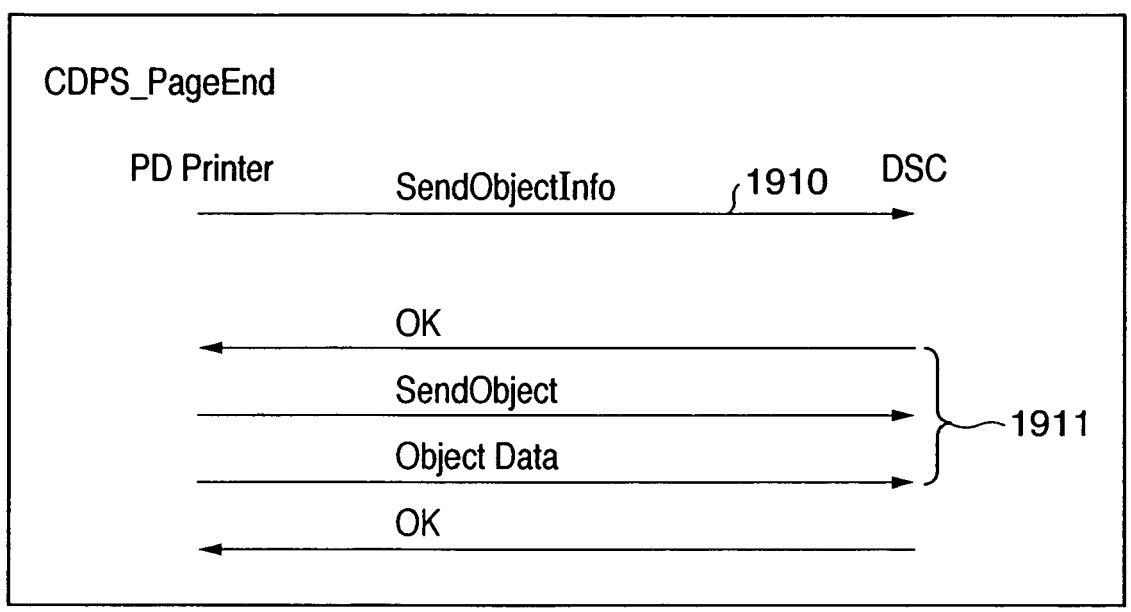
FIG. 24 is a chart for explaining an implementation example of a function (CDPS_PageEnd) that allows the PD printer to send a print end command for one page to the camera in the CDPS using the PTP architecture.

FIG. 24 is a chart for explaining an implementation example, using the PTP architecture, of the communication procedure that allows the PD printer 1000 to notify the DSC 3012 of a print process for one page in the CDPS according to this embodiment.

In this procedure, the PD printer 1000 notifies the DSC 3012 of the presence of object information (print end message) to be sent to it (1910), and notifies the DSC 3012 of print end for one page using SendObject and ObjectData (1911).

<CDPS_JobEnd (Standard)>

Figure 25:
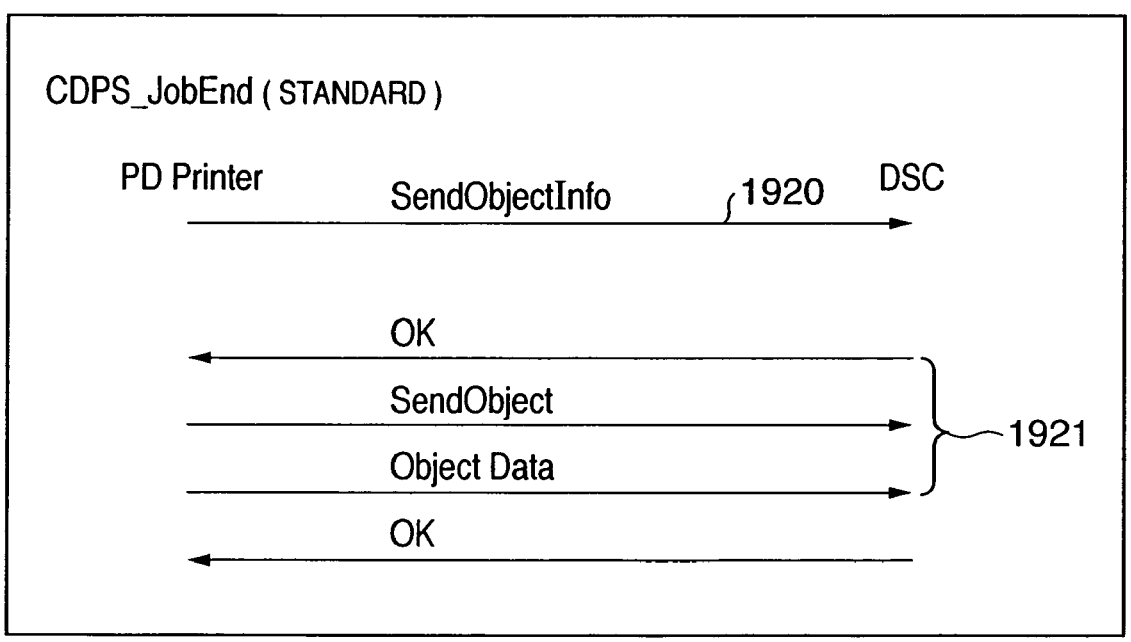
FIG. 25 is a chart for explaining an implementation example of a procedure that allows the PD printer to issue a print job end command (CDPS_JobEnd) to the camera in the CDPS using the PTP architecture.

FIG. 25 is a chart for explaining an implementation example, using the PTP architecture, of the communication procedure that allows the PD printer 1000 to notify the DSC 3012 of the end of a print job in the CDPS according to this embodiment.

The PD printer 1000 notifies the DSC 3012 of the end of a print process for one page (1920), and notifies the DSC 3012 of the end of a print job (1921).

<CDPS_Error (Standard)>

Figure 26:
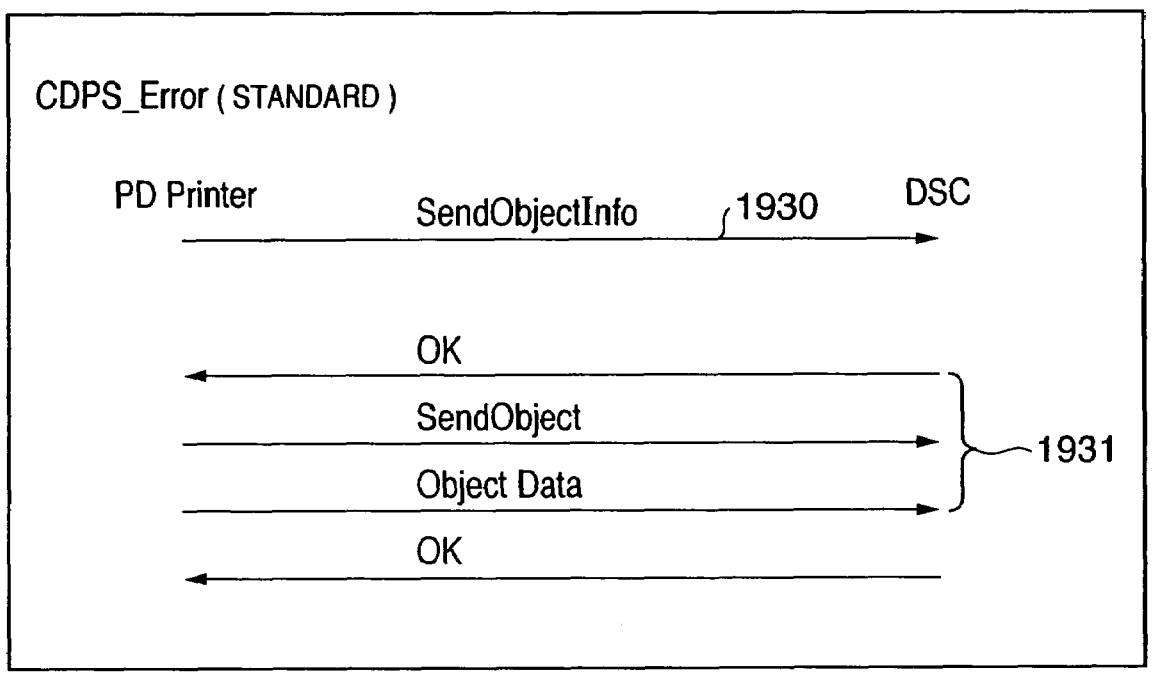
FIG. 26 is a chart for explaining an implementation example of a procedure of a function (CDPS_Error) that allows the PD printer to send error status to the camera in the CDPS using the PTP architecture.

FIG. 26 is a chart for explaining an implementation example, using the PTP architecture, of the communication procedure that allows the PD printer 1000 to notify the DSC 3012 of error status and the like in the CDPS according to this embodiment.

The PD printer 1000 notifies the DSC 3012 of the presence of object information (error information) to be sent to it using SendObjectInfo (1930). Upon reception of an affirmative response (OK) from the DSC 3012, the PD printer 1000 transmits status information of an error or the like using SendObject and ObjectData (1931).

<CDPS_Job (Standard)>

Figure 27:
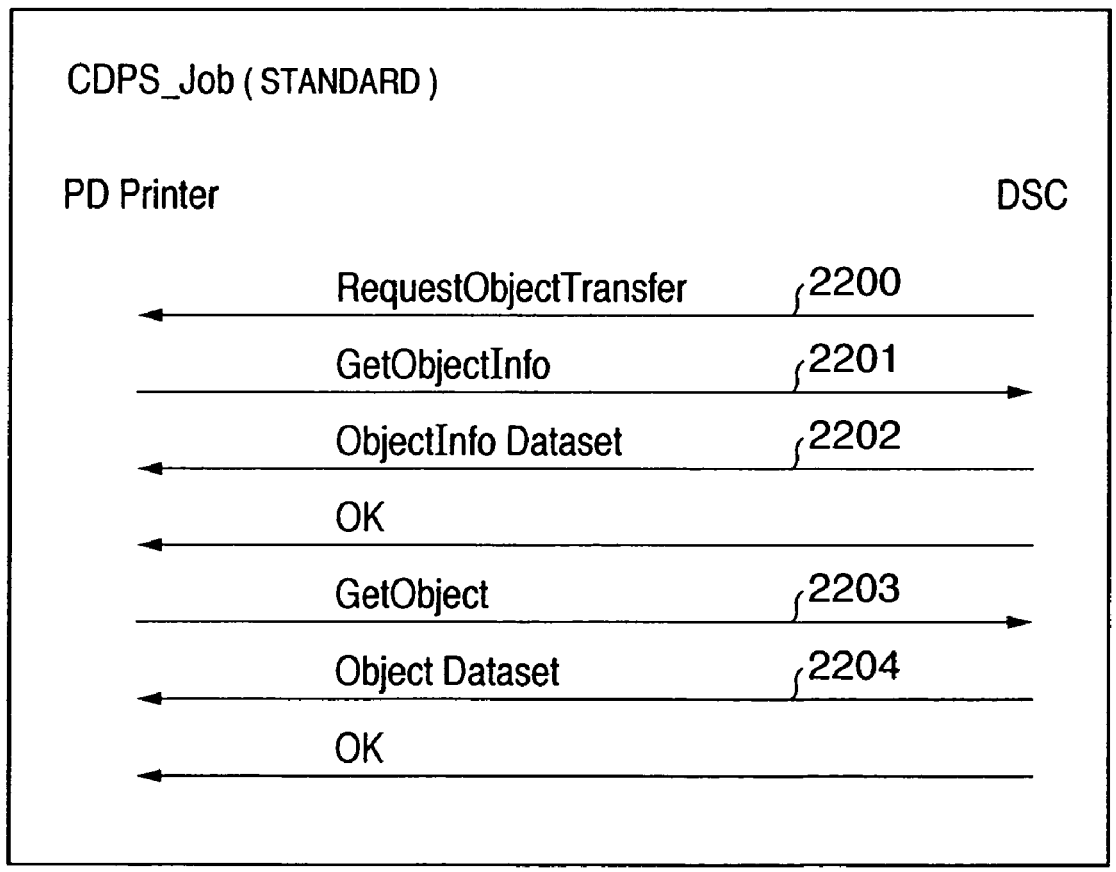
FIG. 27 is a chart for explaining an implementation example of a procedure that allows an operation controller to issue a print command to a print controller (CDPS_Job) in the CDPS using the PTP architecture.

FIG. 27 is a chart for explaining an implementation example, using the PTP architecture, of the communication procedure that allows the DSC 3012 (operation controller) to notify the PD printer 1000 of the start of a print job in the CDPS according to this embodiment.

The DSC 3012 sends RequestObjectTransfer to the PD printer 1000 to notify it that the DSC 3012 is to issue an instruction (2200). When the PD printer 1000 issues GetObjectInfo in response to this command (2201), the DSC 3012 transmits information associated with object information to be transmitted. When the PD printer 1000 requests object information (GetObject: 2203) in response to this information, the DSC 3012 transmits Object Dataset (print instruction) (2204), thus issuing a print command from the DSC 3012 to the PD printer 1000.

<CDPS_JobAbort (Standard)>

Figure 28:
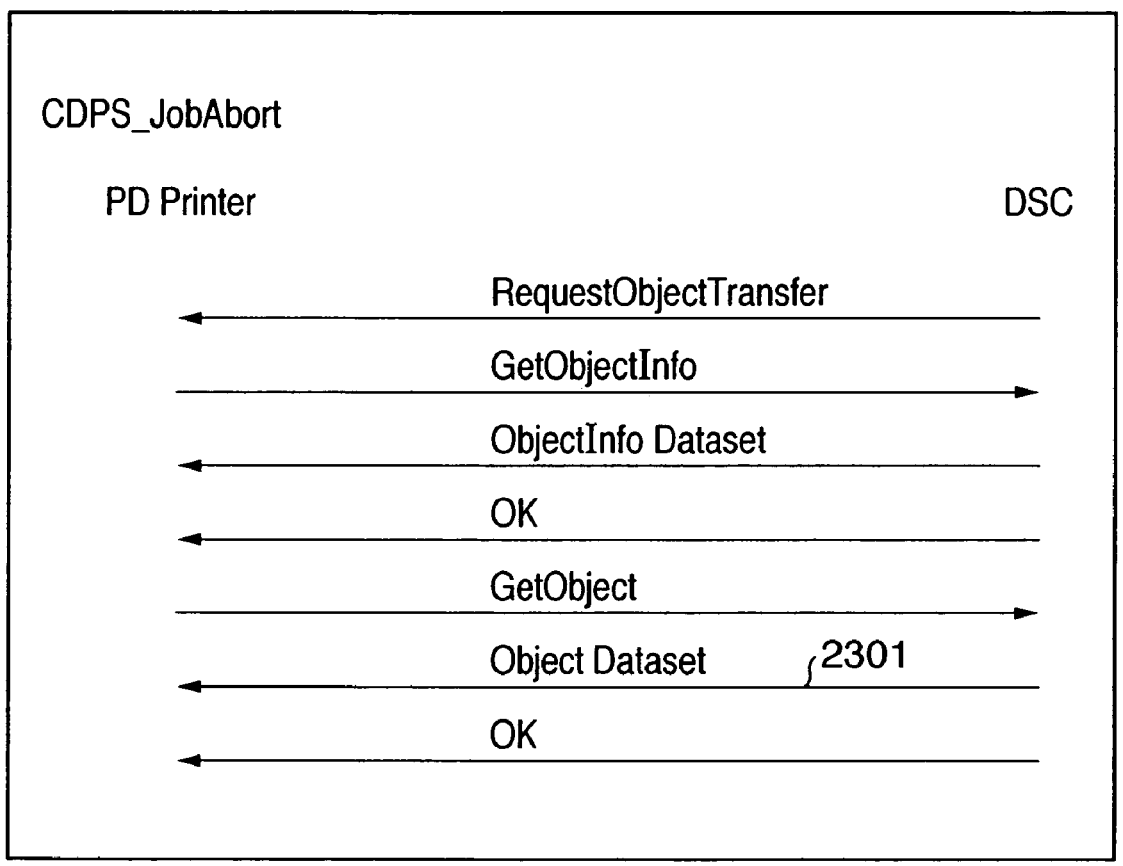
FIG. 28 is a chart for explaining an implementation example of a procedure that allows the operation controller to issue a print abort command to the print controller (CDPS_JobAbort) in the CDPS using the PTP architecture.

FIG. 28 is a chart for explaining an implementation example, using the PTP architecture, of the communication procedure that allows the DSC 3012 (operation controller) to issue a print abort command (CDPS_JobAbort) to the PD printer 1000 (print controller) in the CDPS according to this embodiment.

<CDPS_JobContinue (Standard)>

Figure 29:
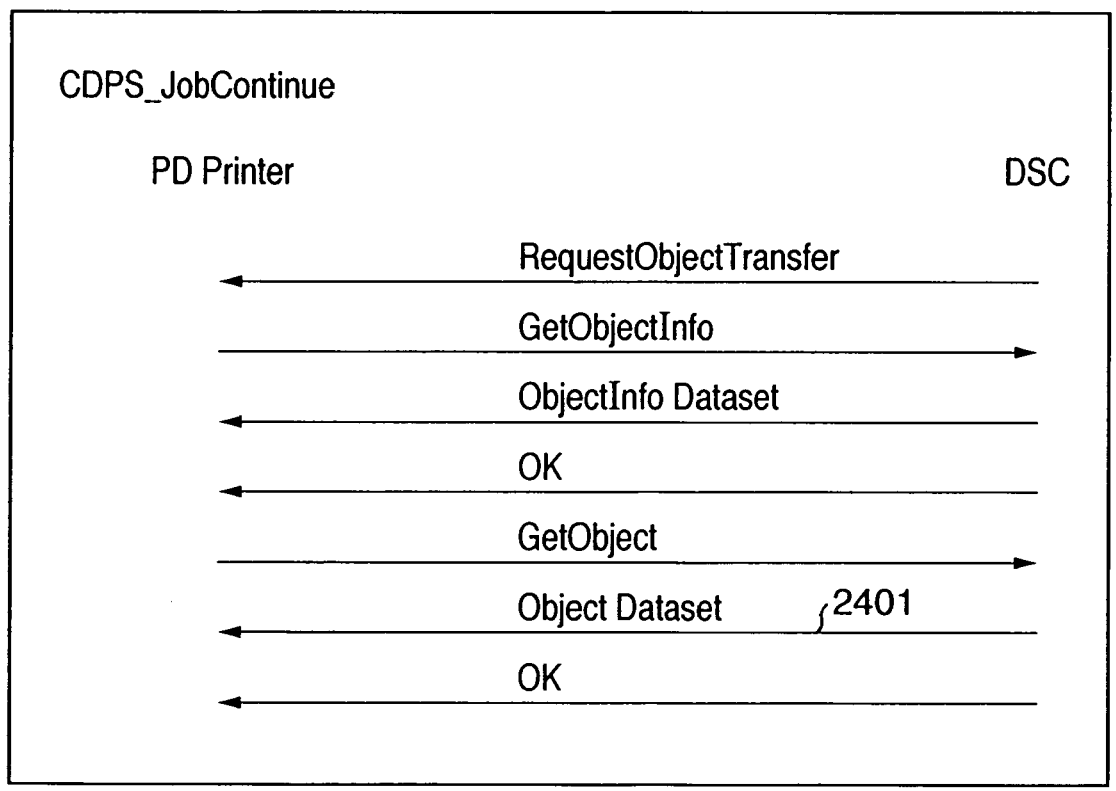
FIG. 29 is a chart for explaining an implementation example of a procedure that allows the operation controller to issue a print restart command to the print controller (CDPS_JobContinue) in the CDPS using the PTP architecture.

FIG. 29 is a chart for explaining an implementation example, using the PTP architecture, of the communication procedure that allows the DSC 3012 (operation controller) to issue a print restart command (CDPS_JobContinue) to the PD printer 1000 (print controller) in the CDPS according to this embodiment.

In FIGS. 28 and 29, after the same procedure as in FIG. 27 is executed, the DSC 3012 issues Object Dataset (print abort instruction) to the PD printer 1000 (2301 in FIG. 28), and issues Object Dataset (print continue instruction) to the PD printer 1000 (2401 in FIG. 29).

<CDPS_PartialJobData (Option)>

Figure 30:
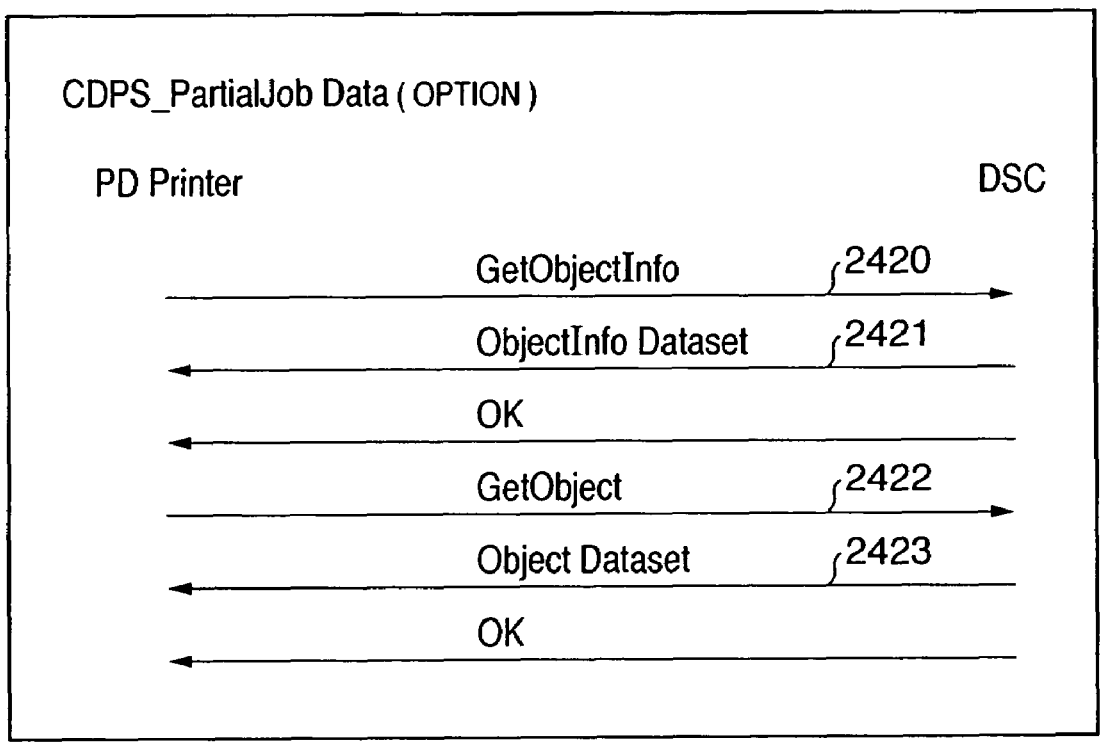
FIG. 30 is a chart for explaining an implementation example of a procedure that allows the print controller to issue a partial image acquisition command to a storage (CDPS_PrintJobData) in the CDPS using the PTP architecture.

FIG. 30 is a chart for explaining an implementation example, using the PTP architecture; of the partial image acquisition communication procedure (option) when the PD printer 1000 (print controller) acquires image data (JPEG image) held by the DSC 3012 (storage) in the CDPS according to this embodiment.

When the PD printer 1000 requests the DSC 3012 of information associated with an object held by the DSC 3012 (2420), the DSC 3012 sends information associated with that object (Object Dataset) to the PD printer 1000 (2421). The PD printer 1000 then issues an acquisition request (GetObject) by designating that object (2422). Since this partial image acquisition function designates the number of bytes from the head of desired image data (offset) and the number of bytes of image data to be acquired (size), as described above, the DSC 3012 transmits partial image data of that requested image file (Object Dataset) to the PD printer 1000 (2423). In this way, the PD printer 1000 can acquire desired partial image data from the DSC 3012. Note that the return values in this case are "Data_Size" and "Image_Data".

Figure 31:
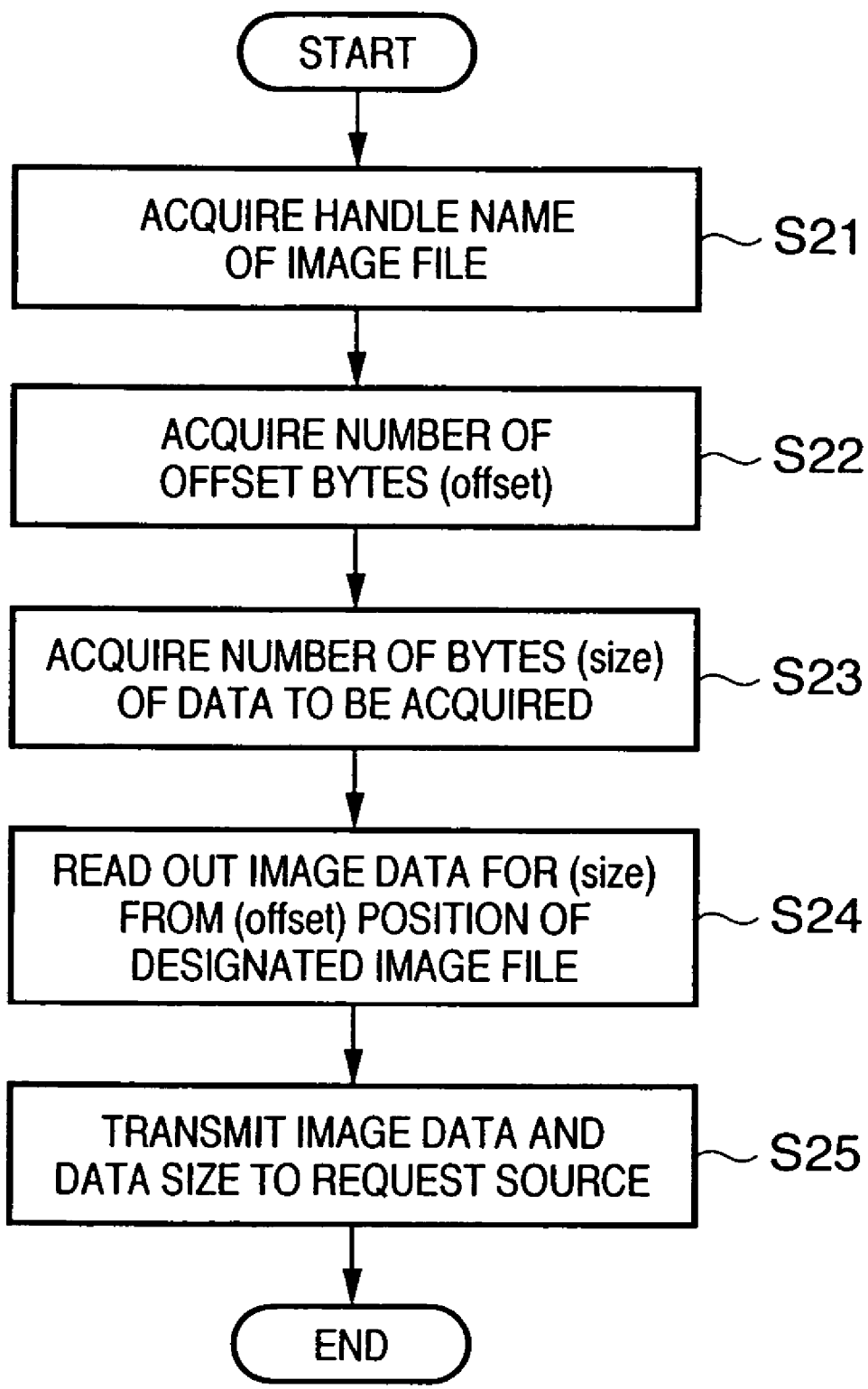
FIG. 31 is a flow chart for explaining a partial image acquisition process in the CDPS.

FIG. 31 is a flow chart showing the process in the DSC 3012 or storage upon reception of the partial image acquisition function that allows the PD printer 1000 (print controller) to acquire image data (JPEG image) held by the DSC 3012 (storage) in the CDPS according to this embodiment.

In step S21, the handle name of an image file contained in <image (#PCDATA)> is acquired. The flow advances to step S22 to acquire the number of bytes of an offset from the head from "offset". In step S23, the number of bytes of image data to be acquired is acquired from "size". The flow then advances to step S24 to read out image data with the designated number of bytes from the designated offset position of the image file in the storage device 811. The flow advances to step S25 to output the readout partial image data to the PD printer 1000 or print controller as the request source.

In the above description, the PTP architecture is used on USB of the physical layer. Examples using other architectures will be explained below.

[MSC Architecture]

An example using MSC (Mass Storage Class) will be described below. In this example, the leftmost interfaces in FIG. 7 are used. In this case, the UI of the PD printer 1000 is used in place of the UI of the DSC 3012. Hence, all of the aforementioned operation controller 801, storage controller 802, and print controller 803 are assigned to the PD printer 1000. Basically, using the file system of the PD printer 1000, the aforementioned commands GetJobData, GetPartialJobData, and GetDataList (by the file system) are executed using Open, Read, Close of an image file, directory manipulations (file manipulations), and the like.

<CDPS_ServiceDiscovery (Standard/Extended)>

In this case, the PD printer 1000 transmits CDPS_ServiceDiscovery to the DSC 3012. Even when the DSC 3012 has no CDPS initialize function mentioned above, if no response to this command returns, the PD printer 1000 automatically determines that reception is established in "standard" and starts MSC "bulk only". Then, the PD printer 1000 determines that it manages the operation controller 801, storage controller 802, and print controller 803, and sets CDPS_GetPartialData to "supported".

<CDPS_JobData (Standard)>

The PD printer 1000 acquires image data designated by a print command. In this case, the PD printer 1000 issues "Receive Command" to the DSC 3012, which transmits image data "Image Data" to the PD printer 1000 in response to that command. In practice, image data in the storage device 811 is acquired using a SCSI command via the file system built on the PD printer 1000. Note that the return values at this time are "Data_Size" and "Image_Data".

<CDPS_PartialJobData (Option)>

This procedure is basically the same as "CDPS_JobData" mentioned above, except that partial image data is to be acquired. Note that the return values in this case are also "Data_Size" and "Image_Data".

[Bluetooth Architecture]

An example using Bluetooth will be explained below. The rightmost interfaces in FIG. 7 are used. In this embodiment, agreements of upper application layers are described using Bluetooth Still Image Profile that can establish a session between two devices as upper communication layers of the physical layers so as to exchange objects.

In case of this Bluetooth Still Image Profile, another connection in the direction of DSC (Host)→PD printer (Slave) is formed in addition to the aforementioned connection, and information is transmitted by issuing a normal "PutImage" command from the DSC.

For the sake of simplicity, assume that
connection 1: PD printer (host)→DSC (slave)
connection 2: PD printer (slave)→DSC (host)

The protocols of respective service functions in Bluetooth will be explained below. Since the service functions shown in FIGS. 32 to 43 correspond to those shown in FIGS. 19 to 30 above, they will be briefly explained.

<CDPS_ServiceDiscovery (Standard/Extended)>

Figure 32:
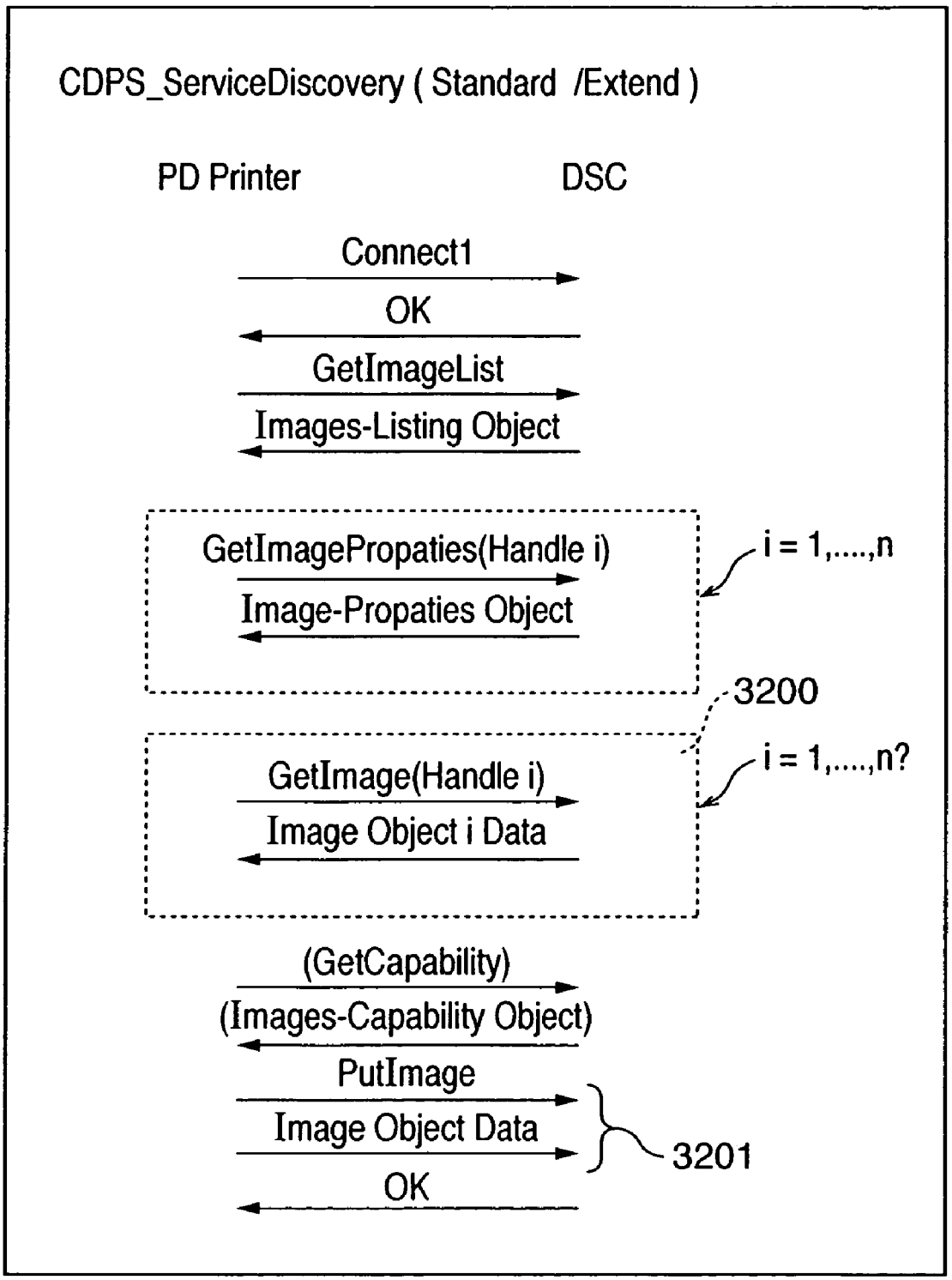
FIG. 32 is a chart for explaining a communication protocol of a transition command to the CDPS in Bluetooth.

FIG. 32 shows the protocol of the transition procedure to the CDPS in Bluetooth. As in FIG. 19, connection partners are recognized by keywords (Marco, Polo). The DSC 3012 notifies the support level of its UI in addition to this keyword (3200). Based on this support level, the PD printer 1000 notifies the DSC 3012 of the UI to be used of one of the DSC and PD printer 1000 by appending this information to a keyword (3201).

<CDPS_ServiceDiscovery (Standard/Extended)>

Figure 33:
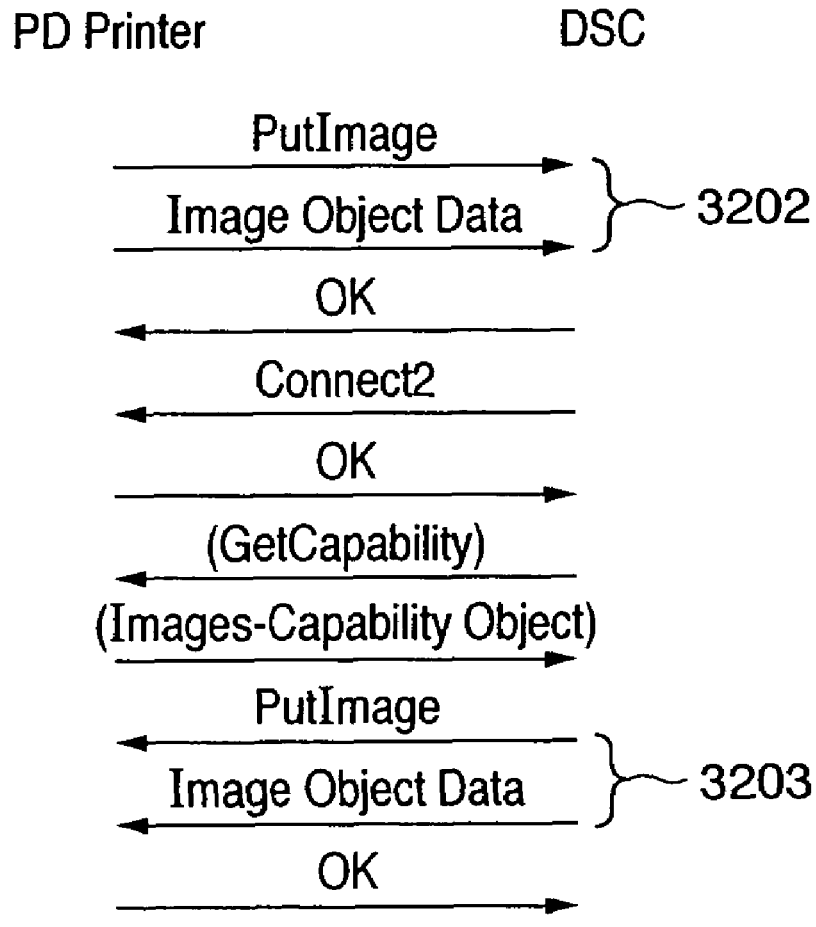
FIG. 33 is a chart for explaining a communication protocol of a transition command to the CDPS in Bluetooth.

FIG. 33 shows the subsequent part of the protocol of the transition procedure to the CDPS in Bluetooth, and a communication in the CDPS mode is established between the DSC 3012 and PD printer 1000. With this protocol, the PD printer notifies the DSC 3012 of the procedures ("standard", "extended") that the printer supports (3202), and the DSC 3012 notifies the PD printer 1000 of the procedure (e.g., "standard" that the DSC supports (3203).

<CDPS_Service (Standard)>

Figure 34:
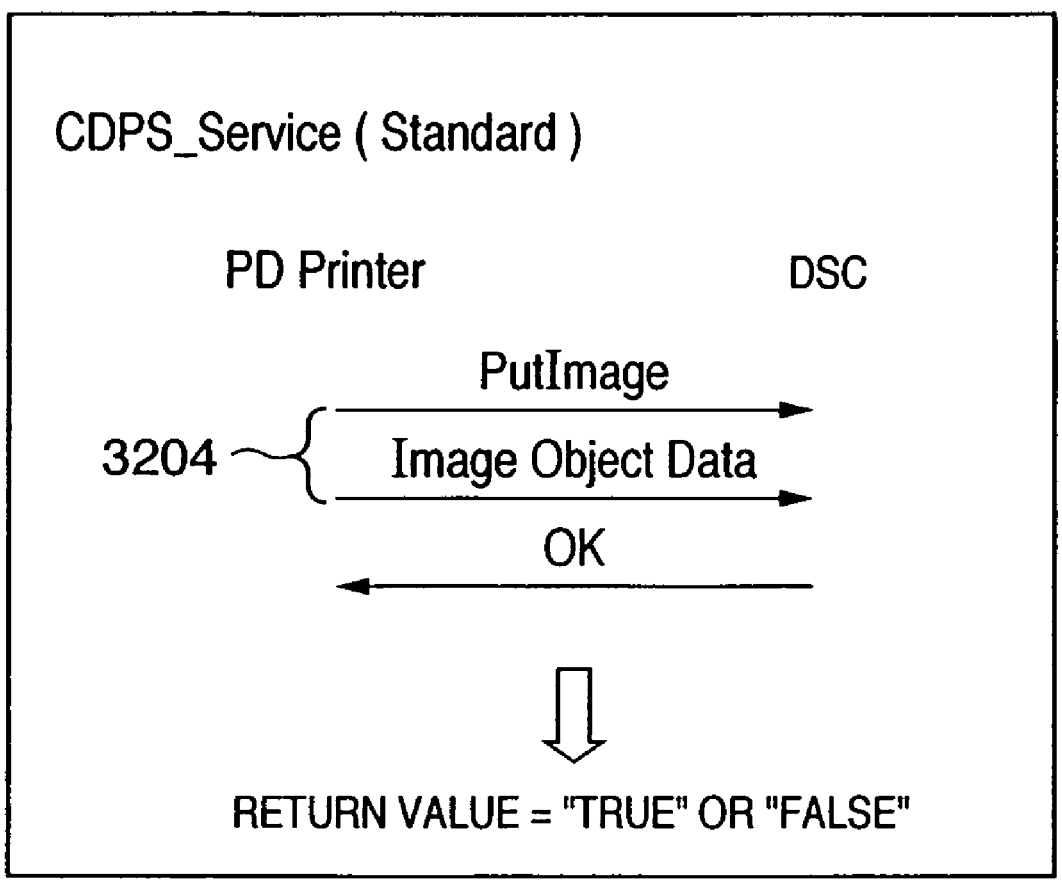
FIG. 34 is a chart for explaining a communication protocol of a printer function notification process in Bluetooth.

FIG. 34 is a chart for explaining the protocol of the notification procedure of the functions of the PD printer 1000 in Bluetooth. With this protocol, the PD printer 1000 notifies the DSC 3012 of the functions of the PD printer 1000 (3204).

<CDPS_JobData (Standard)>

Figure 35:
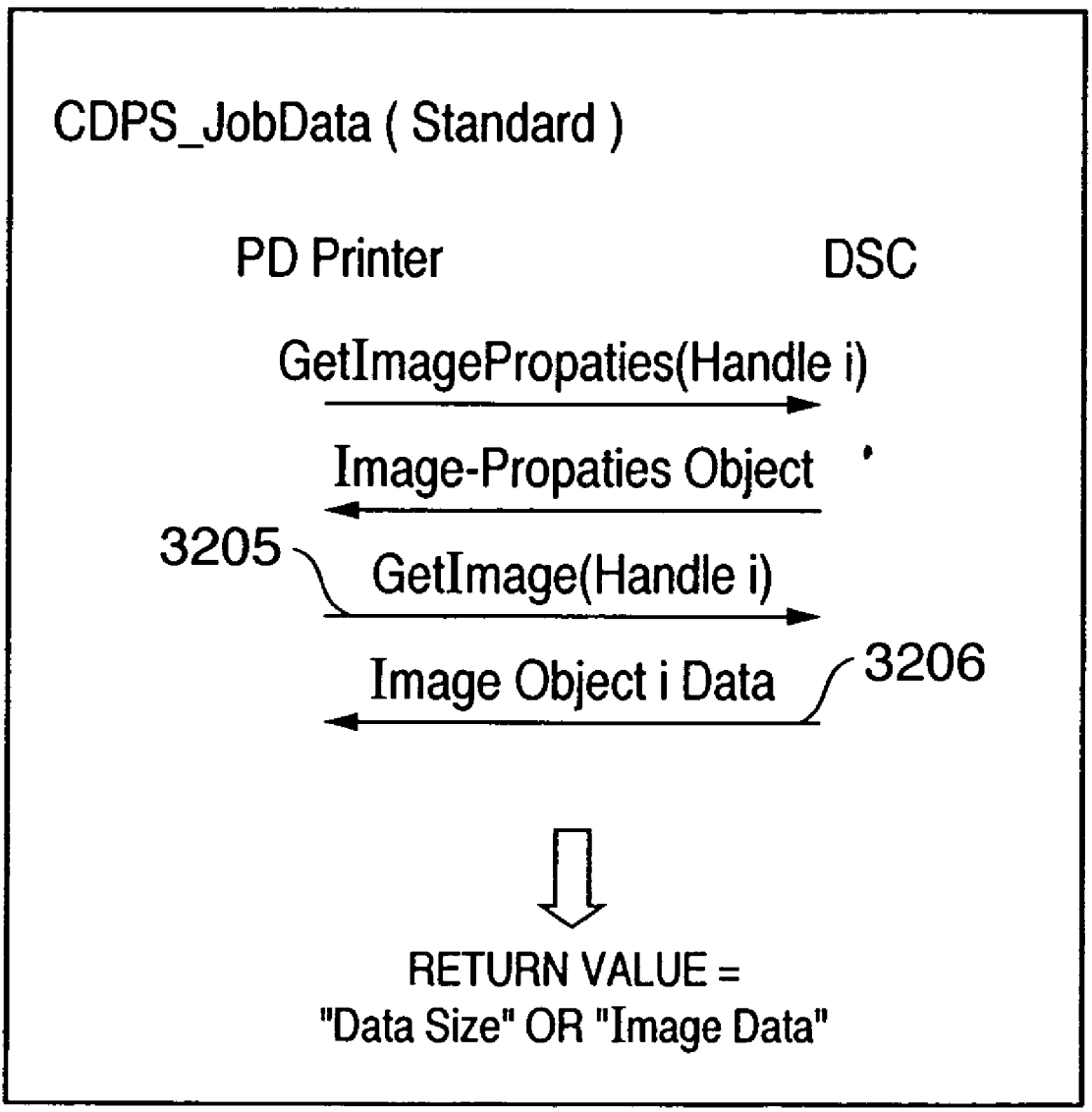
FIG. 35 is a chart for explaining a communication protocol of a process for acquiring image data from a storage in Bluetooth.

FIG. 35 is a chart showing the protocol that allows the PD printer 1000 to acquire image data from the DSC 3012 based on a print command in Bluetooth. The printer 1000 requests the DSC 3012 to send image data by specifying an image file (3205). The DSC 3012 transmits the requested image data to the printer 1000 (3206). The return values in this case are "Data Size" and "Image Data".

<CDPS_PageStart (Standard)>

Figure 36:
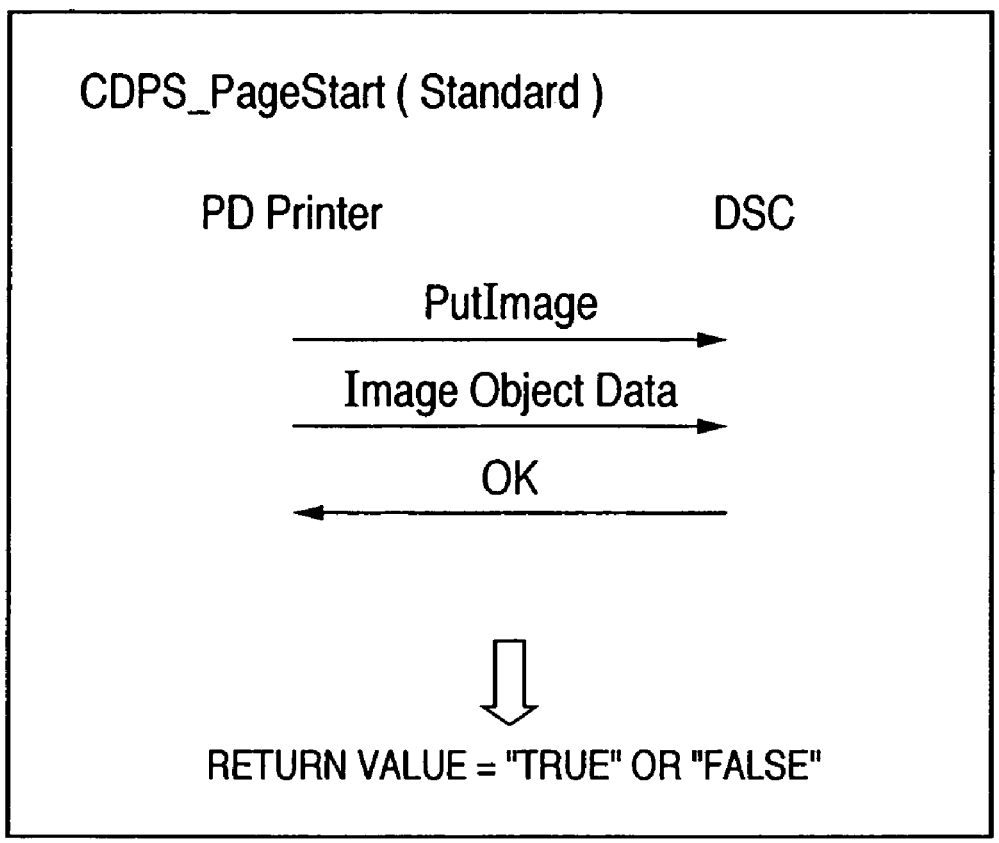
FIG. 36 is a chart for explaining a communication protocol of print start notification in Bluetooth.

FIG. 36 shows the protocol that allows the PD printer 1000 to notify the DSC 3012 of print start in Bluetooth, and print start is notified using Image Object Data.

<CDPS_PageEnd (Standard)>

Figure 37:
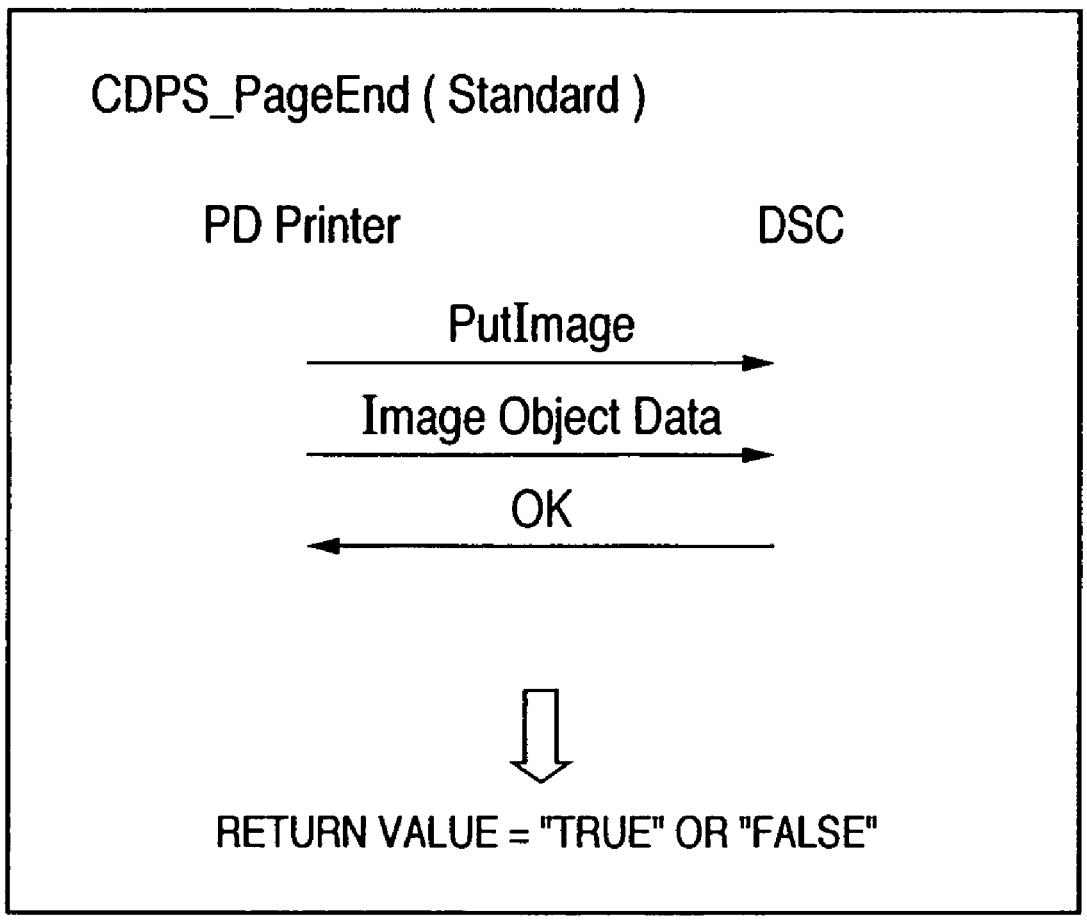
FIG. 37 is a chart for explaining a communication protocol of print end notification in Bluetooth.

FIG. 37 is a chart showing the protocol that allows the PD printer 1000 to notify the DSC 3012 of print end for one page in Bluetooth, and the printer notifies print end using Image Object Data.

<CDPS_JobEnd (Standard)>

Figure 38:
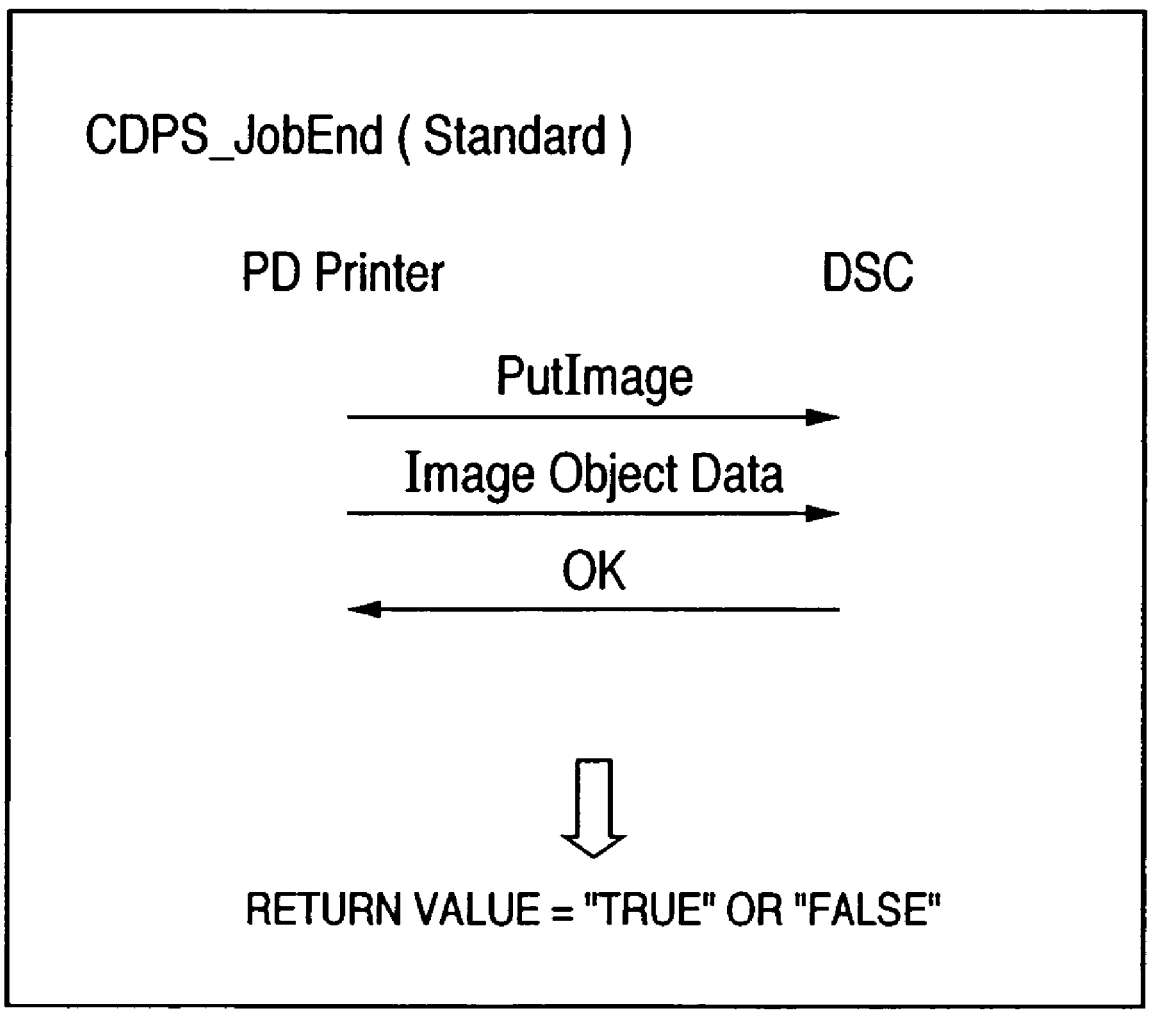
FIG. 38 is a chart for explaining a communication protocol of print job end notification in Bluetooth.

FIG. 38 is a chart showing the protocol that allows the PD printer 1000 to notify the DSC 3012 of the end of a print job in Bluetooth, and the printer notifies the end of a print job using Image Object Data.

<CDPS_Error (Standard)>

Figure 39:
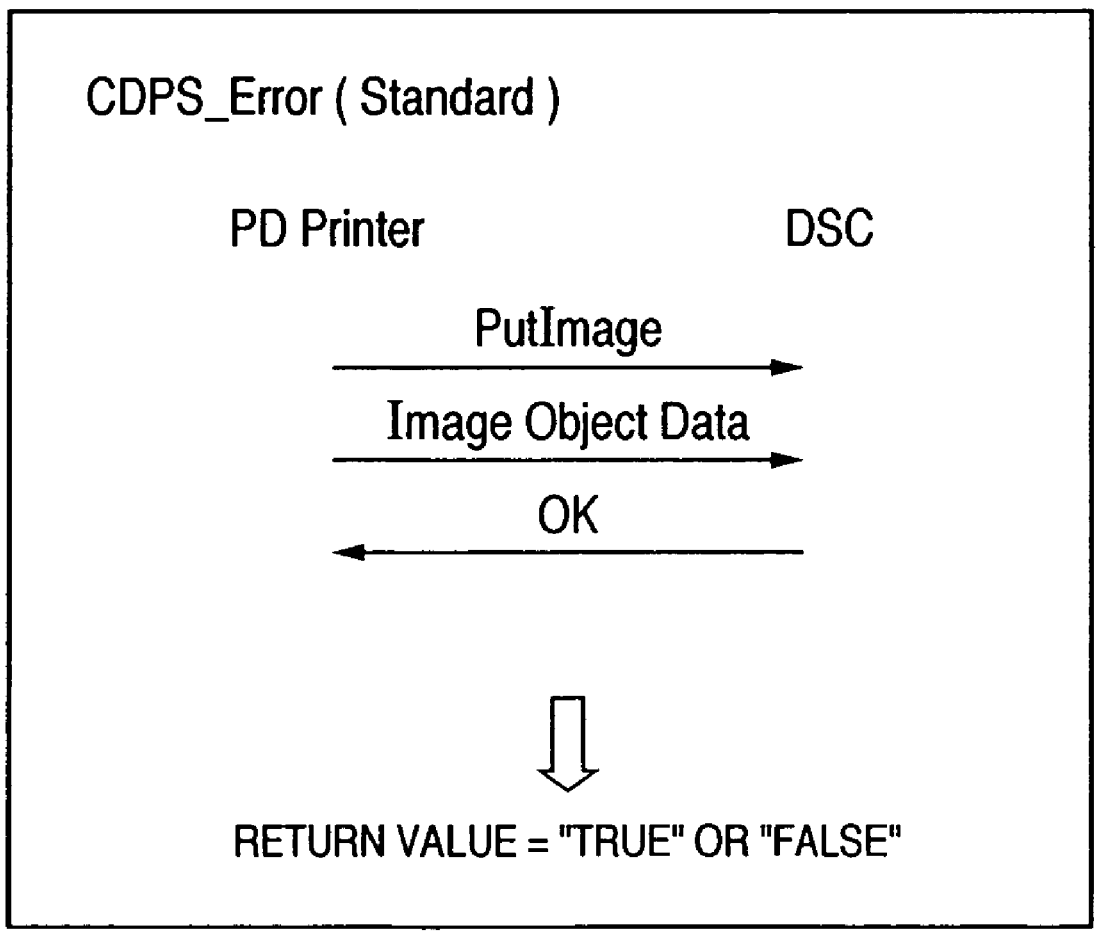
FIG. 39 is a chart for explaining a communication protocol of printer error notification in Bluetooth.

FIG. 39 is a chart showing the protocol that allows the PD printer 1000 to notify the DSC 3012 of a printer error in Bluetooth, and the printer 1000 notifies a printer error using Image Object Data.

<CDPS_Job (Standard)>

Figure 40:
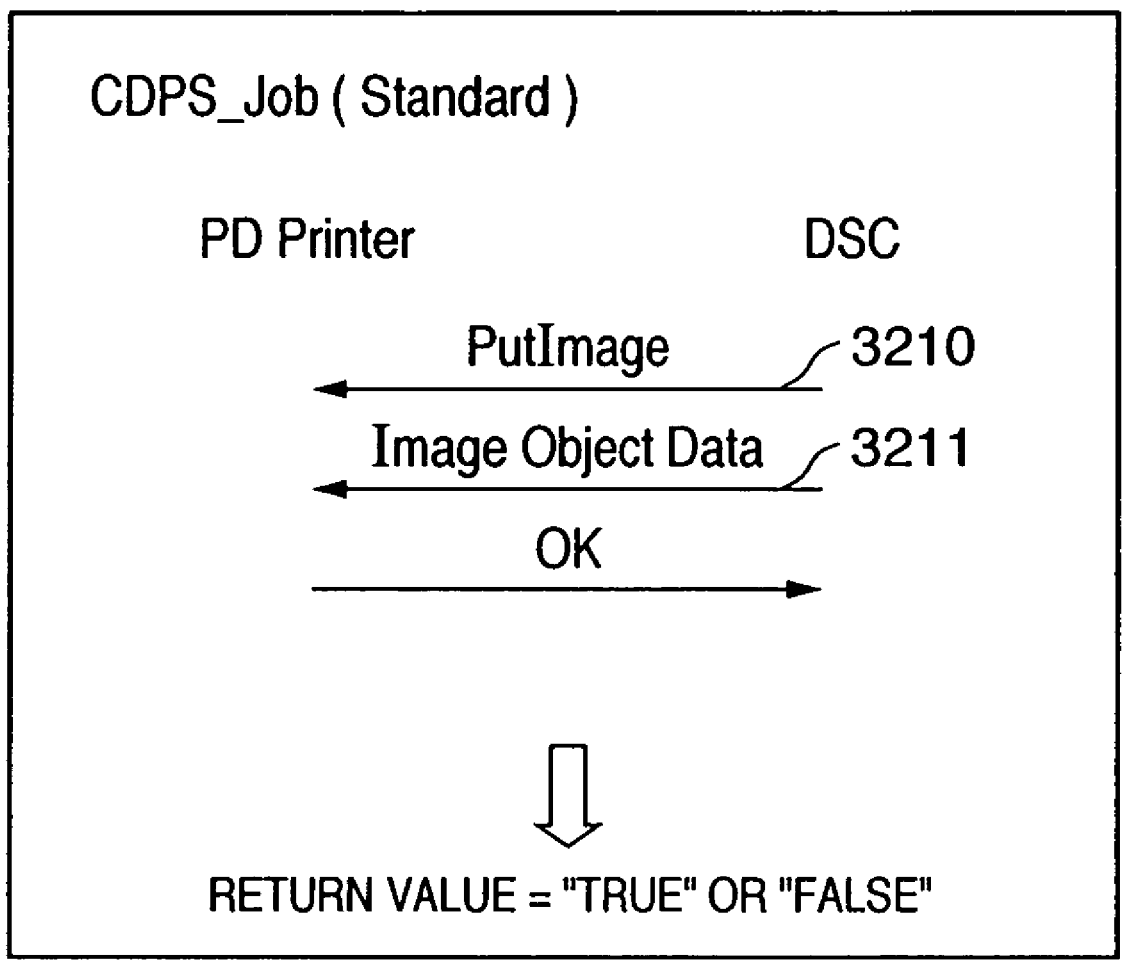
FIG. 40 is a chart for explaining a communication protocol of a print command issuance process in Bluetooth.

FIG. 40 is a chart showing the protocol that allows the DSC 3012 to issue a print command to the PD printer 1000 in Bluetooth. With this protocol, the DSC 3012 informs the printer 1000 that it is ready to issue an instruction (3210). The DSC 3012 then issues a print instruction to the printer 1000 (3211).

<CDPS_JobAbort (Standard)>

Figure 41:
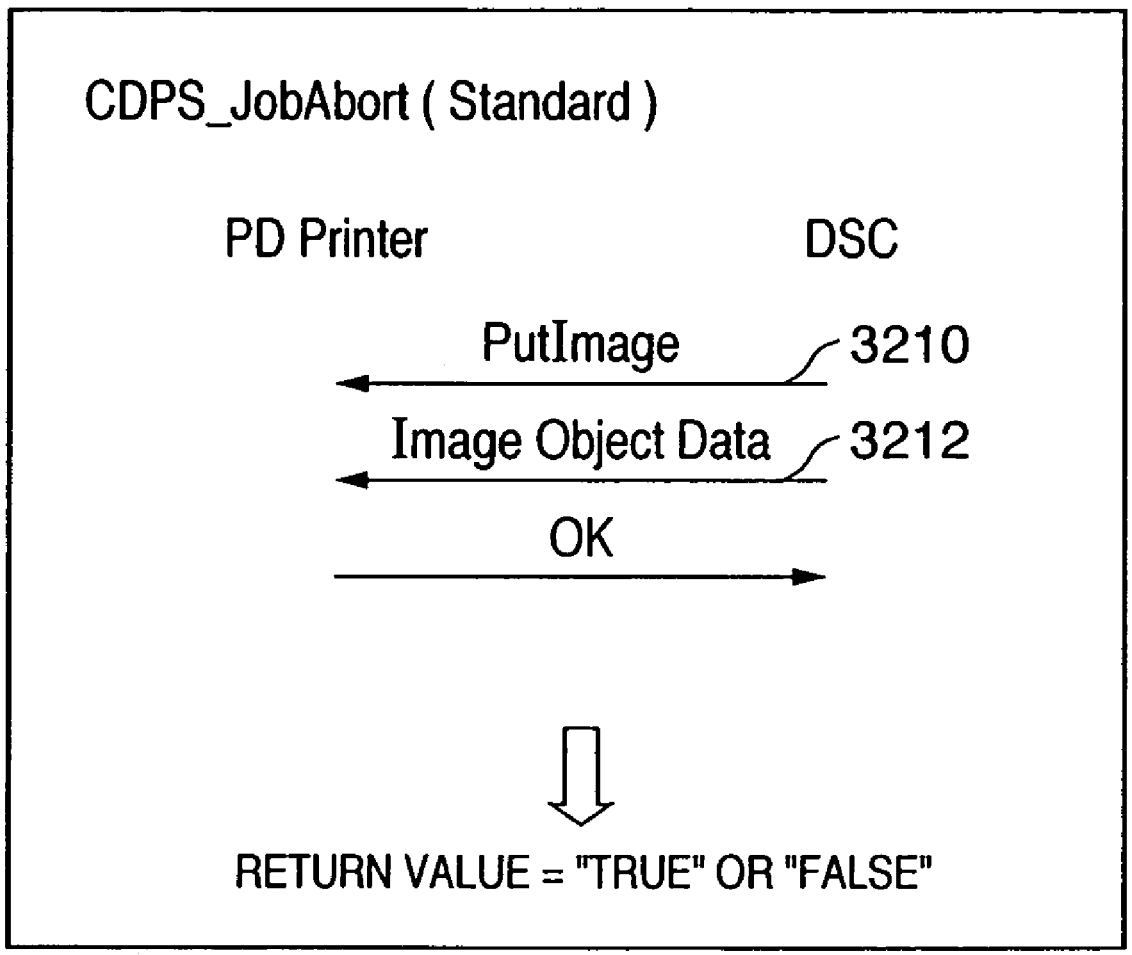
FIG. 41 is a chart for explaining a communication protocol of a print abort command issuance process in Bluetooth.

FIG. 41 is a chart showing the protocol that allows the DSC 3012 to issue a print abort command to the PD printer 1000 in Bluetooth. With this protocol, the DSC 3012 informs the printer 1000 that it is ready to issue an instruction (3210). The DSC 3012 then issues a print abort instruction to the printer 1000 (3212).

<CDPS_JobContinue (Standard)>

Figure 42:
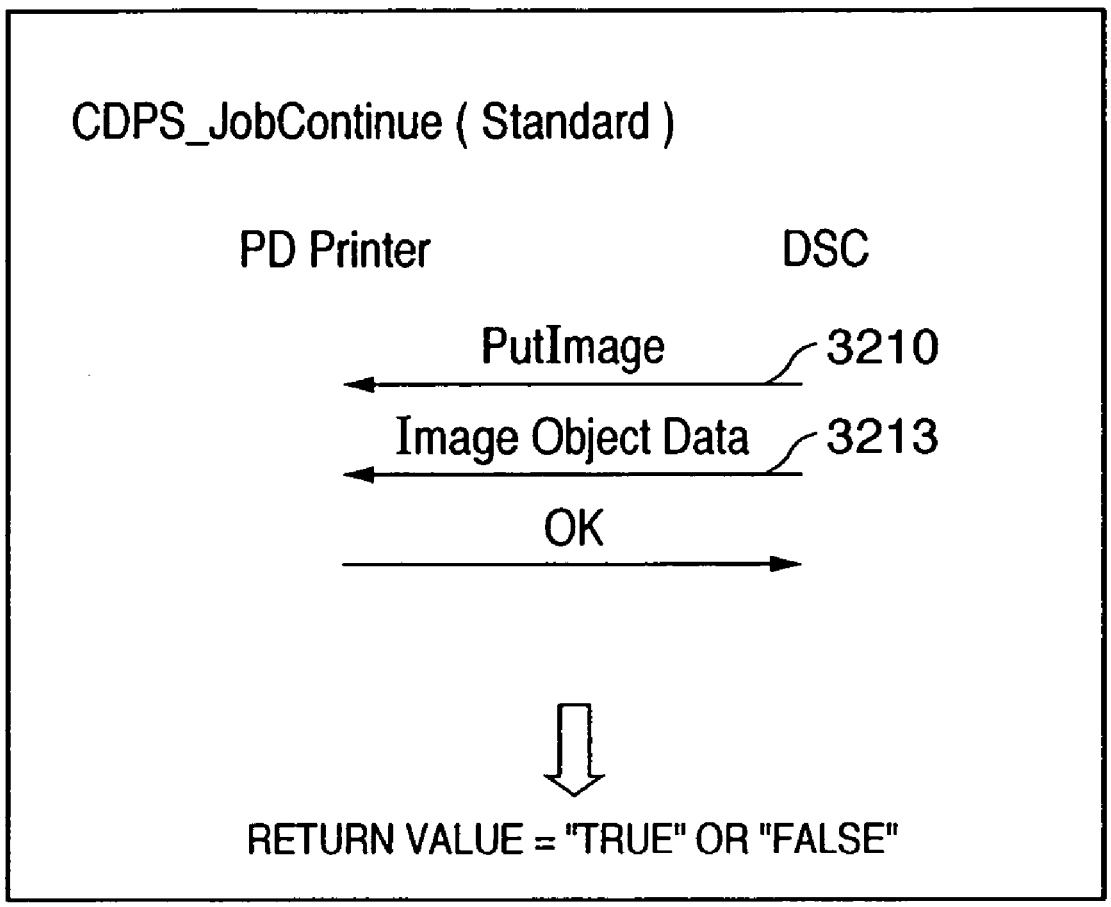
FIG. 42 is a chart for explaining a communication protocol of a print job restart command issuance process in Bluetooth.

FIG. 42 is a chart showing the protocol that allows the DSC 3012 to issue a print restart command to the PD printer 1000 in Bluetooth. With this protocol, the DSC 3012 informs the printer 1000 that it is ready to issue an instruction (3210). The DSC 3012 then issues a print continue instruction to the printer 1000 (3213).

<CDPS_PartialJobData (Option)>

Figure 43:
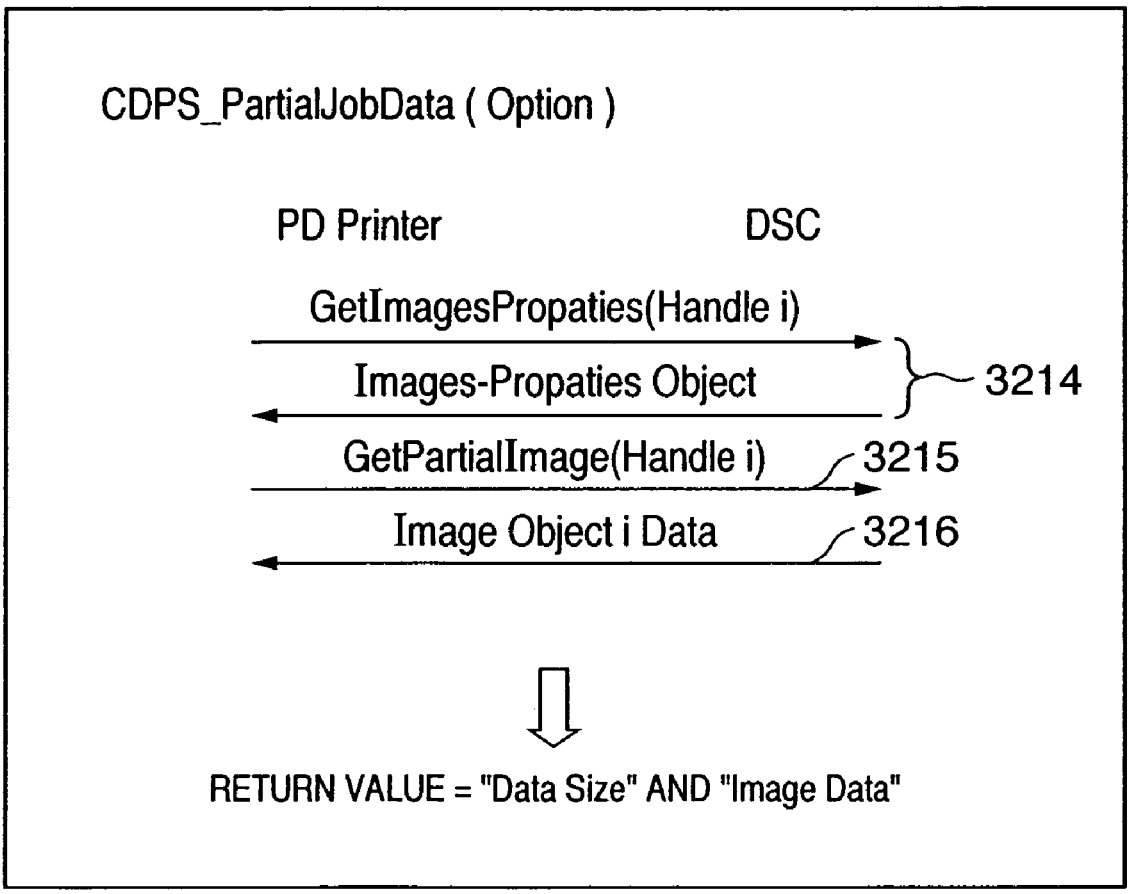
FIG. 43 is a chart for explaining a communication protocol of a partial image acquisition process in Bluetooth.

FIG. 43 is a chart showing the protocol that allows the PD printer 1000 to acquire partial image data from the DSC 3012 based on a print command. The return values in this case are "Data Size" and "Image Data". The printer 1000 requests the property of an image file of the i-th handle (3214), and requests a partial image of that image file (3215). In response to this request, the DSC 3012 transmits the requested partial image data to the printer 1000 (3216).

FIGS. 44A to 44C depict tables for explaining the support levels of the DSC 3012 and PD printer 1000, which serve as criteria upon determining how to assign various control functions (operation controller 801, storage controller 802, and print controller 803) mentioned above. FIG. 44A shows the support levels of the operation controller 801, FIG. 44B shows those of the storage controller 802, and FIG. 44C shows those of the print controller 803. Note that the DSC 3012 can set support levels "0" to "4", and the PD printer 1000 can set support levels "1" to "3". If the DSC 3012 and PD printer 1000 have the same support level, which of functions is to be preferentially used is left to the discretion of the decision side.

For example, in the support levels of the operation controller 801 in FIG. 44A, level "4" claims use of the function of the DSC 3012, and level "3" indicates that the viewer and operation buttons are equipped. Level "2" indicates that only operation buttons are equipped, level "1" indicates that only minimum required functions are provided, and level "0" indicates that this function is not supported.

In the support levels of the storage controller 802 in FIG. 44B, level "4" claims use of the function of the DSC 3012, and level "3" indicates that a handle function is equipped. Level "2" indicates that an image file system is provided, level "1" indicates that only a function of accessing the storage device 811 is supported, and level "0" indicates that this function is not supported.

Furthermore, in the support levels of the print controller 803 shown in FIG. 44C, level "4" claims use of the function of the DSC 3012, and level "3" indicates that a rendering function is equipped. Level "2" indicates that only a halftoning process is supported, level "1" indicates that only a JPEG decoding function is supported, and level "0" indicates that this function is not supported.

The functions of the PD printer 1000 and DSC 3012 presented in this way are compared, the most efficient one of the functions is determined for each function, and function assignments shown in FIGS. 12 to 14, FIG. 17, and FIG. 18 above are implemented.

First Embodiment

A print system formed by the DSC 3012 and PD printer 1000 according to the first embodiment of the present invention will be exemplified below. In the print system according to the first embodiment, a case will be explained below wherein the print process based on the CDPS according to this embodiment is executed using a DPOF file stored in the DSC 3012. Note that this DPOF file may be generated using operation buttons and the switches 3103 on the basis of the contents displayed on the display unit 2700 of the DSC 3012, or it may be generated based on operations at the PC 3010 while the PC 3010 and DSC 3012 are connected. In either case, this DPOF file is stored in the memory card 3019 together with image data.

FIG. 45 shows a data example of the aforementioned DPOF file.

In case of FIG. 45, images to be printed are described in two lines indicated by:
../DCIM/105GANON/IMG_0572.JPG
../DCIM/105GANON/IMG_0573.JPG This means that a directory "DCIM" includes a subdirectory "105GANON", and image data with a file name "IMG_0572.JPG" or "IMG_0573.JPG" in that subdirectory is designated as an image to be printed.

Figure 46:
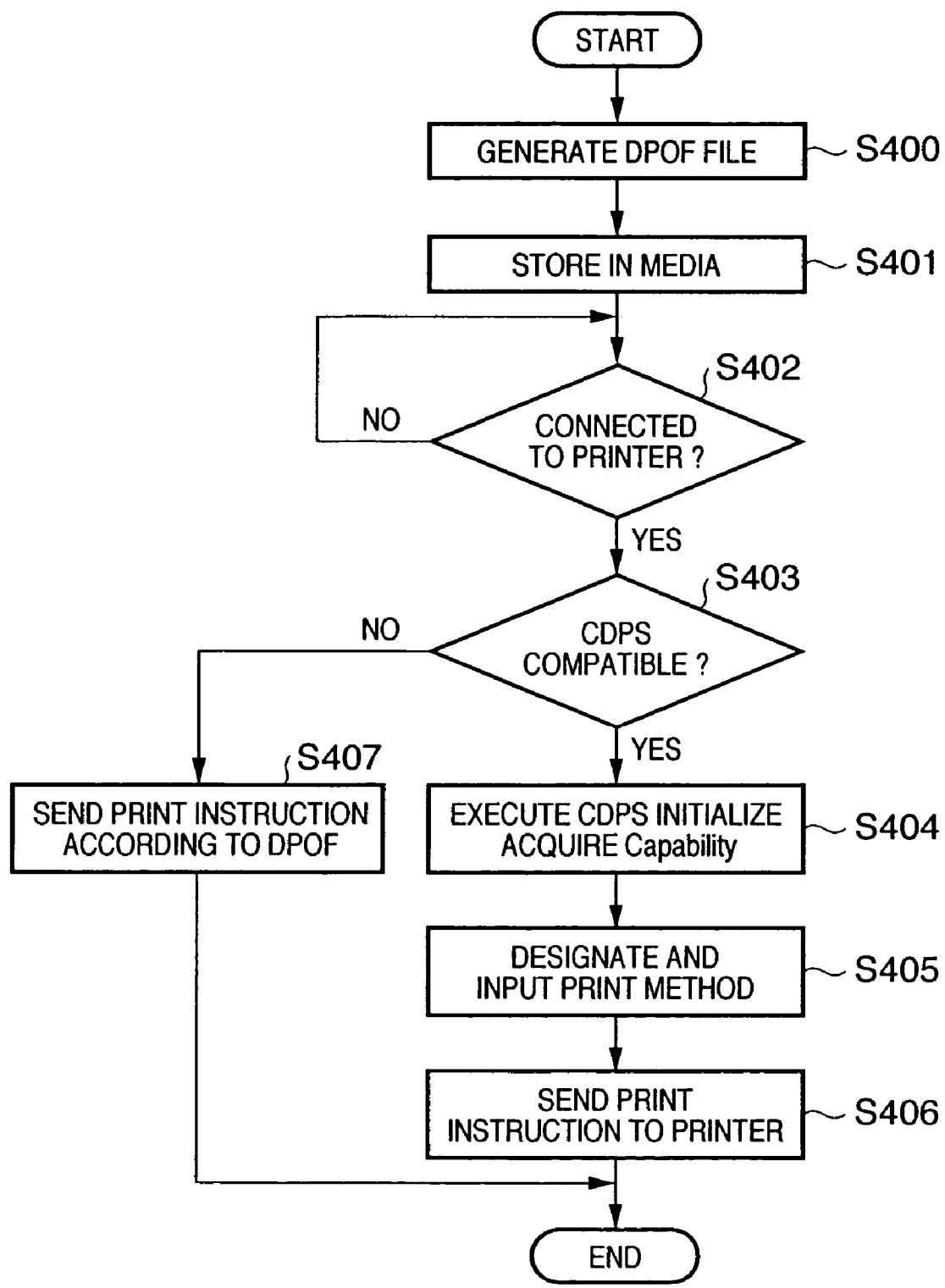
FIG. 46 is a flow chart for explaining a control process by the DSC according to the first embodiment of the present invention.

FIG. 46 is a flow chart for explaining the process in the DSC 3012 when the DSC 3012 according to the first embodiment issues a print instruction to the PD printer 1000.

In step S400, a DPOF file is generated, as described above. The flow advances to step S401, and the generated DPOF file is stored in the memory card. Note that this DPOF file is normally generated while the DSC 3012 is offline (it is connected to neither the PC nor the printer). It is checked in step S402 if the DSC 3012 is connected to the printer. If YES in step S402, the flow advances to step S403 to check if the connected printer is compatible to the aforementioned CDPS. If NO in step S403, the flow advances to step S407, the DPOF file stored in the memory card 3109 is transmitted to the printer so as to instruct it to execute a print process based on that DPOF file.

On the other hand, if it is determined in step S403 that the printer is compatible to the CDPS (assume that the aforementioned PD printer 1000 is connected in this case), the flow advances to step S404 to execute the CDPS initialize process, thereby acquiring Capability from the printer. The flow advances to step S405 to designate a print method which is not designated in the DPOF file and is to be used by the operator with reference to the functions of the connected PD printer 1000. This print method includes, for example, the paper type, print quality, layout print, and the like used in the print process. Upon completion of the designation inputs of the print method, if a print start instruction is issued using the operation button 3103, the flow advances to step S406 to send an image selected by the DPOF file stored in the memory card and the contents that instruct its print method to the PD printer 1000, thereby executing a print process.

Note that a default print condition can be set in step S405 in addition to the functions of the printer.

With this method, when the user takes photos using this DSC 3012 while, e.g., traveling, he or she sets photos to be output and their numbers of prints and stores them in the memory card 3109. After reaching home, the user can set the print method in correspondence with the functions of the connected printer, and can print photos.

According to this method, since the DSC 3012 need only send images designated by the DPOF file from the stored image information, and a print method corresponding to the connected printer to that printer, the arrangement of the DSC 3012 can be simplified.

Modification of First Embodiment

In this embodiment, a print method setup process can be completed by transferring only the CDPS print designation since a DPOF file used in a print process is designated in CDPS_job as a print designation command of the CDPS. In this way, the relationship between selection of an image and its print method can become more obvious than the above first embodiment.

In this case, the process of the DSC can be executed in substantially the same manner as in the flow chart shown in FIG. 46, but the process in step S406 is slightly different. That is, in step S406 CDPS commands are generated based on the print instruction input in step S405, and a DPOF file to be printed is set in a handle used to designate an image.

A practical example of such commands will be described below.

An example of CDPS_job that prints on L-size paper in a 2×2 layout on the basis of a DPOF file designated by handle 1 will be described below.

In the following description, a phrase on the right side of ":" explains a command described in < >.

```
<?XML version="1.0" encoding=UTF-16"?>
<command(CDPS_job)>
<job>
<capability>
<papersize("L")>              : paper size (L size)
<papertype("Photo")>          : photo paper
<date("off")>                 : date print = OFF
<layout("2×2")>               : layout 2 × 2
</capability>
<printlist>
<image("handle1")>            : handle1 = DPOF file
</printlist>
</job>
```

In the aforementioned command sequence, <capability> designates the paper size, paper type, and date print except for layout, and the layout is generated by the DSC 3012 based on the capability of the PD printer 1000 and corresponds to a command of the CDPS. An image to be printed is designated by the DPOF file (<image("handle1")>: handle1=DPOF file).

In this manner, the CDPS according to this embodiment can be easily associated with the DPOF file. Note that the first embodiment is premised on that the PD printer 1000 have a decoding function of this DPOF file.

A field of "DPOF file" may describe the file name of that DPOF file or directory information.

The DPOF file itself is not an image file. When a reproduction apparatus such as a printer or the like recognizes that information sent as an image file is a DPOF file, it decodes the DPOF file, and recognizes a file name as image designation information described in that file.

The printer requests the camera of a handle list, and recognizes a handle corresponding to the decoded file name.

Then, the printer requests the camera of image data using the recognized handle name corresponding to an image which is designated to be printed.

Second Embodiment

The second embodiment of the present invention will be described below. In this embodiment, the DSC 3012 interprets a DPOF file, and sends a command sequence based on the aforementioned CDPS to the PD printer 1000.

Figure 47:
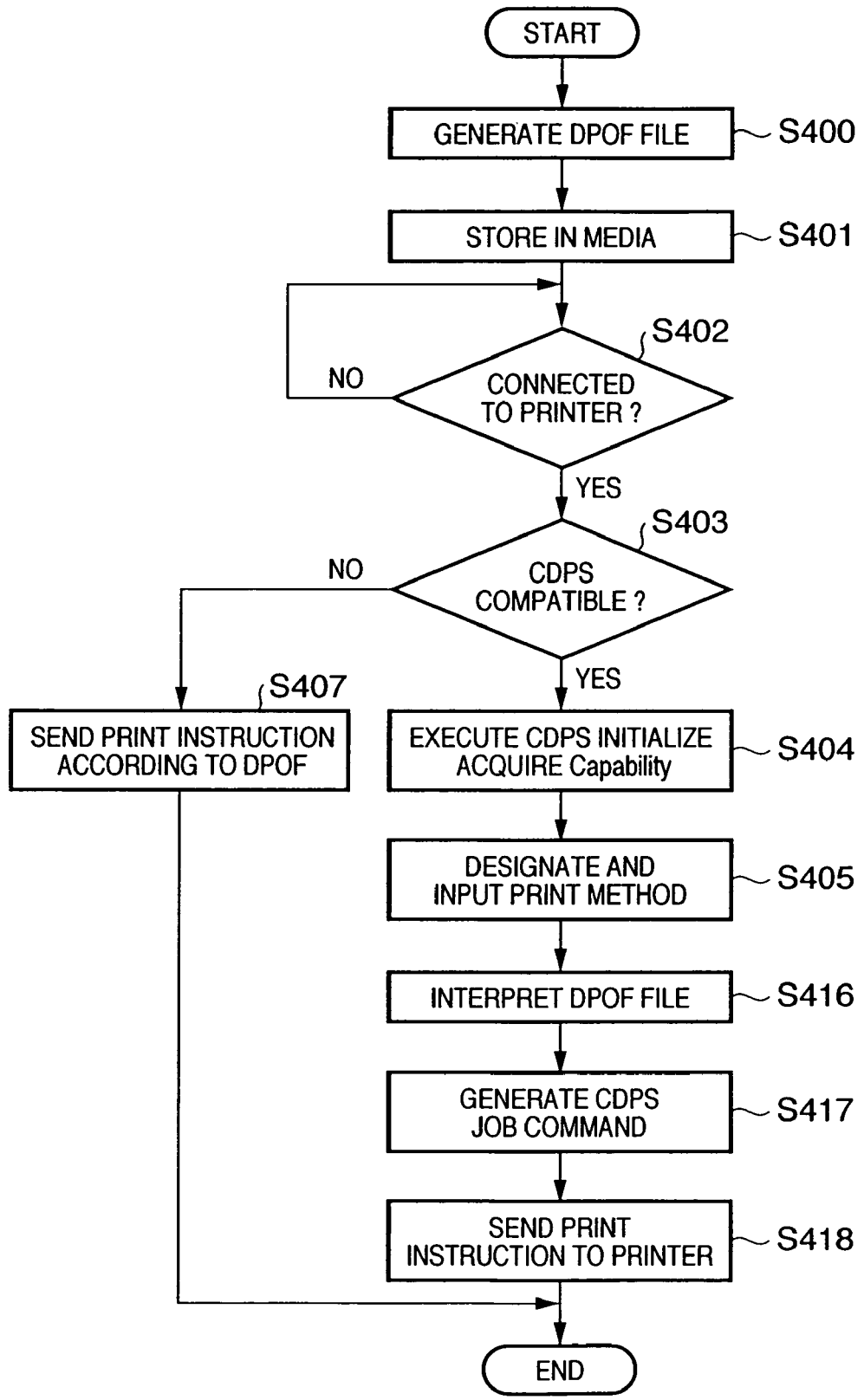
FIG. 47 is a flow chart for explaining a control process by the DSC according to the second embodiment of the present invention.

The process in this case will be described below with reference to the flow chart in FIG. 47. Note that the same step numbers in FIG. 47 denote processes common to those in FIG. 46, and a description thereof will be omitted. In FIG. 47, the processes in steps S400 to S405 and S407 are the same as those in FIG. 46.

If a print method which is compatible to the connected printer 1000 is input and designated in step S405, the flow advances to step S416, and a DPOF file stored in the memory card 3109 is read out and interpreted. Then, a CDPS job command formed by embedding image designation information which specifies an image selected by that DPOF file in a CDPS command sequence is generated. The flow then advances to step S418 to issue a print instruction to the PD printer on the basis of that CDPS job command.

A practical example of such command will be described below.

In the following description, a phrase on the right side of ":" explains a command described in < >.

An example of CDPS_job that prints images (specified by the DPOF file) designated by handle 1 on L-size paper in a 2×2 layout will be described below.

```
<?XML version="1.0" encoding=UTF-16"?>
<command(CDPS_job)>
<job>
<capability>
<papersize("L")>            : paper size (L size)
<papertype("Photo")>        : photo paper
<date("off")>               : date print = OFF
<layout("2×2")>             : layout 2 × 2
</capability>
<printlist>
    <image("handle1")>           : handle of the first
                          image designated in the DPOF file
<image("handle2")>               : handle of the second
                         image designated in the DPOF file
...
```

-continued

```
<image("handleN")>               : handle of the N-th
                          image designated in the DPOF file
</printlist>
</job>
```

In this case, since the printer need only support CDPS commands, the arrangement of the printer can be simplified.

If the print setups described in a DPOF file are different from those described in a CDPS script, whether the instructions of the DPOF file or CDPS are to be preferentially used may be designated.

When the DPOF file is preferentially used, a print process that reflects the intention of the user who took photos and designated the print method can be realized. Conversely, when the setups based on the CDPS are preferentially used, a print process based on the functions of the printer can be realized.

Third Embodiment

Figure 48:
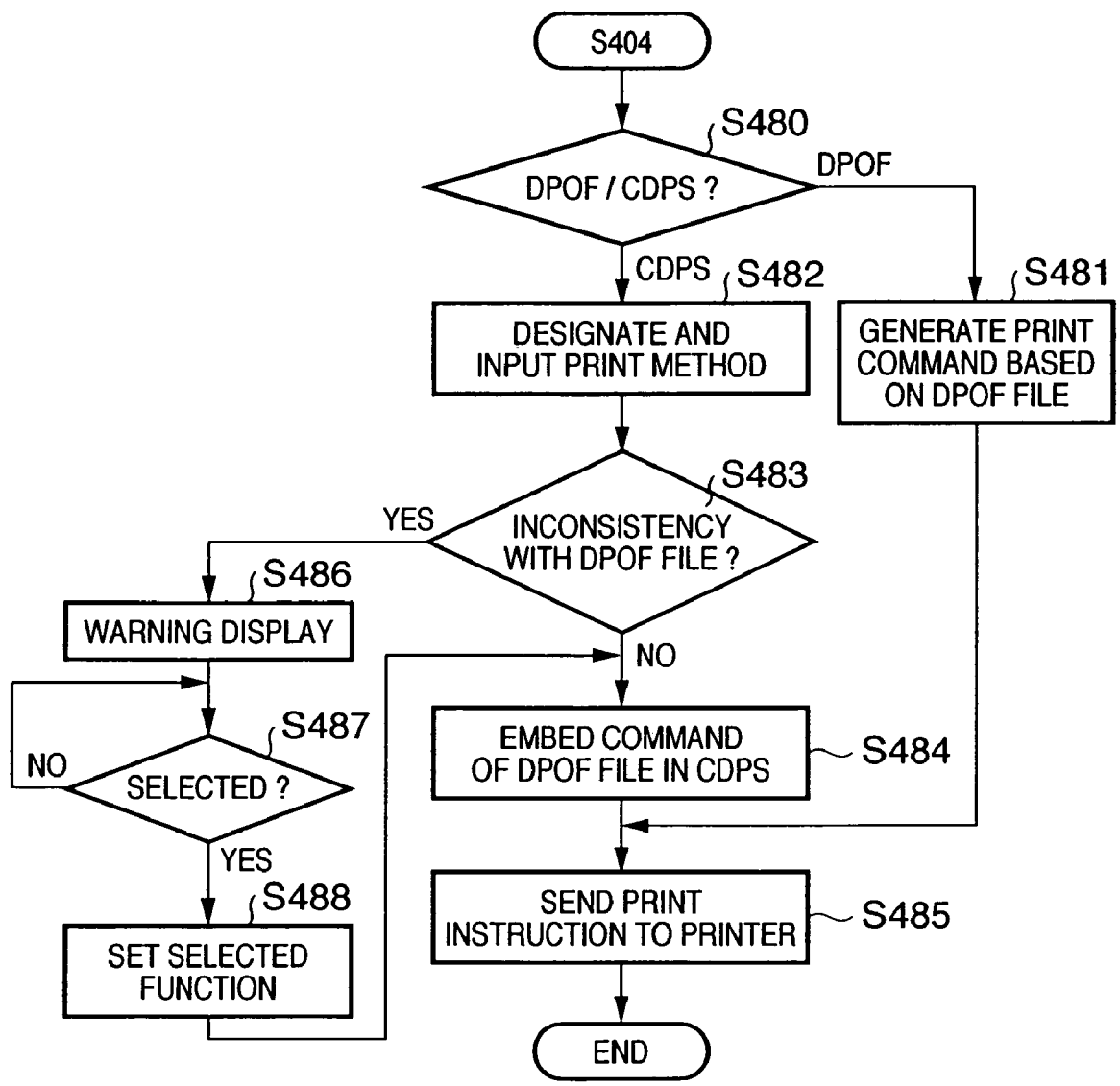
FIG. 48 is a flow chart for explaining a control process by the DSC according to the third embodiment of the present invention.

FIG. 48 is a flow chart for explaining the processes according to the third embodiment of the present invention, and shows processes after step S404 in the flow chart of FIG. 46 above.

In this case, after the CDPS compatibility is confirmed, and the CDPS initialize process is executed in step S404, it is determined in step S480 which of an instruction based on the DPOF file or the print method set based on capability is used to make a print process. The CDPS or DPOF to be used may be set as a default, or may be designated on a menu window or the like of the display unit 2700 using the operation button 3103.

On the other hand, DPOF is interpreted and it may be selected at step S480, either an instruction by DPOF or a printing method determined by CDPS based on capability, in accordance with the contents of the DPOF.

In this case, if the number of images to be printed according to DPOF is larger than a predetermined number, then the process may advance to step S482, or if the number of images to be printed according to DPOF is less than the predetermined number, then the process may advance to step S481. This is effective in a case where the number of images to be printed at once is limited in CDPS.

Further, if DPOF includes print conditions which do not satisfy with the capacity of the printer described in the capability, then the process may advance to step S481, or if not, the process may advance to step S482. This is effective in a case where a conversion process is performed so as to match DPOF with CDPS.

When the print process is implemented using the CDPS, the flow advances to step S482, and data required to designate a print method by the PD printer 1000 are input as in step S405 above. It is checked if a CDPS script generated in this way is inconsistent with a DPOF file stored in the memory card 3109. If no inconsistency is found, the flow advances to step S484 to generate a CDPS command formed by embedding the DPOF file in the CDPS (the aforementioned first or second embodiment). In step S485, a print instruction based on that command is issued to the printer.

On the other hand, if it is determined in step S483 that some inconsistency is found, the flow advances to step S486 to display a warning message indicating that inconsistency on the display unit 2700. The control waits in step S487 until one of the contents designated by the CDPS and those designated by the DPOF file is selected. After the selection, the selected print instruction contents are set in step S488.

If it is determined in step S480 that the print process is to be implemented using the DPOF file, the flow advances to step S481 to send that DPOF file to the PD printer 1000, thus executing the print process.

As described above, an image against the user's intention can be prevented from being printed due to inconsistency between the print setup contents in the originally stored DPOF file and those based on items input by connecting the printer.

In the above embodiment, when a print process is executed based on the DPOF file, a message indicating that the print process based on the DPOF is in progress may be displayed on the display unit 2700 of the DSC 3012. Conversely, when a print process based on the print condition of only the CDPS is in progress, a message indicating of executing based on the CDPS may be displayed on the display unit 2700. Also, when a print process based on the print conditions of both the DPOF and CDPS is in progress, a message indicating of executing based on both the DPOF and CDPS may be displayed.

Such display may be switched every time one page is printed. In this way, different print conditions for respective pages (or images) can be coped with.

A display that allows the user to identify whether or not the contents of the DPOF are reflected on the print condition used in the current print process may be made on the display unit 2700.

The functional arrangements in the above embodiments will be described below with reference to FIGS. 49A and 49B.

Figure 49A:
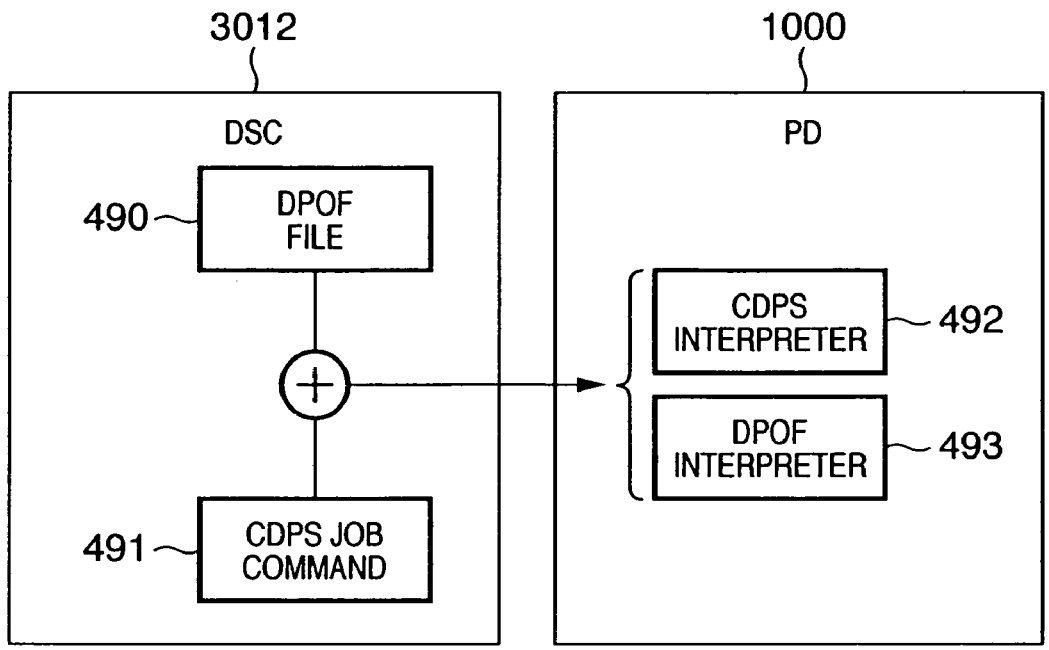
FIGS. 49A and 49B are functional block diagrams for explaining an outline of the first and second embodiments of the present invention.

FIG. 49A shows the arrangement according to the first embodiment. The DSC 3012 stores a DPOF file 490. After the DSC 3012 in this state is connected to the PD printer 1000 and it is determined that they are CDPS compatible devices, a CDPS job command 491 is generated based on a new print method instruction input by a user in accordance with the print functions of the PD printer 1000. A print instruction in a format that combines the DPOF file 490 and CDPS job command 491 is transmitted to the PD printer 1000.

In the PD printer 1000, a CDPS interpreter 492 (which is normally equipped since the printer is CDPS compatible) and DPOF interpreter 493 interpret the contents transmitted from the DSC 3012, and a print process based on the interpretation results is executed.

Figure 49B:
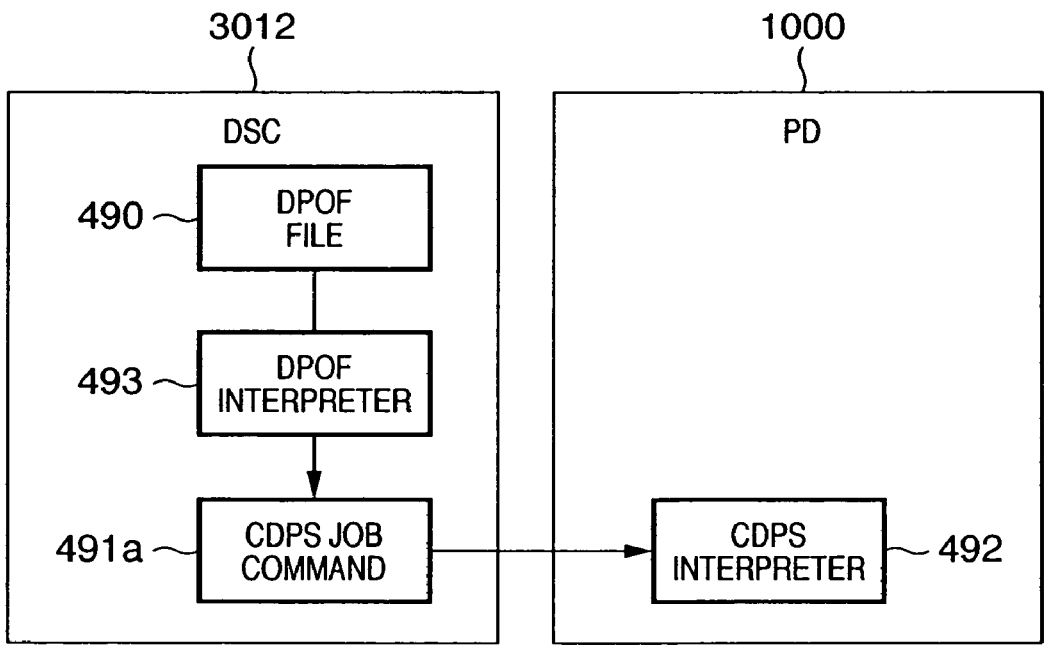

FIG. 49B shows the arrangement according to the second embodiment. As in FIG. 49A, the DPOF file 490 is stored in the DSC 3012. After the DSC 3012 in this state is connected to the PD printer 1000 and it is determined that they are CDPS compatible devices, a CDPS command sequence 491 is generated based on a new print method instruction input by the user in accordance with the print functions of the PD printer 1000. Upon sending a print instruction to the PD printer 1000, since the PD printer 1000 has no DPOF interpreter 493, the DSC interprets the DPOF file 490 to generate a CDPS job command 491a formed by embedding a handle that indicates an image designated by the DPOF file 490 in the CDPS command sequence, and sends that CDPS job command 491a to the PD printer 1000.

The PD printer 1000 does not comprise any DPOF interpreter 493, and the CDPS interpreter 492 (which is normally equipped since the printer is CDPS compatible) interprets the contents sent from the DSC 3012, thus executing the print process based on the interpretation result.

Figure 50:
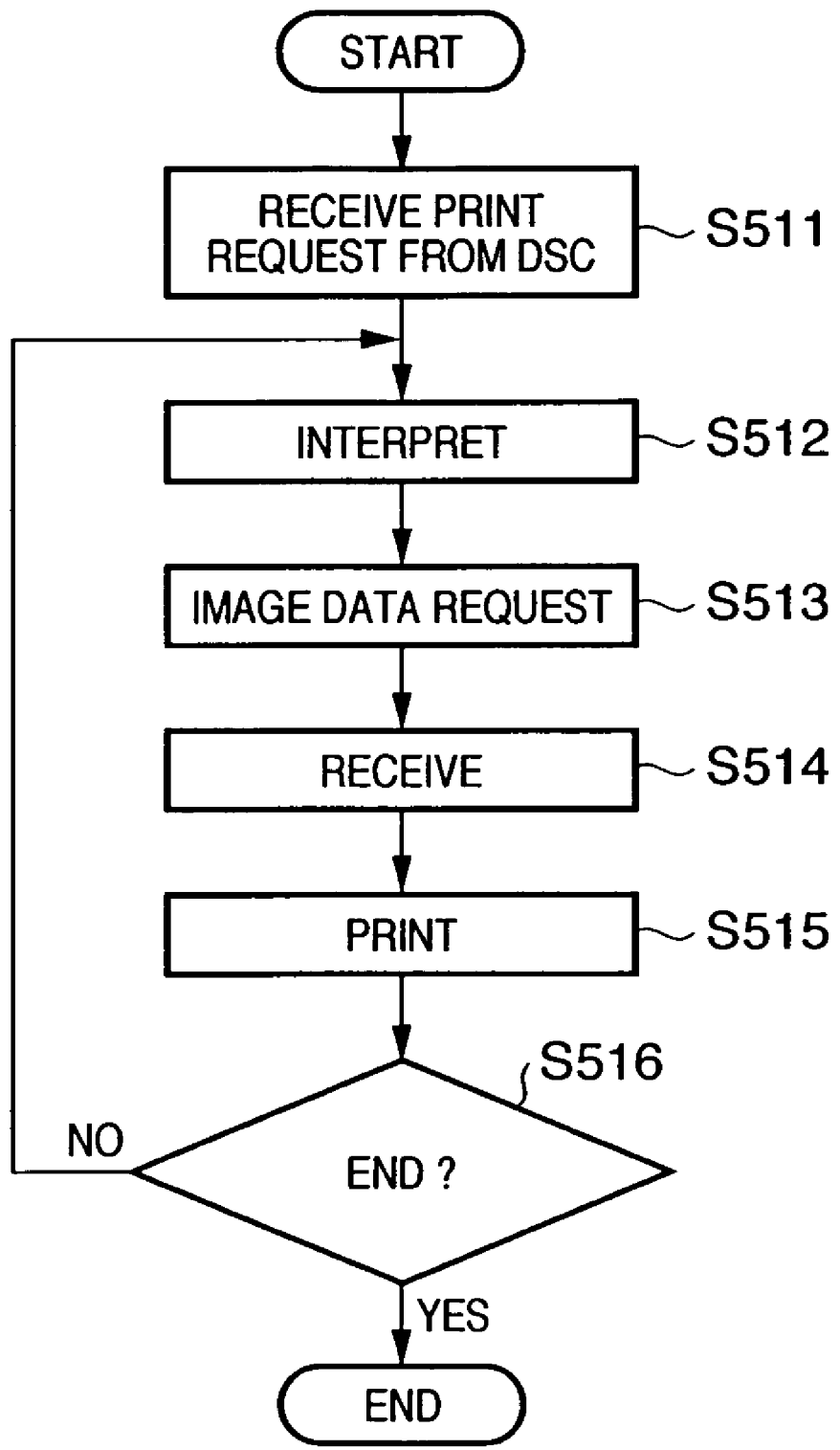
FIG. 50 is a flow chart for explaining a print process by a printer according to the embodiment of the present invention.

FIG. 50 is a flow chart for explaining the print process in the PD printer 1000 of the first and second embodiments described above. Note that an initial communication establishment process upon connection of the DSC has already been done.

In step S511, a DPOF file, a CDPS script containing DPOF, or a CDPS script is acquired from the connected DSC 3012. The flow advances to step S512 to interpret the file or script acquired in step S511, thus acquiring print conditions and the handle of an image to be printed. In step S513, data (image data) indicated by that handle is requested (this process can be implemented by a GetObject command). Image data sent in response to this request is received (step S514), and a print process is executed (step S515). The processes in step S512 and subsequent steps are repeated until it is determined that the aforementioned process are complete for all the requests.

As a result of the aforementioned process, even in a situation in which the digital camera directly communicates with the printer, only images that the user wants can be printed.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit. When the present invention is applied to the storage medium, that storage medium stores the program codes corresponding to the aforementioned flow charts.

As described above, according to this embodiment, the PD printer is set as a USB host, and the DSC is set as a slave. Prior to the print operation, functions required for a photo direct print process are allotted and assigned between the PD printer and DSC to determine an optimal print mode or a desired print mode on the DSC side so as to make a print process. Upon assigning the functions, when, for example, the DSC 3012 does not support the CDPS itself, it is impossible to notify the PD printer 1000 of the support levels of the functions 800 to 803 of the DSC 3012 in step S11 in FIG. 11. Even in such case, when the support levels of the functions 800 to 803 of the DSC 3012 are determined as zero, and all of these functions 800 to 803 are supported by the PD printer 1000 side, a direct print process can be done even with a CDPS incompatible DSC 3012 by essentially commonly using the CDPS resources. This process for "determining the support levels as zero" may be implemented in any of the layers in FIG. 7.

In this manner, by commonly using the resources on the image supply side and image output side, a short developing period, low cost, a reduction of resources, high reliability, and the like can be expected upon implementing direct print processes with a compatible device and incompatible device.

In this embodiment, the PD printer is set as a USB host, and the DSC is set as a slave. However, the present invention is not limited to such specific combination, and either device may serve as a host/slave as long as function assignment as the gist of the present invention can be suitably attained.

Since Capability information and various instructions are exchanged using scripts, easy export to other communication protocols can be assured, thus allowing easy standardization.

The communication procedure between devices is implemented using a versatile file and format, and a communication procedure layer of the application according to this embodiment is specified in the upper layer, thus specifying the communication procedure independently of various interface specifications.

In the recording system of this embodiment, since many unspecified devices are connected to each other, they have various interfaces. Under the circumstance, information must be changed using a specification which is normally supported by various interfaces. Hence, since function information which must be exchanged between these devices is implemented by "file transfer" or "object transfer", various interface specifications can be easily matched.

As the image supply device, a PDA, portable phone, television, video device, image storage device, and the like may be used in addition to the digital camera.

The versatile interface includes connection to the Internet or the like in addition to the aforementioned USB, IEEE1394, and the like.

The present invention is not limited to the above embodiments and various changes and modifications can be made within the spirit and scope of the present invention. Therefore, to apprise the public of the scope of the present invention, the following claims are made.

The invention claimed is:

1. An image supply device for directly communicating with a printer and transmitting image data to the printer to print the image data, the device comprising:
    an interface configured to connect with a storage medium that stores image data and a file including first image designation data for designating image data to be printed, wherein the file has been stored in the storage medium before the image supply device and the printer communicate each other;
    an obtaining unit configured to obtain function information of the printer from the printer through communication with the printer;
    a creation unit configured to create second image designation data based on a designation of image data to be printed after the image supply device and the printer communicate each other, and create a print job including the second image designation data and a print condition based on the function information obtained by said obtaining unit; and
    a transmission unit configured to transmit the print job created by said creation unit to the printer,
    wherein if the designation of image data to be printed is performed using the first image designation data included in the file, then said creation unit creates the print job including information for designating the file instead of the second image designation data.

2. A device according to claim 1, wherein the image supply device is a digital camera.

3. A device according to claim 1, wherein the file is a DPOF file.

4. A control method of an image supply device for directly communicating with a printer and transmitting image data to the printer to print the image data, the method comprising the steps of:
    obtaining function information of the printer from the printer through communication with the printer, while a storage medium that stores image data and a file including first image designation data for designating image data to be printed is mounted on the image supply device, wherein the file has been stored in the storage medium before the image supply device and the printer communicate each other;
    creating second image designation data based on a designation of image data to be printed after the image supply device and the printer communicate each other;
    generating a print job including the second image designation data and a print condition based on the function information obtained in said obtaining step; and
    transmitting the print job created in said generating step to the printer,
    wherein if the designation of image data to be printed is performed using the first image designation data included in the file, then said generating step generates the print job including information for designating the file instead of the second image designation data.

5. A method according to claim 4, wherein the image supply device is a digital camera.

6. A method according to claim 4, wherein the file is a DPOF file.

* * * * *